US011072741B2

(12) United States Patent
Matsuyama et al.

(10) Patent No.: US 11,072,741 B2
(45) Date of Patent: Jul. 27, 2021

(54) OPTICALLY ANISOTROPIC LAYER, METHOD FOR PRODUCING THE OPTICALLY ANISOTROPIC LAYER, A LAMINATE, POLARIZING PLATE, DISPLAY DEVICE, LIQUID CRYSTAL COMPOUND, METHOD FOR PRODUCING THE LIQUID CRYSTAL COMPOUND, AND CARBOXYLIC ACID COMPOUND

(71) Applicant: FUJIFILM Corporation, Tokyo (JP)

(72) Inventors: Hiroshi Matsuyama, Kanagawa (JP); Ryoji Goto, Kanagawa (JP); Hiroyuki Ishikawa, Kanagawa (JP); Keita Takahashi, Kanagawa (JP); Taiji Katsumata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 352 days.

(21) Appl. No.: 16/042,224

(22) Filed: Jul. 23, 2018

(65) Prior Publication Data
US 2018/0346814 A1    Dec. 6, 2018

Related U.S. Application Data

(62) Division of application No. 14/887,858, filed on Oct. 20, 2015, now Pat. No. 10,059,877.

(30) Foreign Application Priority Data

Oct. 21, 2014 (JP) ............................. JP2014-214782
Jul. 29, 2015 (JP) ............................. JP2015-149996

(51) Int. Cl.
*C09K 19/34* (2006.01)
*C09K 19/38* (2006.01)
(Continued)

(52) U.S. Cl.
CPC .......... *C09K 19/3491* (2013.01); *B32B 23/04* (2013.01); *B32B 23/08* (2013.01);
(Continued)

(58) Field of Classification Search
CPC ............ C09K 19/3491; C09K 19/3068; C09K 19/3477; C09K 19/348; C09K 19/3486;
(Continued)

(56) References Cited

U.S. PATENT DOCUMENTS

2010/0045901 A1    2/2010 Uehira et al.
2014/0107247 A1    4/2014 Sakamoto et al.
(Continued)

FOREIGN PATENT DOCUMENTS

CN    101470212 A    7/2009
CN    101558054 A    10/2009
(Continued)

OTHER PUBLICATIONS

Second Office Action, issued by the State Intellectual Property Office dated Apr. 14, 2020, in connection with Chinese Patent Application No. 201510684728.5.
(Continued)

*Primary Examiner* — Ruiyun Zhang
(74) *Attorney, Agent, or Firm* — Edwards Neils LLC; Jean C. Edwards, Esq.

(57) ABSTRACT

An optically anisotropic layer is formed by a liquid crystal compound represented by General Formula 1, in which the long axes of the molecules are oriented.
(Continued)

General Formula 1

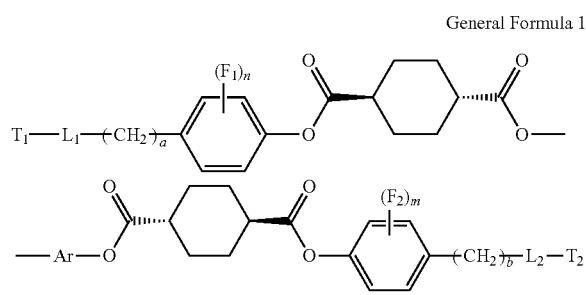

wherein $L_1$ and $L_2$ independently represent a linking group having a carbonyl group; $F_1$ and $F_2$ independently represent an alkyl group having 1 to 4 carbon atoms, an alkoxy group having 1 to 4 carbon atoms, or a halogen atom; n and m independently represent an integer from 0 to 4; a and b independently represent an integer from 1 to 4; $T_1$ and $T_2$ independently represent a spacer portion including a straight chain or branched alkylene or alkylene oxide group having 2 to 20 carbon atoms; and Ar represents a divalent group having at least one aromatic ring selected from a group consisting of aromatic hydrocarbon rings and aromatic heterocycles, the number of Π electrons in the Ar group being 8 or greater.

8 Claims, 2 Drawing Sheets

(51) Int. Cl.
*B32B 27/30* (2006.01)
*B32B 23/04* (2006.01)
*B32B 23/08* (2006.01)
*B32B 23/20* (2006.01)
*C09K 19/30* (2006.01)
*G02B 5/30* (2006.01)
*B32B 27/08* (2006.01)
*B32B 33/00* (2006.01)
*C09K 19/04* (2006.01)

(52) U.S. Cl.
CPC ............ *B32B 23/20* (2013.01); *B32B 27/308* (2013.01); *C09K 19/3068* (2013.01); *C09K 19/348* (2013.01); *C09K 19/3486* (2013.01); *C09K 19/3494* (2013.01); *C09K 19/3497* (2013.01); *C09K 19/3823* (2013.01); *C09K 19/3861* (2013.01); *G02B 5/305* (2013.01); B32B 27/08 (2013.01); B32B 33/00 (2013.01); B32B 2250/24 (2013.01); B32B 2255/00 (2013.01); B32B 2255/10 (2013.01); B32B 2255/26 (2013.01); B32B 2305/55 (2013.01); B32B 2307/40 (2013.01); B32B 2307/4026 (2013.01); B32B 2307/42 (2013.01); B32B 2307/514 (2013.01); B32B 2307/706 (2013.01); B32B 2307/7246 (2013.01); B32B 2457/20 (2013.01); *C09K 19/3001* (2013.01); *C09K 19/3477* (2013.01); *C09K 19/38* (2013.01); *C09K 2019/0448* (2013.01); *C09K 2019/3408* (2013.01); *C09K 2323/03* (2020.08); *C09K 2323/035* (2020.08); *G02B 5/3016* (2013.01)

(58) Field of Classification Search
CPC ............ C09K 19/3494; C09K 19/3497; C09K 19/3823; C09K 19/3861; C09K 19/3001; C09K 19/38; C09K 2019/0448; C09K 2019/3408; C09K 2323/03; C09K 2323/035; G02B 5/3016; G02B 5/305; G02B 5/3083
USPC ...... 428/1.3, 1.33; 349/75, 139; 564/156, 84
See application file for complete search history.

(56) References Cited

U.S. PATENT DOCUMENTS

| | | |
|---|---|---|
| 2014/0142266 A1 | 5/2014 | Sakamoto et al. |
| 2014/0309396 A1 | 10/2014 | Sakamoto et al. |
| 2015/0079380 A1* | 3/2015 | Muramatsu ........ C09K 19/2028 428/220 |
| 2015/0175564 A1 | 6/2015 | Sakamoto et al. |
| 2015/0183902 A1 | 7/2015 | Sakamoto et al. |
| 2015/0232625 A1 | 8/2015 | Sakamoto |

FOREIGN PATENT DOCUMENTS

| | | |
|---|---|---|
| CN | 103459438 A | 12/2013 |
| CN | 103492363 A | 1/2014 |
| CN | 103608331 A | 2/2014 |
| JP | 2009-242718 A | 10/2009 |
| JP | 2010-001368 A | 1/2010 |
| JP | 2010-031223 A | 2/2010 |
| JP | 2012-077057 A | 4/2012 |
| WO | 2013/180217 A1 | 12/2013 |
| WO | 2014/010325 A1 | 1/2014 |
| WO | 2014/057884 A1 | 4/2014 |

OTHER PUBLICATIONS

Non-Final Office Action issued in U.S. Appl. No. 14/887,858 dated Nov. 29, 2017.
English Language Machine Translation of JP 2010-031223; Feb. 12, 2010.
Notification of Reasons for Refusal issued by the Japanese Patent Office (JPO) dated Nov. 30, 2017, in connection with corresponding Japanese Patent Application No. 2015-149996.
First Office Action, issued by the State Intellectual Property Office dated Sep. 6, 2019, in connection with Chinese Patent Application No. 201510684728.5.

* cited by examiner

OPTICALLY ANISOTROPIC LAYER, METHOD FOR PRODUCING THE OPTICALLY ANISOTROPIC LAYER, A LAMINATE, POLARIZING PLATE, DISPLAY DEVICE, LIQUID CRYSTAL COMPOUND, METHOD FOR PRODUCING THE LIQUID CRYSTAL COMPOUND, AND CARBOXYLIC ACID COMPOUND

CROSS REFERENCE TO RELATED APPLICATIONS

The present application is a divisional patent application of U.S. patent application Ser. No. 14/887,858, filed Oct. 20, 2015, which claims priority under 35 U.S.C. § 119 to Japanese Patent Application No. 2014-214782 filed on Oct. 21, 2014 and Japanese Patent Application No. 2015-149996 filed on Jul. 29, 2015. Each of the above applications is hereby expressly incorporated by reference, in its entirety, into the present application.

BACKGROUND

The present disclosure is related to an optically anisotropic layer having reverse wavelength dispersing properties, a method for producing the optically anisotropic layer, a laminate comprising the optically anisotropic layer, a polarizing plate, a display device, a liquid crystal compound and a method for producing the liquid crystal compound that exhibits a reverse wavelength dispersing properties, and a carboxylic acid compound which is an intermediate of the liquid crystal compound.

Conventionally, optically anisotropic layers are widely utilized in liquid crystal display devices having various display modes, for the purposes of improving wide viewing angles, high contrast ratios, color shifts. Generally, materials used in image display devices, and particularly polymers, phase differences, that is, birefringence, is ordered wavelength dispersion (also referred to as normal dispersion), which is greater at the short wavelength side. Therefore, the influence on display characteristics due to the difference of the wavelength of transmitted light is a concern.

It is desired for optically anisotropic layers to control the wavelength dispersion of phase differences, in order to prevent influence being imparted onto display characteristics due to differences in the wavelengths of transmitted light. It is desired for wavelength dispersion of phase differences to be greater at the long wavelength side compared to phase differences at the short wavelength side, that is, reverse wavelength dispersing (also referred to as abnormal dispersion) is desired.

Optically anisotropic layers that employ reverse wavelength dispersing liquid crystal compounds are disclosed in Japanese Unexamined Patent Publication Nos. 2010-031223 and 2009-242718, etc., as optically anisotropic layers having reverse wavelength dispersing properties.

SUMMARY

However, although the liquid crystal compounds disclosed in these documents exhibit reverse wavelength dispersing properties, there is a problem in laminating operations onto resin films because the phase transition temperatures for obtaining an oriented state thereof are high, and also a problem that the solubility thereof in solvents for forming coating solutions is poor.

The present disclosure has been developed in view of the above circumstances. The present disclosure provides an optically anisotropic layer having superior production adaptability, which is obtained by employing a liquid crystal compound that exhibits reverse dispersing properties having a lower phase transition temperature necessary for liquid crystal orientation and higher solubility in solvents compared to conventional liquid crystal compounds. The present disclosure also provides a method for producing such an optically anisotropic layer.

The present disclosure also provides a laminate and a polarizing plate that takes the influence of differences in wavelengths of transmitted light on display characteristics into consideration, as well as a display device.

The present disclosure further provides a liquid crystal compound having a low phase transition temperature necessary for liquid crystal orientation and high solubility in solvents. The present disclosure provides a method for producing such a liquid crystal compound, as well as a carboxylic acid compound, which is an intermediate of the liquid crystal compound.

An optically anisotropic layer of the present disclosure comprises a liquid crystal compound represented by General Formula 1 below, or is formed by curing a polymerizable composition containing a liquid crystal compound represented by General Formula 1 below, the long axes of the molecules of the liquid crystal compound of General Formula 1 being oriented.

General Formula 1

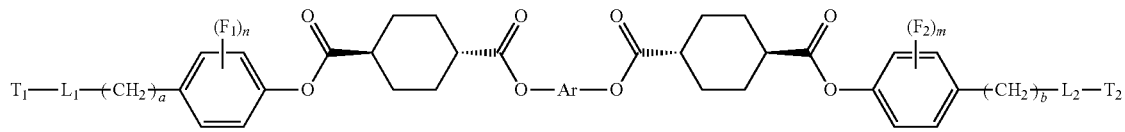

In the above formula, each of $L_1$ and $L_2$ independently represents a linking group having a carbonyl group; each of $F_1$ and $F_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4, and 1 or 2 are preferable for each; each of $T_1$ and $T_2$ independently represents a spacer portion including a straight chain or branched alkylene or alkylene oxide group having a carbon number within a range from 2 to 20; and Ar represents a divalent group having at least one aromatic ring selected from a group consisting of aromatic hydrocarbon rings and aromatic heterocycles, the number of Π electrons contained in the Ar group being 8 or greater.

As described above, there are two aspects of the optically anisotropic layer of the present disclosure. A first aspect is that which comprises the liquid crystal compound represented by General Formula 1 above, that is, an aspect which is not cured. A second aspect is that which is formed by curing the polymerizable composition containing the liquid crystal compound represented by General Formula 1 above. The second aspect includes an aspect of in which the liquid crystal compound represented by General Formula 1 is dispersed in a binder polymer, and an aspect in which the end groups of $T_1$ and $T_2$ are polymerizable groups, and the polymerizable groups are polymerized. In this case, the expression "long axes of the molecules of the liquid crystal compound of General Formula 1 being oriented" means that the long axes of the molecules are oriented as monomers within a polymer of the liquid crystal compound represented by General Formula 1.

In General Formula 1, it is preferable for Ar to be an aromatic ring represented by any one of General Formulae 2-1 to 2-4 below, and more preferable for Ar to be the aromatic ring represented by General Formula 2-2.

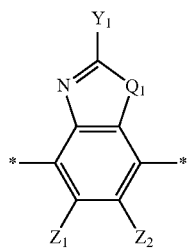

General Formula 2-1

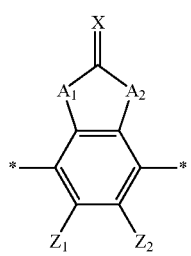

General Formula 2-2

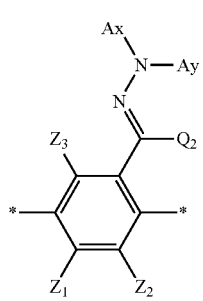

General Formula 2-3

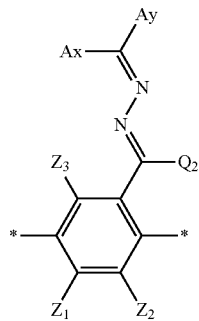

General Formula 2-4

In the above formulae, $Q_1$ represents —S—, —O—, or $NR^{11}$—, $R^{11}$ represents a hydrogen atom or an alkyl group having a carbon number within a range from 1 to 6; $Y_1$ represents an alkyl group having a carbon number within a range from 1 to 6, an aromatic hydrocarbon group having a carbon number within a range from 6 to 12, or an aromatic heterocyclic group having a carbon number within a range from 3 to 12; each of $Z_1$, $Z_2$, and, $Z_3$ independently represents a hydrogen atom, an aliphatic hydrocarbon group, or an alkoxy group having a carbon number within a range from 1 to 20, an alicyclic hydrocarbon group having a carbon number within a range from 3 to 20, a monovalent aromatic hydrocarbon group having a carbon number within a range from 6 to 20, a halogen atom, a cyano group, a nitro group, —$NR^{12}R^{13}$ or $SR^{12}$, $Z_1$ and $Z_2$ may bond together to form an aromatic ring or an aromatic heterocyclic ring; each of $R^{12}$ and $R^{13}$ independently represents a hydrogen atom or an alkyl group having a carbon number within a range from 1 to 6; each of $A_1$ and $A_2$ independently represents a group selected from a group consisting of —O—, —$NR^{21}$—($R^{21}$ represents a hydrogen atom or a substituent), —S— and CO—; X is a group 14 to group 16 non metallic atom that may be bound to a hydrogen atom or a substituent group; Ax represents an organic group having a carbon number within a range from 2 to 30, having at least one aromatic ring selected from a group consisting of aromatic hydrocarbon rings and aromatic heterocyclic rings; Ay is a hydrogen atom, an alkyl group having a carbon number within a range from 1 to 6 which may have a substituent, or an organic group having a carbon number within a range from 2 to 30, having at least one aromatic ring selected from a group consisting of aromatic hydrocarbon rings and aromatic heterocyclic rings, the aromatic rings of Ax and Ay may have substituents, Ax and Ay may be bound to form a ring; and $Q_2$ represents a hydrogen atom or an alkyl group having a carbon number of 1 to 6 which may have a substituent.

In General Formula 1, $T_1$ and $T_2$ may be a structure represented by General Formula 3 below. By the ends being polymerizable groups as in General Formula 3, the optically anisotropic layer may be formed by curing a polymerizable composition containing a liquid crystal compound represented by General Formula 1.

$$T_1: P_1 - Sp_1 - \brace T_2: P_2 - Sp_2 -$$

General Formula 3

In the above formula, each of $Sp_1$ and $Sp_2$ independently represents a straight chain or branched alkylene group having a carbon number within a range from 2 to 20, in the alkylene group, one or two or more —CH$_2$— not adjacent to each other in the alkylene group may be substituted by —O—, —S—, —C(=O)—, —OC(=O)—, —C(=O)O—, —OC(=O)O—, —NR$^1$C(=O)—, —C(=O)NR$^2$—, —OC(=O)NR$^3$—, —NR$^4$C(=O)O—, —SC(=O)— or —C(=O)S—; each of R$^1$, R$^2$, R$^3$ and R$^4$ independently represents a hydrogen atom, a halogen atom or an alkyl group having a carbon number within a range from 1 to 4; and each of P$_1$ and P$_2$ independently represents a polymerizable group or a hydrogen atom, wherein at least one is a polymerizable group.

In the optically anisotropic layer of the present disclosure, it is preferable for the oriented state to be fixed in a nematic phase or a smectic phase, and more preferably fixed in the smectic phase.

As used herein, the smectic phase refers to a state in which the molecules oriented in one direction has a layer structure, and the nematic phase refers to a state in which constituent molecules have an ordered orientation, but does not have a ordered three-dimensional positional relationship.

In the optically anisotropic layer of the present disclosure, it is preferable for the long axes of the molecules of the liquid crystal compound represented by General Formula 1 to be fixed in a homogeneous orientation, and for phase differences Re(450 nm), Re(550 nm), and Re(650 nm) for wavelengths 450 nm, 550 nm, and 650 nm, respectively, to satisfy Formulae A and B below.

Re(450 nm)/Re(550 nm)<0.95    Formula A

Re(650 nm)/Re(550 nm)>1.02    Formula B

The laminate of the present disclosure is the optically anisotropic layer of the present disclosure laminated on a resin film either directly or with an orienting film interposed therebetween.

The polarizing plate of the present disclosure comprises a laminate of the present disclosure, in which the resin film is a polarizer.

The display device of the present disclosure is equipped with the polarizing plate of the present disclosure.

The method for producing the optically anisotropic layer of the present disclosure comprises: spreading a composition containing a liquid crystal compound represented by General Formula 1 below or spreading a polymerizable composition containing a liquid crystal compound represented by General Formula 1 below, applying heat to orient the long axes of the molecules of the liquid crystal compound represented by General Formula 1 below, then curing the composition or the polymerizable composition. The preferred configurations of the liquid crystal compound represented by General Formula 1 are the same as those of the optically anisotropic layer of the present disclosure.

General Formula 1

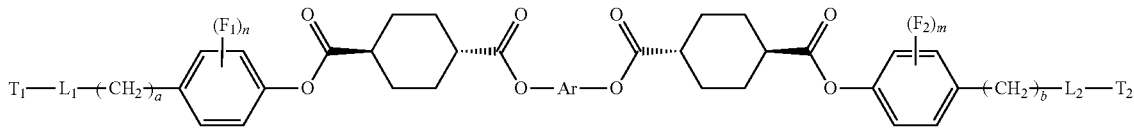

In the above formula, each of L$_1$ and L$_2$ independently represents a linking group having a carbonyl group; each of F$_1$ and F$_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4, and 1 or 2 are preferable for each; each of T$_1$ and T$_2$ independently represents a spacer portion including a straight chain or branched alkylene or alkylene oxide group having a carbon number within a range from 2 to 20; and Ar represents a divalent group having at least one aromatic ring selected from a group consisting of aromatic hydrocarbon rings and aromatic heterocycles, the number of Π electrons contained in the Ar group being 8 or greater.

In the method for producing the optically anisotropic layer of the present disclosure, it is preferable for the composition containing the liquid crystal compound represented by General Formula 1 or the polymerizable composition containing a liquid crystal compound represented by General Formula 1 to be spread onto a substrate having a glass transition temperature higher than the orientation temperature of the liquid crystal compound of General Formula 1.

In the present specification, the "orientation temperature of the liquid crystal compound" refers to a phase transition temperature necessary for the liquid crystal composition to obtain an oriented state.

The liquid crystal compounds of this disclosure are those represented by General Formula 1 below. The preferred configurations of the liquid crystal compound represented by General Formula 1 are the same as those of the optically anisotropic layer of the present disclosure.

General Formula 1

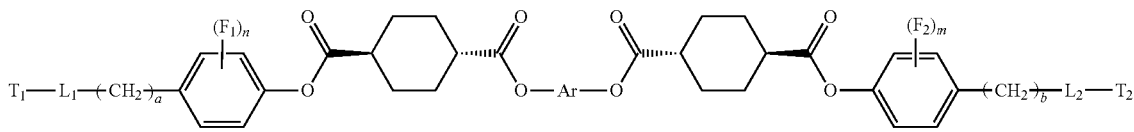

In the above formula, each of L$_1$ and L$_2$ independently represents a linking group having a carbonyl group; each of F$_1$ and F$_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4, and 1 or 2 are preferable for each; each of $T_1$ and $T_2$ independently represents a spacer portion including a straight chain or branched alkylene or alkylene oxide group having a carbon number within a range from 2 to 20; and Ar represents any one of the aromatic rings represented by General Formulae 2-1 to 2-4 below.

General Formula 2-1

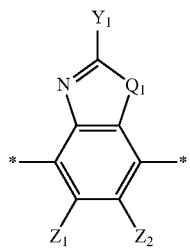

General Formula 2-2

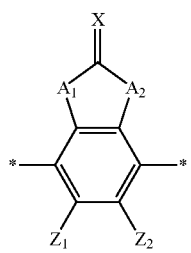

General Formula 2-3

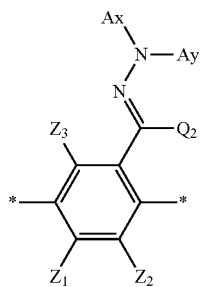

General Formula 2-4

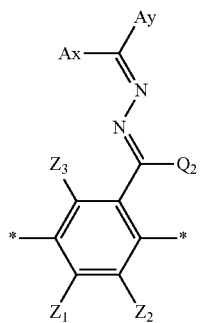

In the above formulae, $Q_1$ represents —S—, —O—, or $NR^{11}$—, $R^{11}$ represents a hydrogen atom or an alkyl group having a carbon number within a range from 1 to 6; $Y_1$ represents an alkyl group having a carbon number within a range from 1 to 6, an aromatic hydrocarbon group having a carbon number within a range from 6 to 12, or an aromatic heterocyclic group having a carbon number within a range from 3 to 12; each of $Z_1$, $Z_2$, and, $Z_3$ independently represents a hydrogen atom, an aliphatic hydrocarbon group, or an alkoxy group having a carbon number within a range from 1 to 20, an alicyclic hydrocarbon group having a carbon number within a range from 3 to 20, a monovalent aromatic hydrocarbon group having a carbon number within a range from 6 to 20, a halogen atom, a cyano group, a nitro group, —$NR^{12}R^{13}$ or $SR^{12}$, $Z_1$ and $Z_2$ may bond together to form an aromatic ring or an aromatic heterocyclic ring; each of $R^{12}$ and $R^{13}$ independently represents a hydrogen atom or an alkyl group having a carbon number within a range from 1 to 6; each of $A_1$ and $A_2$ independently represents a group selected from a group consisting of —O—, —$NR^{21}$— ($R^{21}$ represents a hydrogen atom or a substituent), —S— and CO—; X is a group 14 to group 16 non metallic atom that may be bound to a hydrogen atom or a substituent group; Ax represents an organic group having a carbon number within a range from 2 to 30, having at least one aromatic ring selected from a group consisting of aromatic hydrocarbon rings and aromatic heterocyclic rings; Ay is a hydrogen atom, an alkyl group having a carbon number within a range from 1 to 6 which may have a substituent, or an organic group having a carbon number within a range from 2 to 30, having at least one aromatic ring selected from a group consisting of aromatic hydrocarbon rings and aromatic heterocyclic rings, the aromatic rings of Ax and Ay may have substituents, Ax and Ay may be bound to form a ring; and $Q_2$ represents a hydrogen atom or an alkyl group having a carbon number of 1 to 6 which may have a substituent.

A method for producing a liquid crystal compound of the present disclosure is a method for producing a liquid crystal compound represented by General Formula 1 below, by causing a compound represented by General Formula 4 below to react with a compound represented by General Formula 5 below.

General Formula 1

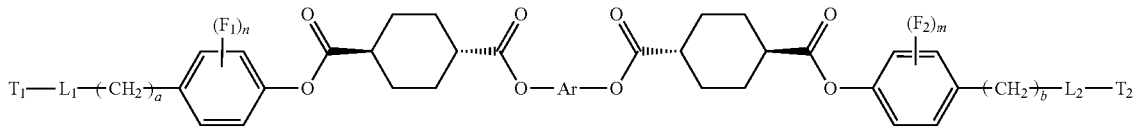

In the above formula, each of $L_1$ and $L_2$ independently represents a linking group having a carbonyl group; each of $F_1$ and $F_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4, and 1 or 2 are preferable for each; each of $T_1$ and $T_2$ independently represents a spacer portion including a straight chain or branched alkylene or alkylene oxide group having a carbon number within a range from 2 to 20; and Ar represents a divalent group having at least one aromatic ring selected from a group consisting of aromatic hydrocarbon rings and aromatic heterocycles, the number of Π electrons contained in the Ar group being 8 or greater.

General Formula 4

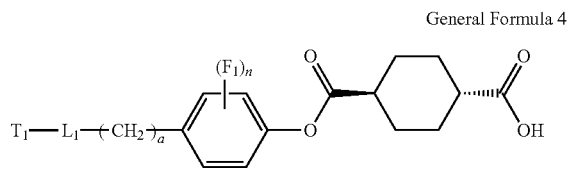

In the above formula, $L_1$ represents a linking group having a carbonyl group; $F_1$ is an alkyl group having a carbon number within a range from 1 to 4, an alkoxy group having a carbon number within a range from 1 to 4, or a halogen atom; n represents an integer within a range from 0 to 4; a represents an integer within a range from 1 to 4; and $T_1$ is a straight chain or branched alkylene group having a carbon number within a range from 2 to 20.

 General Formula 5

In the above formula, Ar represents a divalent group having at least one aromatic ring selected from a group consisting of aromatic hydrocarbon rings and aromatic heterocycles, the number of Π electrons contained in the Ar group being 8 or greater.

A carboxylic acid compound of the present disclosure is represented by General Formula 7 below, and is favorably suitable for use as a carboxylic acid compound to be used in the method for producing the liquid crystal compound of the present disclosure.

General Formula 7

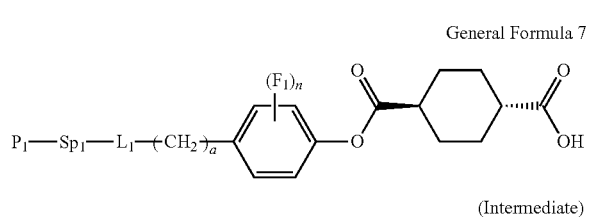

(Intermediate)

In the above formula, $L_1$ represents a linking group having a carbonyl group; $F_1$ is an alkyl group having a carbon number within a range from 1 to 4, an alkoxy group having a carbon number within a range from 1 to 4, or a halogen atom; n represents an integer within a range from 0 to 4; a represents an integer within a range from 1 to 4; $Sp_1$ represents a straight chain or branched alkylene group having a carbon number within a range from 2 to 20, one or two or more —CH2- not adjacent to each other in the alkylene group may be substituted by —O—, —S—, —C(=O)—, —OC(=O)—, —C(=O)O—, —OC(=O)O—, —NR$^1$C(=O)—, —C(=O)NR$^2$—, —OC(=O)NR$^3$—, —NR$^4$C(=O)O—, —SC(=O)— or —C(=O)S—; each of $R^1$, $R^2$, $R^3$ and $R^4$ independently represents a hydrogen atom, a halogen atom or an alkyl group having a carbon number within a range from 1 to 4; and $P_1$ represents a polymerizable group.

The optically anisotropic layer of the present disclosure is obtained employing a liquid crystal compound that exhibits reverse wavelength dispersing properties which has a lower phase transition temperature necessary for liquid crystal orientation and higher solubility in solvents, compared to conventional optically anisotropic layers. Therefore, according to the present disclosure, it is possible to provide an optically anisotropic layer having reverse wavelength dispersing properties which has superior production adaptability.

DETAILED DESCRIPTION OF THE PREFERRED EMBODIMENTS

Figure 1:
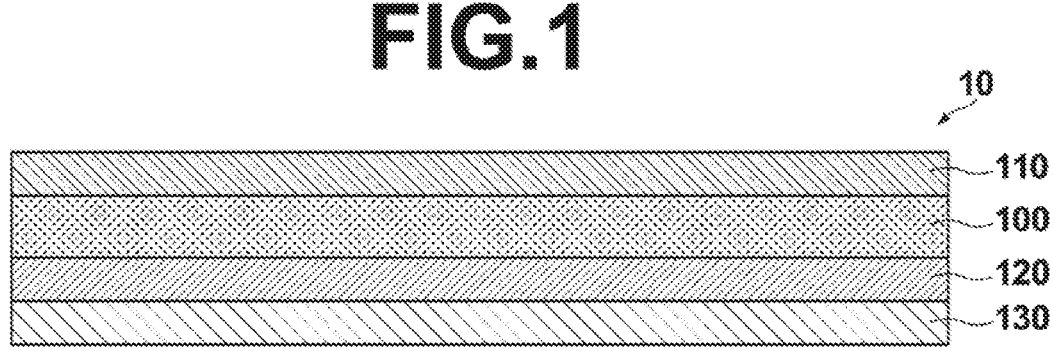
FIG. 1 is a schematic sectional view illustrating the configurations of an optically anisotropic layer and a polarizing plate according to an embodiment of the present disclosure.

Hereinafter, the present disclosure will be described in detail. Descriptions of the constituent elements below are based on representative embodiments of the disclosure. However, the present disclosure is not limited to such embodiments. Note that numerical ranges expressed by using "from . . . to . . . " in the present specification refers to ranges including the lower and upper limits of the numerical values described in the expressions "from . . . to . . . ". In addition, whether angles are "perpendicular" or "parallel" are determined based on whether actual angles are within a range of ±10 degrees, and whether angles are the "same" or "different" are judged based on whether differences in angles are less than 5 degrees.

In the present specification, the term "slow axis" refers to a direction in which the refractive index is maximum within a plane, and the term "polarizing plates" refers to both elongate polarizing plates and polarizing plates which have been cut to a size to be incorporated into display devices, unless otherwise noted. Note that the term "cut" as used herein includes both "punching out" and "cutting out". In the present specification, among the "polarizing plates", in particular, an aspect comprising a laminate of an optical film or a common λ/4 plate and a polarizing film of the present disclosure is referred to as a "circularly polarizing plate".

Further, an organic EL display device refers to an organic electroluminescent display device.

In the present specification, the term "inclination angle" (also referred to as "tilt angle") refers to an angle formed by inclined liquid crystals with respect to the plane of a layer, and refers to the maximum angle among angles at which the direction of the maximum refractive index with respect to the plane of the layer in the refractive index ellipsoid of the liquid crystal compound. Accordingly, in a liquid crystal compound having a positive optical anisotropy, the tilt angle refers the angle between the direction of the long axis of the liquid crystal compound, that is, the director direction, and the plane of the layer. In the present disclosure, the term "average tilt angle" refers to the average value of tilt angles from the upper interface to the lower interface of a retardation layer.

The reverse wavelength dispersing properties herein refers to a property by which the absolute value of in plane retardation becomes greater as wavelengths become longer.

In the present specification, each of Re($\lambda$), Rth($\lambda$) respectively represents retardation within a plane and retardation in the thickness direction at a wavelength $\lambda$. Re($\lambda$) is measured by causing light having a wavelength of $\lambda$nm to enter in a direction normal to a film by KOBRA 21ADH or WR (product name, manufactured by Oji Scientific Instruments, K. K.).

If a film to be measured is that represented by a uniaxial or biaxial refractive index ellipsoid, Rth($\lambda$) is calculated by the method below.

Rth($\lambda$) is measured as a retardation value by measuring Re($\lambda$) at six points by causing light having a wavelength of $\lambda$nm to enter the film from a direction normal to the film and at directions inclined from the normal direction up to 50 degrees toward one side thereof in 10 degree intervals with an in plane slow axis (determined by KOBRA 21ADH or WR) as an axis of inclination (rotational axis) (an arbitrary direction within the plane of the film is designated as the rotational axis in the case that a slow axis is not present), then calculated by KOBRA 21ADH or WR based on the measured retardation values, a hypothetical value of an average refractive index, and an input value of film thickness.

In the above description, the in plane slow axis from the normal direction is designated as the rotational axis, and in the case that a film has a retardation value of zero at a given angle of inclination, the signs of values of retardation at inclination angles larger than this inclination angle are changed to negative, and then calculations are executed by KOBRA 21ADH or WR.

Note that retardation values may be measured from two directions having any inclination with the slow axis designated as the axis of inclination (rotation axis) (an arbitrary direction within the plane of the film is designated as the rotational axis in the case that a slow axis is not present), and Rth may be calculated based on the measured values, a hypothetical value of an average refractive index, and an input value of film thickness by Formula (1) and Formula (2) below.

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad \text{Formula (1)}$$

$$Rth = \left(\frac{nx+ny}{2} - nz\right) \times d \quad \text{Formula (2)}$$

In the above formulae, Re($\theta$) represents a retardation value for a direction which is inclined from the normal direction for an angle $\theta$. In cases that 0 is not particularly described, $\theta$ indicates 0 degrees. nx represents a refractive index in the slow axis direction in the plane of the film, ny represents the refractive index in the direction perpendicular to nx in the plane of the film, and nz represents the refractive index in the direction perpendicular to nx and ny. d represents the thickness of the film.

When a film to be measured can not be represented by a uniaxial or biaxial refractive index ellipsoid, that is, in the case that a film is that without a so-called optical axis (OPTIC AXIS), Rth($\lambda$) is calculated by the following method.

Rth($\lambda$) is measured as a retardation value by measuring Re($\lambda$) at eleven points by causing light having a wavelength of $\lambda$nm to enter the film from a direction normal to the film and at directions inclined from the normal direction from −50 degrees to +50 degrees in 10 degree intervals with an in plane slow axis (determined by KOBRA 21ADH or WR) as an axis of inclination (rotational axis), then calculated by KOBRA 21ADH or WR based on the measured retardation values, a hypothetical value of an average refractive index, and an input value of film thickness.

In the measurements described above, the values listed in Polymer Handbook (JOHN WILEY & SONS, INC) and the values listed in catalogs of various optical films may be utilized as the hypothetical value of the average refractive index. For films of which the average refractive indices are unknown, the average refractive indices may be measured with an Abbe's refractometer. Average refractive indices for major optical films are described below: cellulose acylate (1.48), cycloolefin polymer (1.52), polycarbonate (1.59), polymethyl methacrylate (1.49), and polystyrene (1.59). By inputting the hypothetical value of the average refractive index and the film thickness, nx, ny, nz are calculated by KOBRA 21ADH or WR. Nz=(nx−nz)/(nx−ny) is further calculated based on the calculated values of nx, ny, and nz.

Note that the retardation Re and Rth can also be measured using an AxoScan (AXOMETRICS Inc.), and Nz can be obtained by Nz=Rth/Re+0.5.

[Optically Anisotropic Layer]

The optically anisotropic layer of the present disclosure comprises a liquid crystal compound of the present disclosure represented by General Formula 1, or is formed by curing a polymerizable composition containing a liquid crystal compound of the present disclosure. The long axes of the molecules of the liquid crystal compound of the present disclosure are oriented, and there is one incident direction and wavelength at which the retardation is not 0 when retardation is measured, that is, the layer has optical characteristics which are not isotropic.

The thickness of the optically anisotropic layer varies depending on materials which are employed as well as set retardation values. However, it is preferable for the thickness to be within a range from 0.1µ to 20 µm, more preferably a range from 0.5 µm to 15 µm, and even more preferably a range from 1.0 µm to 10 µm. Further, the in plane retardation Re(550) of the optically anisotropic layer at a wavelength of 550 nm plane is selected as appropriate, because preferable ranges differ depending on the intended use of the optically anisotropic layer. Note that in the present specification, the thickness of each layer is an average value of film thicknesses which are measured at five random points.

In the optically anisotropic layer of the present disclosure, it is preferable for the orientation of the long axes of the molecules of the liquid crystal compound of the present disclosure to be fixed in a nematic phase or smectic phase, the details of which will be described later. It is more preferable for the orientation of the long axes of the molecules of the liquid crystal compound of the present disclosure to be fixed in the smectic phase. The liquid crystal compound of the disclosure exhibits a smectic phase and/or a nematic phase in the long axes of the molecules are oriented and oriented, and it is further possible to form a chiral nematic phase by the use of a chiral agent. It is preferable for the optically anisotropic layer used for optical compensation to be of a smectic phase, which has a high degree of orientational order.

Smectic liquid crystals can be more favorably employed in applications that require comparatively large retardation of 100 nm or greater, because scattering depolarization of the optically anisotropic layer due to the orientation fluctuations is small. Note that the smectic phase is not particularly limited, may any high order phase that liquid crystal molecules may assume, such as SmA, SmB, and SmC, and is selected as appropriate depending on the desired optical properties.

Observations by X ray diffraction patterns may be conducted to confirm whether the liquid crystal compound is fixed in a state of a smectic phase. If the liquid crystal compound is fixed in the state of a smectic phase, an X ray diffraction pattern from an ordered layer is observed. Therefore, it is possible to determine that the liquid crystal compound is in a fixed state. Observations by X ray diffraction patterns may be conducted to confirm whether the liquid crystal compound is fixed in a state of a nematic phase. If the liquid crystal compound is fixed in the state of a nematic phase, a sharp peak at the low angle side from layer formation is not observed, and only a broad halo peak is observed at the wide angle side. Therefore, it is possible to determine that the liquid crystal compound is in a fixed state.

In addition, it is possible to select various oriented states, such as homogeneous orientation or homeotropic orientation, for the oriented states of the long axes of the molecules of the liquid crystal compound represented by General Formula 1, in order to obtain a desired phase difference in the optically anisotropic layer of the present disclosure. It is preferable for the orientation of the long axes of the molecules of the liquid crystal compound represented by General Formula 1 to be fixed in a homogeneous orientation.

In the present disclosure, by fixing the oriented state to be homogenous orientation or substantially horizontal inclined orientation (hereinafter, also referred to as "(substantially) horizontal orientation") it is possible to obtain an optically anisotropic layer in which the angle formed by the direction in which the refractive index is maximal and the plane of the layer is 10 degrees or less, preferably 3 degrees or less, and particularly preferably 1 degree or less. Meanwhile, by fixing the oriented state to be homeotropic orientation or substantially vertical inclined orientation (hereinafter, also referred to as "(substantially) vertical orientation") it is possible to obtain an optically anisotropic layer in which the angle formed by the direction in which the refractive index is maximal and the direction normal to the plane of the layer is 10 degrees or less, preferably 3 degrees or less, and particularly preferably 1 degree or less.

In the case that an optically anisotropic layer in which a smectic phase in a homogenous orientation is fixed is to be obtained as an embodiment of the optically anisotropic layer of the present disclosure, a compound represented by General Formula 1 is maintained at a temperature, etc. that expresses the smectic phase in a state that orientation regulation that results in homogenous orientation in order to place the optically anisotropic layer in a smectic phase in a homogenous orientation. Then, this state is fixed by polymerization, photo cross linking, or thermal cross linking, to form such an optically anisotropic layer. Details of a method for producing the optically anisotropic layer will be described later.

The optically anisotropic layer of the present disclosure has reverse wavelength dispersing properties. Reverse wavelength dispersing properties are those in which phase differences are greater at a long wavelength side than phase differences at a short wavelength side. For example, in an optically anisotropic layer in which the orientation of the long axis of the molecules is fixed in a substantially horizontal orientation (a so called A plate), the phase differences Re(450 nm), Re(550 nm), and Re(650 nm) of the optically anisotropic layer at wavelengths of 450 nm, 550 nm, 650 nm satisfies Formulae (I) and (II) below. In the present disclosure, the ranges of a favorable blue (450 nm) and red (650 nm) in the case that a positive birefringence is imparted with respect to green (550 nm) which is most important for improving viewing angle characteristics are within the ranges of Formulae I and II. In the optically anisotropic layer of the present disclosure, it is preferable for the aforementioned phase differences Re(450 nm), Re(550 nm), and Re(650 nm) to satisfy Formulae A and B below, because it is preferable for the reverse wavelength dispersing properties to be steep. It is more preferable for the value of Re(450 nm)/Re(550 nm) to satisfy Formula C below. it Is possible to provide a high performance optical instrument the reverse wavelength dispersing properties being steep.

$$Re(450 \text{ nm})/Re(550 \text{ nm}) < 1.0 \quad \text{Formula I}$$

$$Re(650 \text{ nm})/Re(550 \text{ nm}) > 1.0 \quad \text{Formula II}$$

$$Re(450 \text{ nm})/Re(550 \text{ nm}) < 0.95 \quad \text{Formula A}$$

$$Re(650 \text{ nm})/Re(550 \text{ nm}) > 1.02 \quad \text{Formula B}$$

$$0.50 \leq Re(450 \text{ nm})/Re(550 \text{ nm}) < 0.90 \quad \text{Formula C}$$

It is necessary to favorably orient the absorption wavelength and the transition moment in the direction of orientation and in a direction perpendicular thereto, to obtain an optically anisotropic layer that satisfies Formulae I and II.

The wavelength dispersion properties refractive indices, as represented by the Lorentz-Lorenz formula, are closely related to the absorption of a substance. In order to cause the wavelength dispersion properties in the perpendicular direction to become lower more in the rightward direction, the absorption transition wavelength of the direction of the short axes of the molecules may be set to be longer compared to the absorption transition wavelength in the direction of the long axes of the molecules (direction of orientation). Thereby, an optically anisotropic layer that satisfies Formulae I and II can be obtained.

Hereinbelow, a liquid crystal compound of the present disclosure represented by General Formula 1 will be described.

<<Liquid Crystal Compound>>

The liquid crystal compound of the present disclosure is represented by General Formula 1 below.

General Formula 1

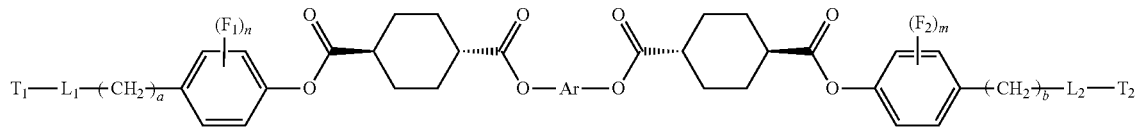

In the above formula, each of $L_1$ and $L_2$ independently represents a linking group having a carbonyl group; each of $F_1$ and $F_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4, and 1 or 2 are preferable for each; each of $T_1$ and $T_2$ independently represents a spacer portion including a straight chain or branched alkylene or alkylene oxide group having a carbon number within a range from 2 to 20; and Ar represents a divalent group having at least one aromatic ring selected from a group consisting of aromatic hydrocarbon rings and aromatic heterocycles, the number of Π electrons contained in the Ar group being 8 or greater.

Note that $L_1$, $L_2$, $F_1$, $F_2$, $T_1$, $T_2$, and Ar may have substituents.

In the present specification, the number, the type, and the substitution position of substituents is not limited in the case that substituents may be present. If two or three or more substituents are present, they may be the same or different. The type of substituent is not particularly limited. Examples of substituents include an alkyl group, an alkoxy group, an alkyl substituted alkoxy group, a cyclic alkyl group, a phenyl group, an aryl group such as a naphthyl group, a cyano group, an amino group, a nitro group, an alkylcarbonyl group, a sulfo group, and hydroxyl group.

The spacer portions $T_1$ and $T_2$ are the ends of the compound represented by General Formula 1. Although the spacer section is not particularly limited as long as it contains a straight chain or branched alkylene or alkylene oxide group having a carbon number within a range from 2 to 20, specific examples of the alkylene or alkylene oxide group include —$(CH_2)_x$—, —$(CH_2)_x$—O—, —$(CH_2$—O—$)_x$—, and —$(CH_2CH_2$—O—$)_x$.

In General Formula 1, $T_1$ and $T_2$ may the structure represented by General Formula 3 below. In this case, the liquid crystal compound represented by General Formula 1 can be polymerized and fixed within the optically anisotropic layer.

General Formula 3

$$T_1: P_1 - Sp_1 - \brace T_2: P_2 - Sp_2 -$$

In the above formula, each of $Sp_1$ and $Sp_2$ independently represents a straight chain or branched alkylene group having a carbon number within a range from 2 to 20, in the alkylene group, one or two or more —$CH_2$— not adjacent to each other in the alkylene group may be substituted by —O—, —S—, —C(=O)—, —OC(=O)—, —C(=O)O—, —OC(=O)O—, —$NR^1$C(=O)—, —C(=O)$NR^2$—, —OC(=O)$NR^3$—, —$NR^4$C(=O)O—, —SC(=O)— or —C(=O)S—; each of $R^1$, $R^2$, $R^3$ and $R^4$ independently represents a hydrogen atom, a halogen atom or an alkyl group having a carbon number within a range from 1 to 4; and each of $P_1$ and $P_2$ independently represents a polymerizable group or a hydrogen atom, wherein at least one is a polymerizable group.

It is preferable for the polymerizable group of $P_1$ and $P_2$ to be an unsaturated ethylene group or a ring opening polymerizable group. It is preferable for the unsaturated ethylene group to be a (meth) acryloyl group. It is preferable for the ring opening polymerizable group to be an epoxy group or an oxetanyl group.

In General Formula 1, Ar represents a divalent group having at least one aromatic ring selected from a group consisting of aromatic hydrocarbon rings and aromatic heterocycles, the number of Π electrons contained in the Ar group being 8 or greater.

By the number of Π electrons contained in the Ar group being 8 or greater, a direction that intersects with a direction in which the portion at which the cyclic groups are linked and the spacer portions extend (the long axis direction of the molecules) in the compound represented by Formula 1, that, is the absorption wavelength in the short axis direction of the molecules, is a long wavelength. It is estimated that the phase difference generated by the oriented liquid crystal molecules has reverse wavelength dispersing properties. It is preferable for the number of Π electrons to be 8 or greater and 40 or less, more preferably 10 or greater and 36 or less, and even more preferably 12 or greater and 30 or less.

Ar is preferably a divalent aromatic ring group represented by General Formula 2-1, 2-2, 2-3, or 2-4 below.

General Formula 2-1

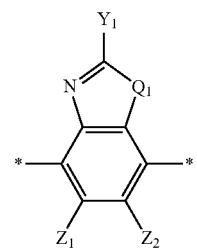

General Formula 2-2

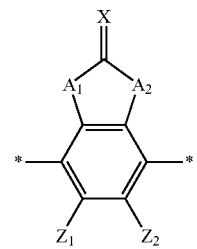

-continued

General Formula 2-3

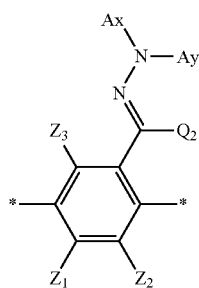

General Formula 2-4

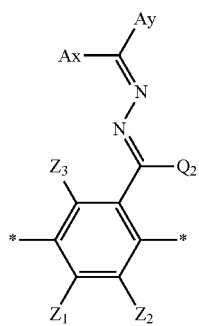

In the above formulae, $Q_1$ represents —S—, —O—, or $NR^{11}$—, $R^{11}$ represents a hydrogen atom or an alkyl group having a carbon number within a range from 1 to 6; $Y_1$ represents an alkyl group having a carbon number within a range from 1 to 6, an aromatic hydrocarbon group having a carbon number within a range from 6 to 12, or an aromatic heterocyclic group having a carbon number within a range from 3 to 12; each of $Z_1$, $Z_2$, and, $Z_3$ independently represents a hydrogen atom, an aliphatic hydrocarbon, or alkoxy group having a carbon number within a range from 1 to 20, an alicyclic hydrocarbon group having a carbon number within a range from 3 to 20, a monovalent aromatic hydrocarbon group having a carbon number within a range from 6 to 20, a halogen atom, a cyano group, a nitro group, —$NR^{12}R^{13}$ or $SR^{12}$, $Z_1$ and $Z_2$ may bond together to form an aromatic ring or an aromatic heterocyclic ring; each of $R^{12}$ and $R^{13}$ independently represents a hydrogen atom or an alkyl group having a carbon number within a range from 1 to 6; each of $A_1$ and $A_2$ independently represents a group selected from a group consisting of —O—, —$NR^{21}$— ($R^{21}$ represents a hydrogen atom or a substituent), —S— and CO—; X is a group 14 to group 16 non metallic atom that may be bound to a hydrogen atom or a substituent group; Ax represents an organic group having a carbon number within a range from 2 to 30, having at least one aromatic ring selected from a group consisting of aromatic hydrocarbon rings and aromatic heterocyclic rings; Ay is a hydrogen atom, an alkyl group having a carbon number within a range from 1 to 6 which may have a substituent, or an organic group having a carbon number within a range from 2 to 30, having at least one aromatic ring selected from a group consisting of aromatic hydrocarbon rings and aromatic heterocyclic rings, the aromatic rings of Ax and Ay may have substituents, Ax and Ay may be bound to form a ring; and $Q_2$ represents a hydrogen atom or an alkyl group having a carbon number of 1 to 6 which may have a substituent.

Preferred examples of the liquid crystal compound of the present disclosure represented by General Formula 1 are shown below. However, the liquid crystal compound of the present disclosure is not limited to the examples shown below.

General Formula I

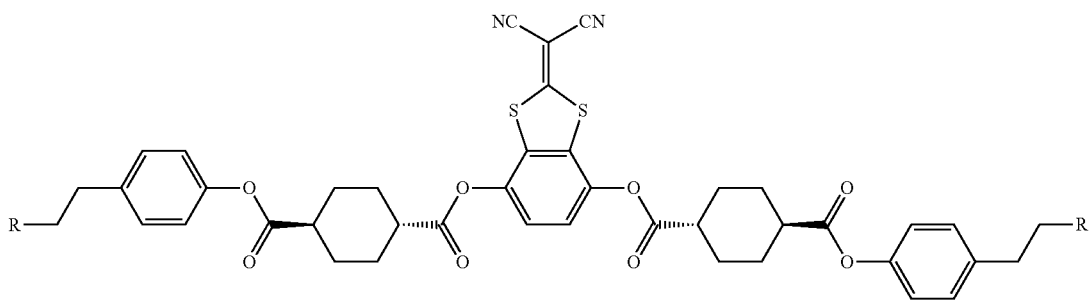

R =

(I-1)

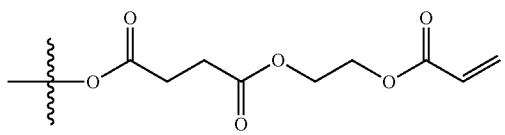

(I-2)

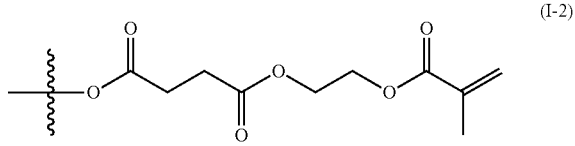

(I-3)

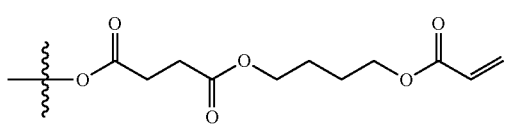

(I-4)

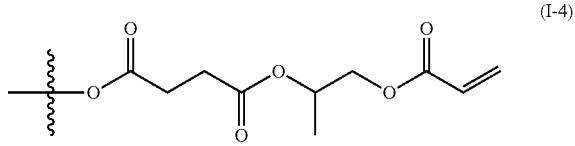

-continued
(I-5) 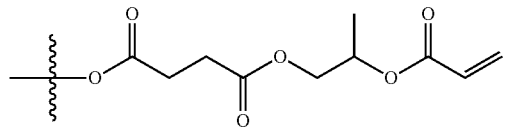
(I-6) 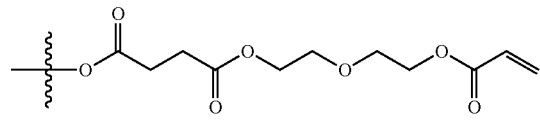
(I-7) 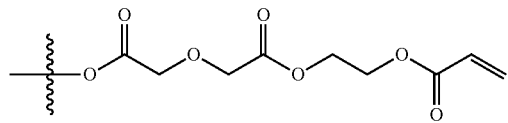
(I-8) 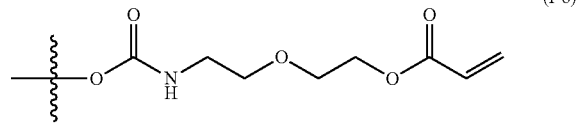
(I-9) 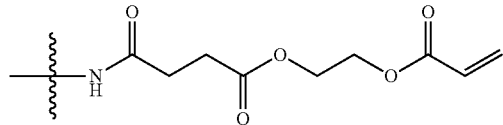
(I-10) R = 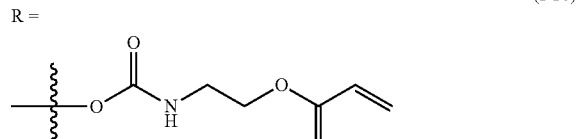
(I-11) 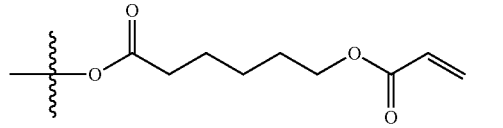
(I-12) 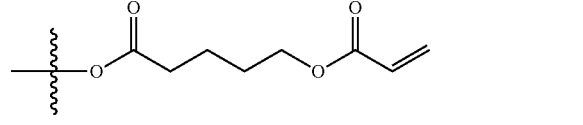
(I-13) 
(I-14) 
(I-13) 
(I-14) 
(I-15) 
(I-16) 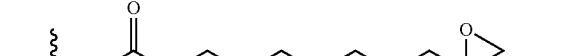
(I-17) 
(I-18) 
(II-1)
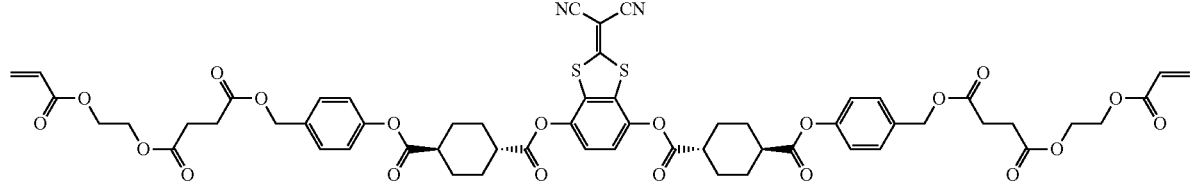
(II-2)
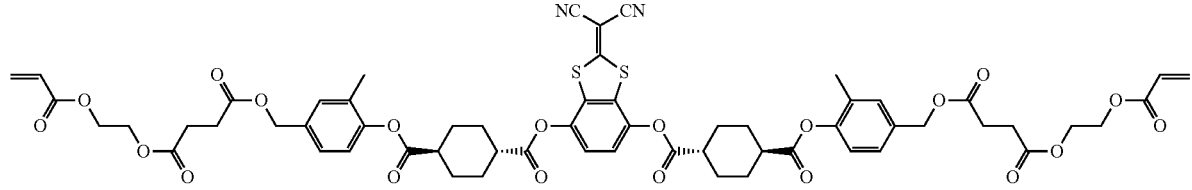

-continued
(II-3)
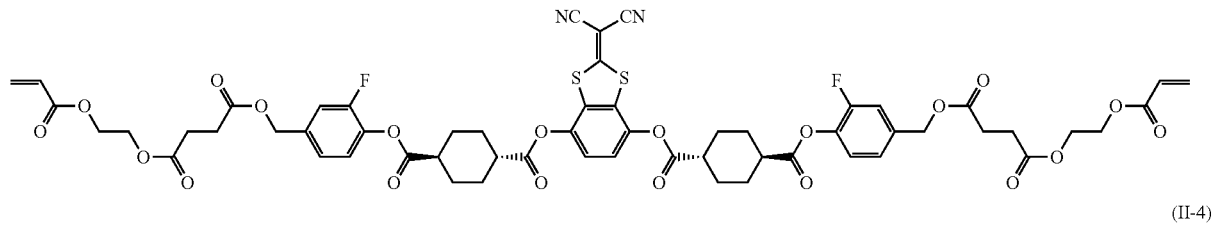
(II-4)
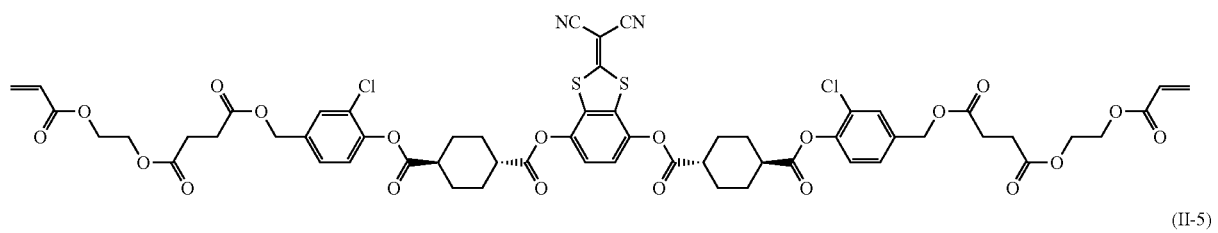
(II-5)
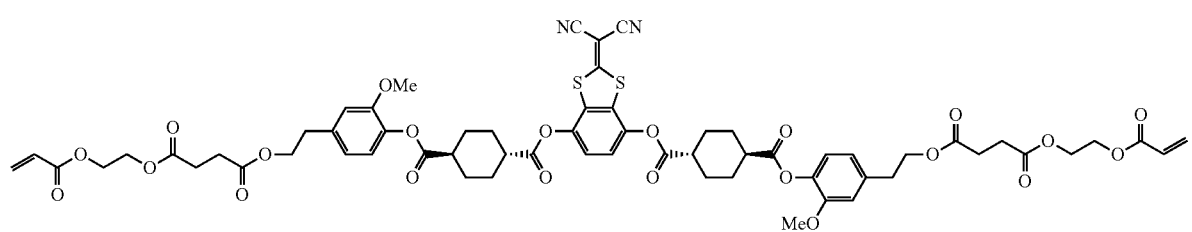
(II-6)
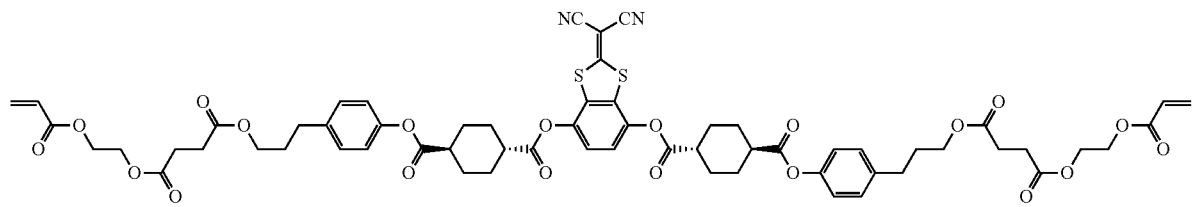
(II-7)
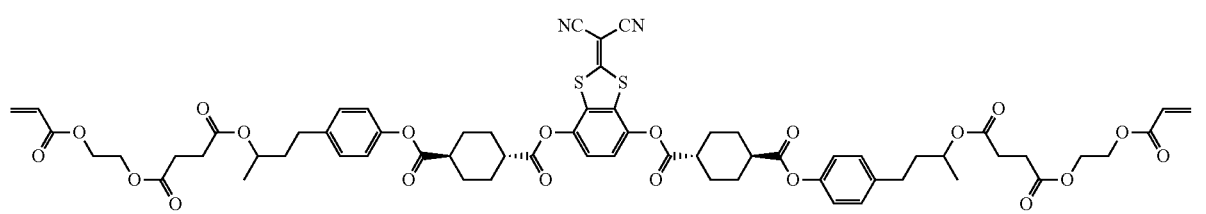
(II-8)
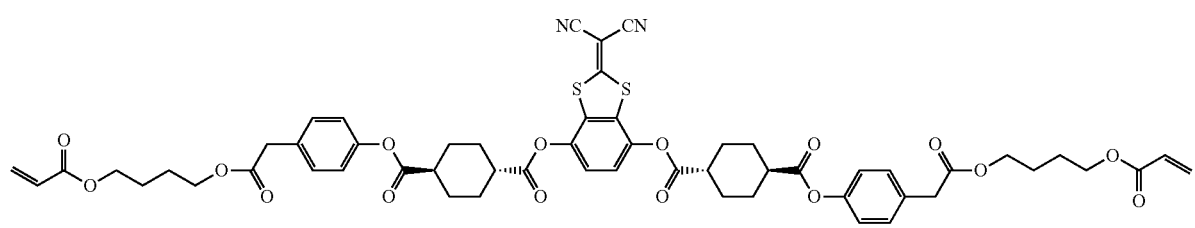

-continued
(II-9)
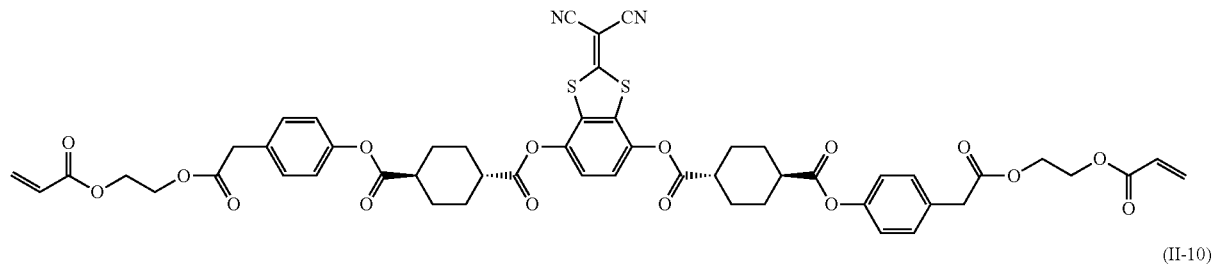
(II-10)
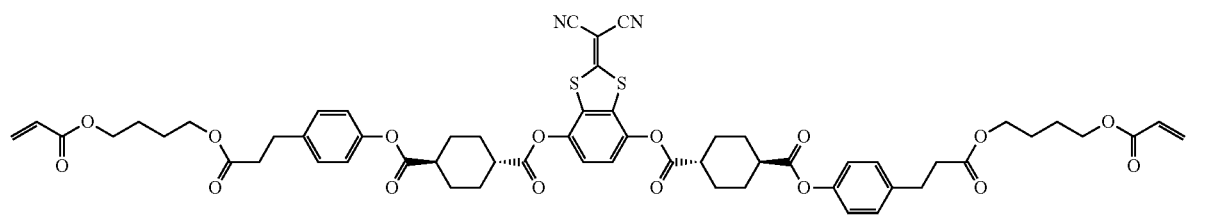
General Formula III
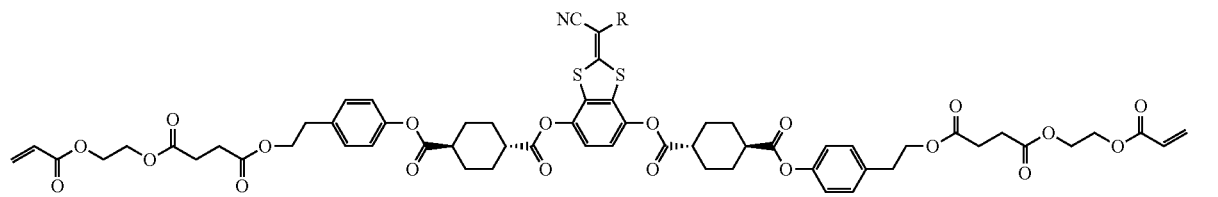
(III-1)
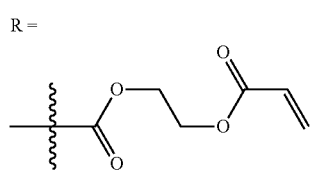
(III-2)
R =
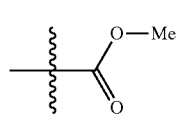
(III-3)
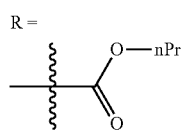
(III-4)
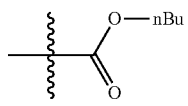
(III-5)
(III-6)
R =
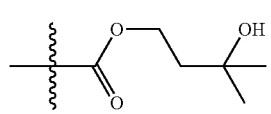
(III-7)
General Formula IV
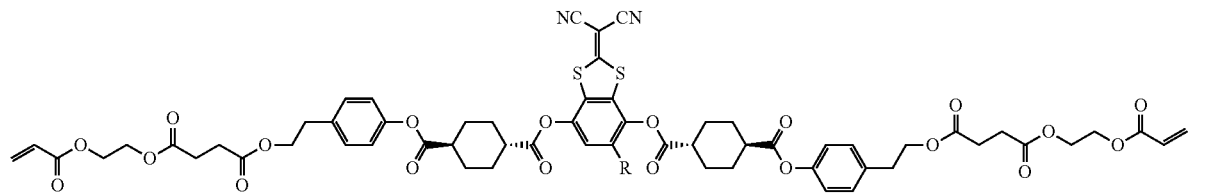
(IV-1)
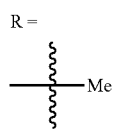
(IV-2)
R =

-continued
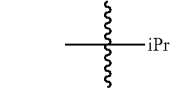
(IV-3)
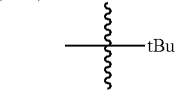
(IV-5)
(IV-7)
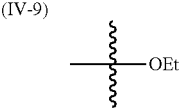
(IV-9)
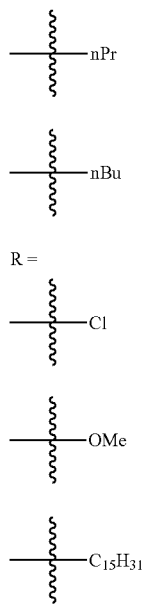
R =
(IV-4)
(IV-6)
(IV-8)
(IV-10)
(IV-11)
General Formula V
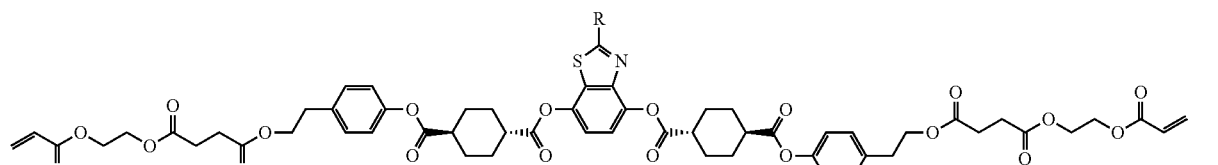
(V-1)
R =
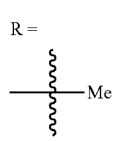
(V-2)
(V-3)
R =
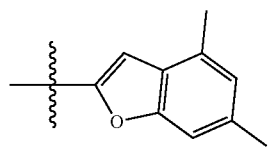
(V-4)
General Formula VI
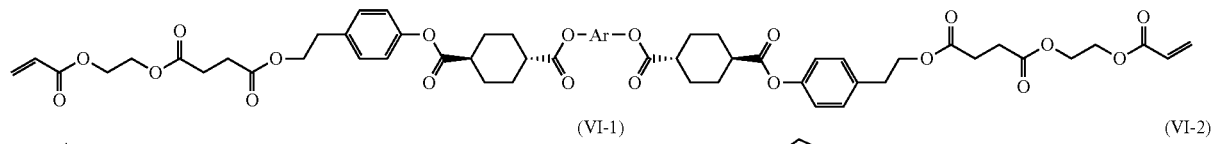
(VI-1)
Ar =
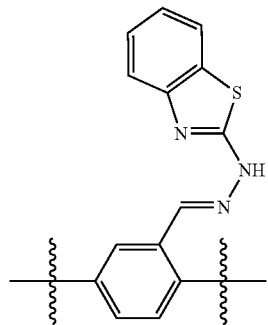
(VI-2)
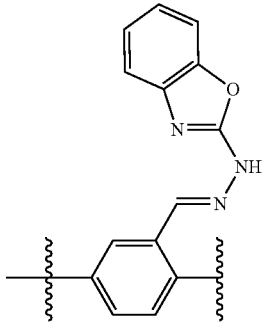

(VI-3)
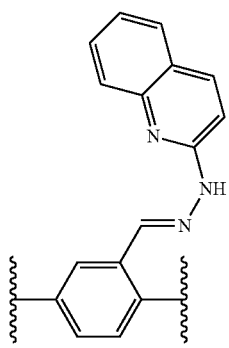
(VI-4)
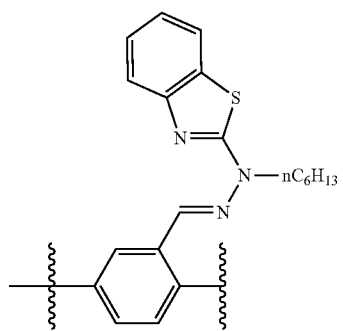
Ar =
(VI-5)
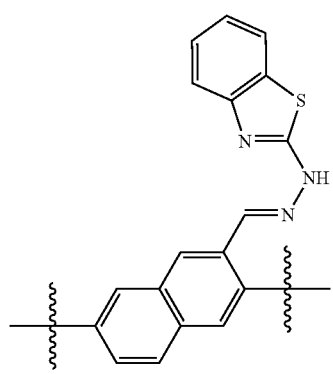
(VI-6)
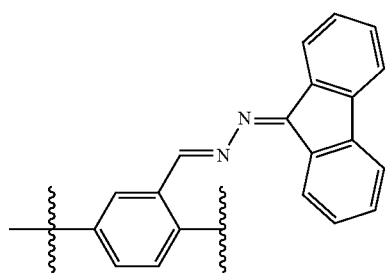
(VI-7)
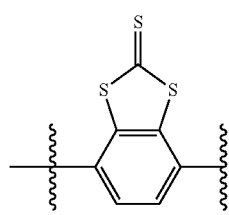
(VI-8)
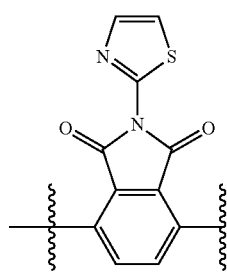
(VI-9)
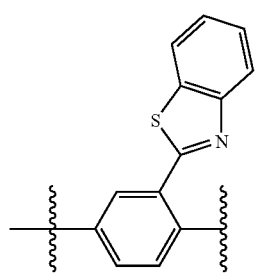

The liquid crystal compound of the present disclosure may be produced by a compound represented by General Formula 4 below to react with a compound represented by General Formula 5 below. That is, the method for producing a liquid crystal compound of the present disclosure is a method for producing a liquid crystal compound represented by General Formula 1 below, in which a compound represented by General Formula 4 below is caused to react with a compound represented by General Formula 5 below.

in General Formula 1 may be referred to with respect to preferred configurations of Ar.

Among the carboxylic acid compounds represented by General Formula 4, the carboxylic acid compound of the present disclosure represented by General Formula 7 below is that which spacer portions $T_1$ and $T_2$ of General Formula 1 are represented by General Formula 3, and is capable of producing the liquid crystal compound of the present dis- General Formula 1

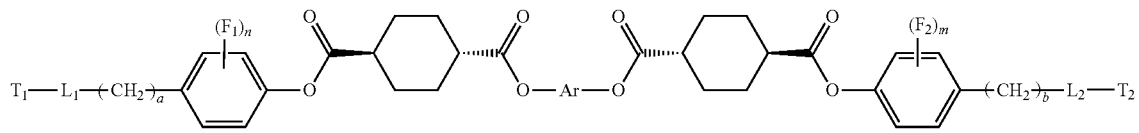

In the above formula, each of $L_1$ and $L_2$ independently represents a linking group having a carbonyl group; each of $F_1$ and $F_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4, and 1 or 2 are preferable for each; each of $T_1$ and $T_2$ independently represents a spacer portion including a straight chain or branched alkylene or alkylene oxide group having a carbon number within a range from 2 to 20; and Ar represents a divalent group having at least one aromatic ring selected from a group consisting of aromatic hydrocarbon rings and aromatic heterocycles, the number of Π electrons contained in the Ar group being 8 or greater.

closure. The carboxylic acid compound represented by General Formula 7 is a novel compound.

General Formula 7

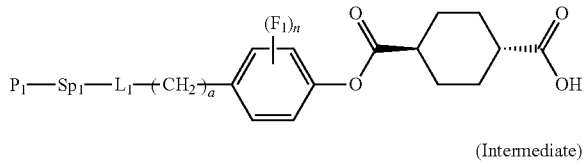

(Intermediate)

In the above formula, $L_1$ represents a linking group having a carbonyl group; $F_1$ is an alkyl group having a carbon number within a range from 1 to 4, an alkoxy group having a carbon number within a range from 1 to 4, or a halogen atom; n represents an integer within a range from 0 to 4; a represents an integer within a range from 1 to 4; $Sp_1$ represents a straight chain or branched alkylene group having a carbon number within a range from 2 to 20, one or two or more —CH2- not adjacent to each other in the alkylene group may be substituted by —O—, —S—, —C(=O)—, —OC(=O)—, —C(=O)O—, —OC(=O)O—, —NR$^1$C(=O)—, —C(=O)NR$^2$—, —OC(=O)NR$^3$—, —NR$^4$C(=O)O—, —SC(=O)— or —C(=O)S—; each of $R^1$, $R^2$, $R^3$ and $R^4$ independently represents a hydrogen atom, a halogen atom or an alkyl group having a carbon number within a range from 1 to 4; and $P_1$ represents a polymerizable group.

General Formula 4

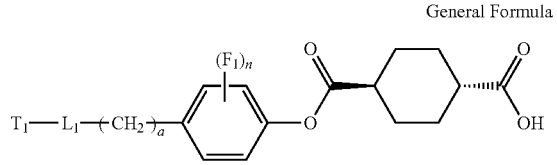

In the above formula, $L_1$ represents a linking group having a carbonyl group; $F_1$ is an alkyl group having a carbon number within a range from 1 to 4, an alkoxy group having a carbon number within a range from 1 to 4, or a halogen atom; n represents an integer within a range from 0 to 4; a represents an integer within a range from 1 to 4; and $T_1$ is a straight chain or branched alkylene group having a carbon number within a range from 2 to 20.

HO—Ar—OH      General Formula 5

In the above formula, Ar represents a divalent group having at least one aromatic ring selected from a group consisting of aromatic hydrocarbon rings and aromatic heterocycles, the number of Π electrons contained in the Ar group being 8 or greater. The description related to Ar shown The compound of General Formula (4), which is the above intermediate, may be obtained by esterifying a chain carboxylic acid having (4-hydroxyphenyl) alcohol and the spacer portion T1 or by esterifying isocyanate, then further esterifying with 1,4-cyclohexanedicarboxylic acid. Alternatively, the compound of General Formula (4) may be obtained by esterifying a chain alcohol having (4-hydroxyphenyl) carboxylic acid and the spacer portion T1, then further esterifying with 1,4-cyclohexanedicarboxylic acid.

<<Method for Producing an Optically Anisotropic Layer>>

A method for producing an optically anisotropic layer of the present disclosure comprises: spreading a composition containing a liquid crystal compound of the present disclosure or spreading a polymerizable composition containing a liquid crystal compound of the present disclosure, applying heat to orient the long axes of the molecules of the liquid crystal compound of the present disclosure, then curing the composition or the polymerizable composition.

In the method for producing an optically anisotropic layer of the present disclosure, it is preferable for the composition containing a liquid crystal compound of the present disclosure or the polymerizable composition containing a liquid crystal compound of the present disclosure to be spread on a substrate having a glass transition temperature greater than the orientation temperature of the liquid crystal compound of the present disclosure.

It is possible to apply a method similar to methods for producing an optically anisotropic layer using a common liquid crystal compound in the production of an optically anisotropic layer using a liquid crystal compound of the present disclosure.

An example of a method of producing an optically anisotropic layer using a common liquid crystal compound is that in which a composition comprising a liquid crystal compound is sealed in a gap or the like, and the oriented state is operated by heat, an electric field, pressure, etc. Another known method is that in which a polymerizable composition that contains a liquid crystal compound is spread on a substrate as a coating solution, an orienting process is administered, and then the liquid crystal compound itself or polymerizable components within the composition are polymerized and cured to fix the oriented state.

Hereinafter, the latter of the two methods above, in which a polymerizable composition that contains the liquid crystal compound of the present disclosure is spread, heat is applied to orient the long axes of the molecules of the liquid crystal compound of the present disclosure, and then the polymerizable composition is cured to fix the oriented state and to obtain an optically anisotropic layer will be described as an example of the production method.

"Polymerizable Composition"

The polymerizable composition used in the method for producing an optically anisotropic layer of the present disclosure is not particularly limited as long as it contains at least one liquid crystal compound of the present disclosure. However, in the case that the spacer portion $T_1$ or $T_2$ does not have a polymerizable group in General Formula 1, it is necessary to include other polymerizable compounds.

The polymerizable composition may include a polymerizable compound, an orientation controlling agent, arbitrary solvents, additives, etc., in addition to at least one liquid crystal compound of the present disclosure represented by General Formula 1. It is preferable for the content of polymerizable liquid crystal compound to be within a range from 50% by mass to 98% by mass of the total solid mass of the polymerizable composition, and more preferably a range from 70% by mass to 95% by mass.

(Polymerizable Compound)

A polymerizable compound which may be included in the polymerizable composition may or may not have liquid crystal properties. By adding the polymerizable compound, it is possible to control the physical properties of the polymerizable composition, such as the phase transition temperature and the crystalline properties. It is preferable for the polymerizable compound to have a high compatibility with the liquid crystal compound of the present disclosure, because the polymerizable compound is mixed with the liquid crystal compound of the present disclosure and handled as a polymerizable composition. Hereinbelow, preferred polymerizable compounds will be described.

((Non Liquid Crystal Polyfunctional Polymerizable Compounds))

Non liquid crystal polyfunctional polymerizable compounds are capable of functioning as a binder to fix the oriented state of the liquid crystal compound by polymerization and curing if added to the polymerizable composition, even in the case that the liquid crystal compound of the present disclosure does not have a polymerizable group. Furthermore, in the case that a smectic phase is to be adopted, layers will be linked by the non liquid crystal polyfunctional polymerizable compound. Therefore, the layers approaching each other can be suppressed.

Examples of such non-liquid polyfunctional polymerizable compounds include esters of polyhydric alcohol and (meth) acrylic acid (for example, ethylene glycol di (meth) acrylate, 1,4-cyclohexane diacrylate, pentaerythritol tetra (meth) acrylate, pentaerythritol tri (meth) acrylate, trimethylolpropane tri (meth) acrylate, trimethylolethane tri (meth) acrylate, dipentaerythritol tetra (meth) acrylate, dipentaerythritol penta (meth) acrylate, dipentaerythritol hexa (meth) acrylate, 1,2,3-cyclohexane tetramethacrylate, polyurethane polyacrylate, and polyester polyacrylate), vinyl benzene and derivatives thereof (for example, 1,4-divinylbenzene, 4-vinyl benzoic acid-2-acryloyl ethyl ester, and 1,4-divinyl cyclohexanone), vinyl sulfones (for example, divinyl sulfone), acrylamides (for example, methylenebisacrylamide) and methacrylamides, etc.

If the content of the non liquid crystal polyfunctional polymerizable compound in the polymerizable composition is excessively great, expression of the phase difference of the optically anisotropic layer will be diluted. Therefore, it is preferable for the content of the non liquid crystal polyfunctional polymerizable compound to be within a range from 0.1% by mass to 20% by mass as a solid content concentration, more preferably a range from 0.1% by mass to 10% by mass, particularly preferably a range from 0.1% by mass to 5% by mass, or preferably a range from 1% by mass to 20% by mass, more preferably a range from 1% by mass to 10% by mass, and particularly preferably a range from 1% by mass to 5% by mass.

(Polymerization Initiator)

It is preferable for a polymerization initiator to be included in the polymerizable composition, in order to polymerize and cure the liquid crystal compound of the present disclosure having a polymerizable group or the polymerizable compound which is added as a binder. Examples of polymerization reactions include a thermal polymerization reaction that employs a thermal polymerization initiator, a photopolymerization reaction that employs a photopolymerization initiator, and EB curing that employs an electron beam. Among these, the photopolymerization reaction is preferable. In the polymerizable composition, the content of the photopolymerization initiator is preferably within a range from 0.01% by mass to 20% by mass as a solid content concentration, and more preferably a range from 0.5% by mass to 5% by mass, relative to the total content of polymerizable compounds including the liquid crystal compound of the present disclosure having a polymerizable group and other polymerizable compounds.

(Orientation Controlling Agent)

The polymerizable composition may include an orientation controlling agent, if necessary. A low molecular weight orientation controlling agent or a polymer orientation controlling agent, for example, may be employed as the orientation controlling agent. The descriptions of paragraphs 0009-0083 of Japanese Unexamined Patent Publication No. 2002-020363, paragraphs 0111-0120 of Japanese Unexamined Patent Publication No. 2006-106662, and paragraphs 0021-0029 of Japanese Unexamined Patent Publication No. 2012-211306, for example, may be referred to with respect to the low molecular weight orientation controlling agent. The contents disclosed therein are incorporated into the present specification by reference. The descriptions of paragraphs 0021 to 0057 of Japanese Unexamined Patent Publication No. 2004-198511 and paragraphs 0121 to 0167 of Japanese Unexamined Patent Publication No. 2006-106662 may be referred to with respect to the polymer orientation controlling agent. The contents disclosed therein are incorporated into the present specification by reference.

It is preferable for the amount of the orientation controlling agent to be utilized to be within a range from 0.01% by mass to 10% by mass of the solid content of the liquid crystal composition of the present disclosure in the polymerizable composition, and more preferably within a range from 0.05% by mass to 5% by mass. A homogeneously oriented state, in which the liquid crystal compound of the present disclosure is oriented parallel to the surface of the layer, for example, may be achieved by using the orientation controlling agent.

(Additives)

In addition to the above, examples of additives that may be included in the polymerizable composition include a surfactant for controlling the surface texture and surface features, additives that control the angle of inclination of the liquid crystal compound (orientation aiding agent), an additive that decreases the orientation temperature (a plasticizer), and other agents that impart other functions and the like. Such additives may be employed as appropriate.

(Solvent)

To improve the production suitability when spreading the optically anisotropic layer, a solvent may be added to the polymerizable composition for the purpose of adjusting viscosity.

The solvent to be employed is not particularly limited as long as use of the solvent deteriorates the production suitability. It is preferable for the solvent to be at least one species selected from a group consisting of ketones, esters, ethers, alcohols, alkanes, toluene, chloroform, and methylene chloride. It is more preferable for the solvent to be at least one species selected from a group consisting of ketones, esters, ethers, alcohols, and alkanes, and particularly preferable for the solvent to be at least one species selected from a group consisting of ketones, esters, ethers, and alcohols.

The amount of solvent to be utilized is generally within a range from 50% by mass to 90% by mass as a concentration within the polymerizable composition. However, the amount of solvent to be utilized is not particularly limited.

[Spreading of Polymerizable Composition]

In the method for producing an optically anisotropic layer of the present disclosure, the above polymerizable composition is spread, heated to orient the long axes of the molecules of the liquid crystal compounds of the present disclosure, and then the polymerizable composition is cured, to fix the oriented state to obtain the optically anisotropic layer.

Although the method for spreading the polymerizable composition is not particularly limited, it is preferable for the polymerizable composition to be coated (including casting) on a substrate. In such a method, the substrate which is to be employed is not particularly limited. However, in order for the liquid crystal compound in the polymerizable composition which is spread on the substrate to obtain an oriented state, the polymerizable composition is heated to a phase transition temperature necessary for the liquid crystal compound of the present disclosure to achieve an oriented state. That is, heat is applied such that the polymerizable composition is greater than or equal to the orientation temperature. The substrate is heated to the same temperature, and therefore it is preferable for the substrate to be that which has a glass transition temperature greater than the orientation temperature of the liquid crystal compound of the present disclosure. If the glass transition temperature of the substrate is greater than the orientation temperature, it will be possible to prevent thermal deformation of the substrate due to by heating at the time of orientation.

In the case that the substrate is a temporary substrate from which the optically anisotropic layer is peeled off after it is formed, a material having a surface texture that facilitates peeling may be employed as the substrate. Such substrates include glass which has not undergone easy adhesion treatment and polyester films.

Alternatively, if the optically anisotropic layer is formed on a substrate and then employed as a laminate to be described later as is, optical film substrates formed by cellulose, cycloolefin, acrylic, polycarbonate, polyester, and polyvinyl alcohol, a liquid crystal cell substrate, or a polarizer may be favorably employed as the substrate.

[Orientation of Liquid Crystal Compound Molecules]

In the method for producing an optically anisotropic layer of the present disclosure, the long axes of the molecules of the liquid crystal compounds of the present disclosure within the polymerizable composition spread on the substrate are oriented to be in a desired oriented state. Here, the oriented state includes both the types of liquid crystal phases such as a nematic phase and a smectic phase, and the orientations of liquid crystal molecules necessary for display, such as twisted alignment, hybrid alignment, homeotropic orientation, and homogeneous orientation. The former is generally controlled by phase transition due to a change in temperature or pressure, the latter is generally controlled by orientation treatment.

(Orientation Treatment)

A common example of a method for orientation treatment is that which utilizes an orienting film to orient a liquid crystal compound in a desired direction. Examples of orienting films include rubbing treatment films formed by organic compounds such as polymers, obliquely deposited films of inorganic compounds, films having microgrooves, and films in which organic compounds such as co-tricosanoic acid, dioctadecyl methyl ammonium chloride, and methyl stearate are accumulated into LB films by the Langmuir Blodgett method. However, in the case that a laminating step of spreading the polymerizable composition is taken into consideration, a film which is formed by administering rubbing treatment onto the surface of a polymer layer, or a photo orienting film which is formed by administering a photo orientation treatment on the surface of a polymer layer are preferable. Note that the heat resistance of these orienting films is the same as the properties described with respect to the substrate.

Rubbing treatment is administered by rubbing the surface of a polymer layer in a fixed direction several times with paper or cloth. Polyimide, polyvinyl alcohol, polymers having a polymerizable group as disclosed in Japanese Unexamined Patent Publication No. 9(1997)-152509, and vertical orienting films as disclosed in Japanese Unexamined Patent Publication No. 2005-097377, Japanese Unexamined Patent Publication No. 2005-099228, and Japanese Unexamined Patent Publication No. 2005-128503 may be favorably employed as types of polymers which are utilized for the orienting film. Note that the vertical orienting film in the present disclosure refers to an orienting film that orients the long axes of the molecules of the liquid crystal compound of the present disclosure in a direction substantially perpendicular to the rubbing direction of the vertical orienting film. It is not necessary for the thickness of the orienting film to be thick if an orienting function can be provided. It is preferable for the thickness of the orienting film to be within a range from 0.01 µm to 5 µm, and more preferably within a range from 0.05 µm to 2 µm.

Alternatively, a so called photo orienting film, which is formed as an orienting film by irradiating polarized light or non polarized light onto a material having photo orienting properties may be employed. That is, a photo orienting material may be coated onto a substrate to produce a photo orienting film. Polarized light may be irradiated onto the photo orienting film from a vertical direction or an oblique direction, and non polarized light may be irradiated onto the photo orienting film from an oblique direction.

Photo orienting materials which may be employed in a photo orienting film to be utilized in the present disclosure are disclosed in numerous documents. Preferred examples of such photo orienting materials include the azo compounds disclosed in Japanese Unexamined Patent Publication Nos. 2006-285197, 2007-076839, 2007-138138, 2007-094071, 2007-121721, 2007-140465, 2007-156439, 2007-133184, and 2009-109831 as well as Japanese Patent Nos. 3883848 and 4151746, the aromatic ester compounds disclosed in Japanese Unexamined Patent Publication No. 2002-229039, the maleimide and/or alkenyl-substituted nadimide compounds having photo orientable units disclosed in Japanese Unexamined Patent Publication Nos. 2002-265541 and 2002-317013, the photo cross linkable silane derivatives disclosed in Japanese Patent Nos. 4205195 and 4205198, the photo cross linkable polyimide, polyamide, or ester disclosed in PCT Japanese Publication Nos. 2003-520878 and 2004-529220 as well as Japanese Patent No. 4162850, the photo dimerizable compounds disclosed in Japanese Unexamined Patent Publication No. 9(1997)-118717, PCT Japanese Publication No. 10(1998)-506420, PCT Japanese Publication No. 2003-505561, International Patent Publication No. 2010/150748, Japanese Unexamined Patent Publication No. 2013-177561, and Japanese Unexamined Patent Publication No. 2014-012823, and particularly cinnamate compounds, chalcone compounds, and coumarin compounds. The azo compounds, the photo cross linkable polyimide, polyamide, or ester, the cinnamate compounds, and the chalcone compounds are particularly preferable.

A particularly preferable specific example of the photo orienting material is the compound represented by Formula (X) below as disclosed in Japanese Unexamined Patent Publication No. 2006-285197.

group having a carbon number within a range from 1 to 6), a hydroxyalkyl group having a carbon number within a range from 1 to 4, or —$CONR^8R^9$ (each of $R^8$ and $R^9$ independently represents a hydrogen atom or a lower alkyl group having a carbon number of 1 to 6), or a methoxycarbonyl group. The carboxyl group may form an alkali metal salt. Each of $R^5$ and $R^6$ independently represents a carboxyl group, a sulfo group, a nitro group, an amino group, or a hydroxy group (the carboxyl group and the sulfo group may form an alkali metal salt). $X^1$ represents a single bond in the case that $R^1$ is a hydroxyl group and a linking group represented by -$(A^1-B^1)_m$— in the case that $R^1$ is a polymerizable group, $X^2$ represents a single bond in the case that $R^2$ is a hydroxyl group and a linking group represented by -$(A^2-B^2)_n$— in the case that $R^2$ is a polymerizable group. Here, $A^1$ binds to $R^1$ or $R^7$, $A^2$ binds to $R^2$ or $R^8$, and each of $B^1$ and $B^2$ bind to a phenylene group adjacent thereto. Each of $A^1$ and $A^2$ independently represents a single bond or a divalent hydrocarbon group, each of $B^1$ and $B^2$ independently represents a single bond, —O—, —CO—O—, —O—CO—, —CO—NH—, —NH—CO—, —NH—CO—O—, or —O—CO—NH—. Each of m and n independently represents an integer within a range from 0 to 4. However, in the case that m or n is 2 or greater, the plurality of $A^1$, $B^1$, $A^2$ and $B^2$ may be different or the same. However, $A^1$ or $A^2$ sandwiched between pairs of $B^1$ or $B^2$ are not single bonds.

In addition, by selecting the material for the orienting film, the orienting film may be peeled off from the optically anisotropic layer forming temporary substrate or only the optically anisotropic layer may be peeled off from the optically anisotropic layer forming temporary substrate. Thereby, a thin optically anisotropic layer having a thickness of several m may be provided, by laminating the transferred, that is, peeled off, optically anisotropic layer. Further, an aspect in which a rubbing orienting film or a photo orienting film is coated and laminated directly onto a linear polarizer, and a rubbing or photo orientation treatment is administered to impart an orienting function is also preferable. That is, the laminate of the disclosure may be a laminate having a linear polarizer and a photo orienting film or a rubbing orienting film provided on the surface of the linear polarizer.

In the optically anisotropic layer obtained by homogeneously orienting the liquid crystal compound of the present disclosure represented by General Formula 1, it is preferable for a pre-tilt angle to be low. High contrast with reduced

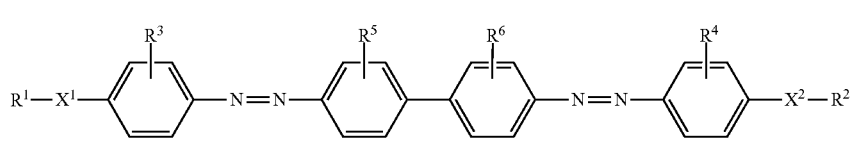

(X)

In the above formula, each of $R^1$ and $R^2$ independently represents a hydroxyl group, or a polymerizable group selected from a group consisting of a (meth) acryloyl group, a (meth) acryloyloxy group, a (meth) acrylamide group, a vinyl group, a vinyloxy group and a maleimide group. Each of $R^3$ and $R^4$ independently represents a hydrogen atom, a halogen atom, a carboxyl group, a halogenated methyl group, a halogenated methoxy group, a cyano group, a nitro group, —$OR^7$ (where $R^7$ is a lower alkyl group having a carbon number within a range from 1 to 6, a cycloalkyl group having a carbon number within a range from 3 to 6, or a lower alkyl group having a carbon number within a range from 1 to 6 which is substituted with lower alkoxy forward light leakage and favorable viewing angle dependence in which oblique color shifting is reduced can both be achieved by utilizing a photo orienting film as the orienting film and applying it to eh IPS mode. Therefore, an aspect in which a photo orienting film as the orienting film is preferable. In the photo orienting film, an aspect in which an orientation regulating force is imparted by irradiating polarized light from a vertical direction or an oblique direction with respect to the photo orienting film, or by irradiating non polarized light from an oblique direction with respect to the photo orienting film, is preferable. The oblique direction in the case that light is irradiated from an oblique direction is preferably a direction at an angle within a range from 5 degrees to 45 degrees with respect to the photo orienting film, and more preferably a direction at an angle within a range from 10 degrees to 30 degrees. It is preferable for the irradiation dosage of irradiated ultraviolet rays to be within a range from 200 mJ/cm$^2$ to 2000 mJ/cm$^2$.

Note that in the optically anisotropic layer obtained by the liquid crystal compound of the present disclosure is homeotropic orientation of General Formula 1 can be obtained and a vertical orientation film, a desired alignment state by using a vertical orientation agent. Paragraphs Japanese Unexamined Patent Publication No. 2002-294240 is the vertical orientation film [0081]-[0082] can refer to like Japanese Unexamined Patent Publication No. 2006-106662 paragraphs [0083]-[0084] for a vertical orientation agent.

(Control of Phase Transition)

As described previously, the liquid crystal phase of liquid crystal compounds can generally be caused to transition by a change in temperature or pressure. In the case of a liquid crystal having a lyotropic property, transitions can also be caused by the volume of a solvent. In the present disclosure, it is preferable for phase transition due to temperature change to be adopted, taking the operation of fixing an oriented state of liquid crystals having thermotropic properties.

Hereinafter, a case of fixing the state of a smectic phase of a homogeneous orientation will be described as an example.

The temperature range in which a liquid crystal compound expresses a nematic phase is generally higher than the temperature range in which a liquid crystal compound exhibits a smectic phase, which has a higher degree of order. Therefore, it is preferable for a liquid crystal compound to be heated to a temperature range in which the liquid crystal compound exhibits a nematic phase, and then to cause a transition from the nematic phase to the smectic phase, by decreasing the temperature of the liquid crystal compound to a temperature range in which the liquid crystal compound expresses a smectic phase.

The liquid crystal compound of the present disclosure represented by General Formula 1, has high free movement properties of end-chain aliphatic groups due to the structure thereof. The phase transition temperature decreases in order to express appropriate molecular interactions having an appropriate amount of steric hindrance. It is preferable for the temperature at which the liquid crystal compound of the present disclosure transitions from a smectic phase to a nematic phase to be 160° C. or less, more preferably 150° C. or less, and particularly preferably 140° C. or less. The lower limit of the temperature at which the transition from a smectic phase to a nematic phase occurs is not particularly limited. However, generally this temperature is 20° C. or greater.

It is preferable for the phase transition temperature to be lower, because the selection of materials which are to be employed for substrates and orienting layers becomes wider as the phase transition temperature is lower.

Here, the temperature at which the compound transitions from the smectic phase to the nematic phase may be easily measured by observation of the composition employing polarized light microscopy. For example, in the nematic phase, a schlieren texture specific to the nematic phase is observed, while the texture transitions to a focal conic fan texture in a smectic A phase. Therefore, the phase transition temperature can be measured by observing the textures with a polarizing microscope while increasing or decreasing the temperature.

It is necessary to heat a liquid crystal compound for a certain amount of time within the temperature range in which the liquid crystal compound expresses the nematic phase until the liquid crystal compound forms a mono domain. The heating time is preferably within a range from 10 seconds to 20 minutes, more preferably within a range from 10 seconds to 10 minutes, and most preferably within a range from 10 seconds to 5 minutes.

It is necessary to heat a liquid crystal compound for a certain amount of time within the temperature range in which the liquid crystal compound expresses the smectic phase until the liquid crystal compound expresses the smectic phase. The heating time is preferably within a range from 10 seconds to 20 minutes, more preferably within a range from 10 seconds to 10 minutes, and most preferably within a range from 10 seconds to 5 minutes.

By employing a liquid crystal compound that expresses a higher order smectic phase simultaneously as the nematic phase as the liquid crystal compound of the present disclosure, the nematic phase will differ from a normal nematic phase, and may be a nematic phase having a small amount of light scattering components and is capable of realizing high contrast. This feature will be conspicuously achieved, particularly by employing the liquid crystal compounds of the present disclosure represented by Chemical Formulae I-1 through I-14 and II-8 through II-10.

Accordingly, a preferable aspect of the present disclosure is that in which the liquid crystal compound is heated within a temperature range in which the nematic phase is expressed to form a mono domain, and then fixed. It was found that a phase difference which is produced in such an aspect obtains contrast which is significantly higher than a phase difference which is produced in a liquid crystal compound that only expresses a normal nematic phase.

It is necessary to heat a liquid crystal compound for a certain amount of time within the temperature range in which the liquid crystal compound expresses the nematic phase until the liquid crystal compound forms a mono domain. The heating time is preferably within a range from 10 seconds to 20 minutes, more preferably within a range from 10 seconds to 10 minutes, and most preferably within a range from 10 seconds to 5 minutes.

In addition, in the case that a composition that transitions in order from the smectic phase, the nematic phase, to the isotropic phase according to increases in temperature is employed, a transition from the nematic phase to the smectic phase will become possible by heating the polymerizable composition to a temperature greater than or equal to the nematic phase-isotropic phase transition temperature, and then gradually decreasing the temperature to the smectic phase-nematic phase transition temperature or less, or the smectic phase-isotropic phase transition temperature or less at a predetermined speed. It is preferable for the temperature after cooling to be 10° C. or more lower than the smectic phase-nematic phase transition temperature or the smectic phase-isotropic phase transition temperature. It is preferable for the cooling speed to be within a range from 1° C./minute to 100° C./minute, and more preferably to be within a range from 5° C./minute to 50° C./minute. If the cooling speed is excessively fast, orientation defects will occur, and if the cooling speed is excessively slow, a longer amount of time will be required for production.

In addition, the present disclosure may control the tilt angle of the optically anisotropic layer by tilting the molecules of the liquid crystal compound in a state in which the primary structure of the smectic phase is separated to an appropriate degree.

Examples of means for controlling the tilt angle of the liquid crystal compound include imparting a pre tilt angle with an orienting film in which rubbing conditions are controlled and controlling the polar angle at the side of the substrate or at the side of an air interface by adding a tilt angle controlling agent to the liquid crystal layer. It is preferable for these methods to be used in combination.

The tilt angle controlling agent may be a copolymer of fluoro aliphatic group containing monomers as an example. It is preferable for a copolymer of an aromatic condensed ring functional group, or a copolymer of a monomer containing a carboxyl group, a sulfo group or a phosphonoxy group or a salt thereof to be employed. In addition, more accurate and stable control will be enabled by using a plurality of tilt angle controlling agents. The descriptions of paragraphs 0022 through 0063 of Japanese Unexamined Patent Publication No. 2008-257205 and the descriptions of paragraphs 0017 through 0124 of Japanese Unexamined Patent Publication No. 2006-091732 may be referred to with respect to such tilt angle controlling agents.

[Fixing Oriented State]

Fixing the oriented state can be carried out by polymerization using thermal polymerization or active energy rays. Polymerizable groups and polymerization initiators which are suitable for the polymerization process may be selected as appropriate. Taking production suitability into consideration, it is preferable for a polymerization reaction caused by irradiating ultraviolet rays to be employed. If the irradiation dosage of ultraviolet rays is small, the polymerizable liquid crystal and the other polymerizable compounds may remain unpolymerized, which will be a factor that causes changes in optical properties due to temperature and deterioration over time.

Therefore, it is preferable to determine irradiation conditions such that the percentage of polymerizable liquid crystals that remain will be 5% or less. Although such irradiation conditions depend on the formulation of the polymerizable composition and the film thickness of the optically anisotropic layer, it is preferable for the irradiation dosage to be 200 mJ/cm$^2$ or greater.

<<Applications of Optically Anisotropic Layer>>

The optically anisotropic layer of the present disclosure has reverse wavelength dispersing properties. Therefore, color shifts and the like are not likely to occur, and the optically anisotropic layer of the present disclosure is effective as an optically compensating film for optically compensating liquid crystal cells, and also as a wavelength plate for preventing reflection of external light in an organic EL display device. Because the phase transition temperature is low and solubility with respect to solvents is high, the optically anisotropic layer of the present disclosure can be applied to organic materials which have poor heat resistance. Lamination of the optically anisotropic layer is possible without temporarily peeling and transferring the optically anisotropic layer after it is formed. Therefore, shortening of production steps can also be expected.

Furthermore, if the optically anisotropic layer is that in which a smectic phase is fixed, high phase difference expressing properties and depolarizing properties are low due to the high orientation order properties of liquid crystal compounds derived from the smectic phase. Therefore, the optically anisotropic layer may be favorably employed in various applications due to these high contrast properties.

In addition, the aspects in which the optically anisotropic layer of the present disclosure is to be utilized are not particularly limited. An aspect in which a rubbing process is administered on a liquid crystal cell substrate or a polarizer and the optical anisotropic layer is formed directly on the liquid cell substrate or the polarizer is possible. Alternatively, an aspect in which the optically anisotropic layer is laminated with or adhesively attached to a polymeric film or other optical films, to form a laminate of which the optical/mechanical properties are controlled is also possible.

As described above, the optically anisotropic layer of the present disclosure is obtained employing a liquid crystal compound that exhibits reverse dispersing properties which has a lower phase transition temperature necessary for liquid crystal orientation and higher solubility in solvents compared to conventional liquid crystal compounds. Accordingly, it is possible for the present disclosure to provide an optically anisotropic layer having reverse wavelength dispersing properties and superior production suitability.

[Laminate, Polarizing Plate, and Display Device]

The optically anisotropic layer of the present disclosure may be employed as a laminate, by being laminated directly or being transferred onto various other optical members. For example, the optically anisotropic layer may be used as a wavelength plate, a polarization beam splitter, etc. by being laminated onto a glass substrate. An aspect in which the optically anisotropic layer is laminated onto a resin film directly or via an orienting film is preferable. As will be described later, a laminate in which the optically anisotropic layer is laminated onto a polarizer directly or via an orienting film is favorably suited as a polarizing plate.

Figure 2:
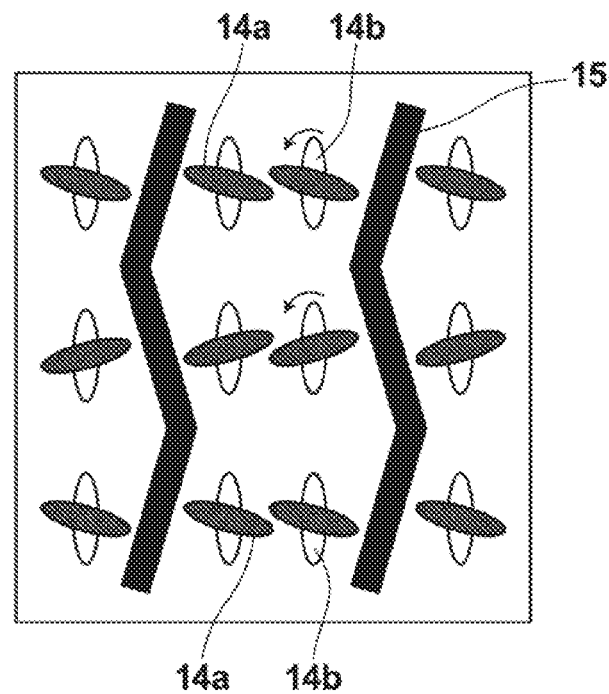
FIG. 2 is a schematic plan view of a portion of pixel electrodes of the inner surface of a substrate of an IPS type liquid crystal cell.
Figure 3:
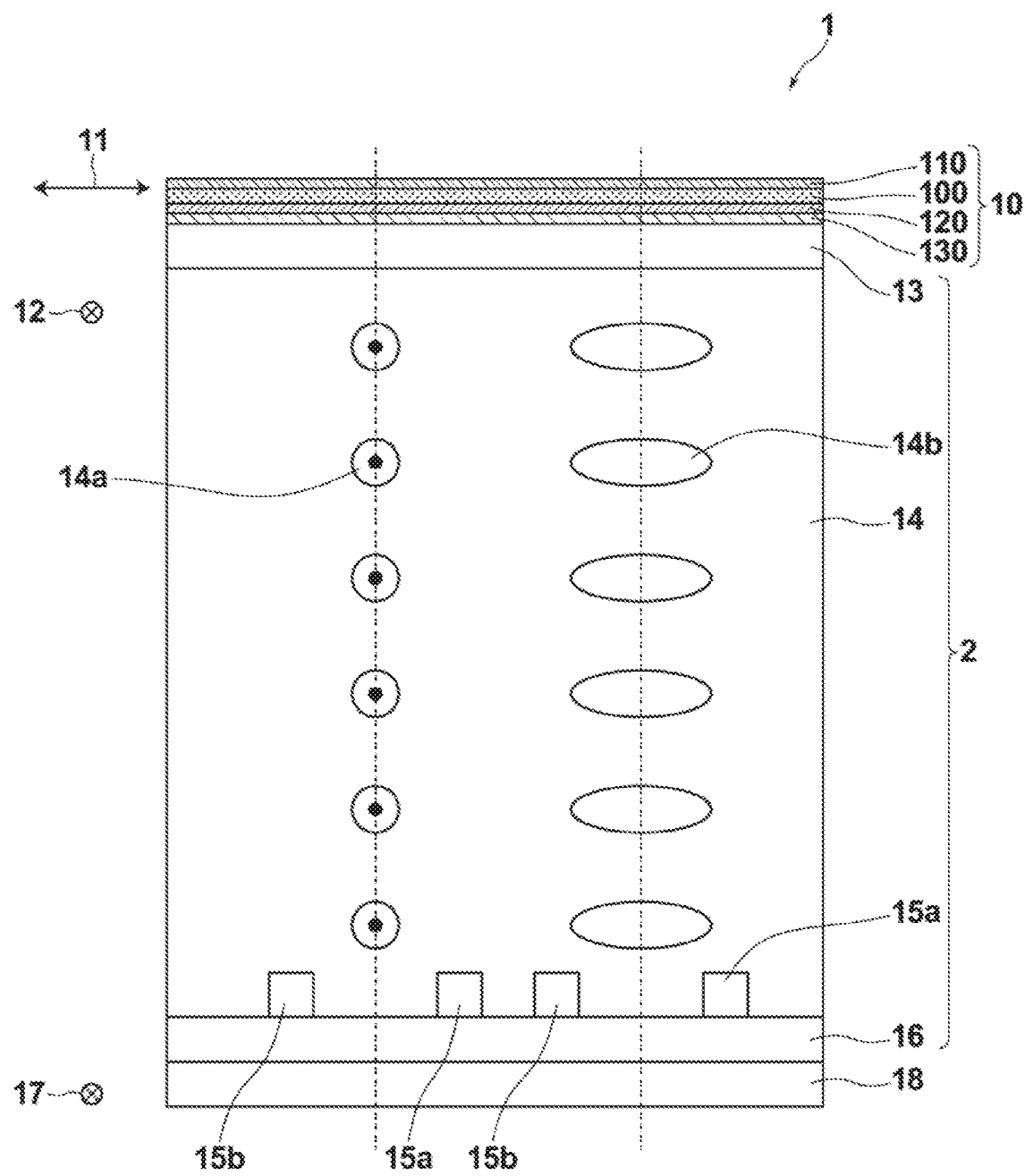
FIG. 3 is a schematic sectional view of an IPS type liquid crystal display device having a polarizing plate according to an embodiment of the present disclosure.

Hereinafter, a laminate, a polarizing plate, and a display device according to embodiments of the present disclosure will be described with reference to the drawings. FIG. 1 is a schematic sectional view illustrating the configuration of a polarizing plate (laminate) 10 according to an embodiment of the present disclosure. FIG. 2 is a schematic plan view of a portion of pixel electrodes of the inner surface of a substrate of an IPS type liquid crystal cell. FIG. 3 is a schematic sectional view of an IPS type liquid crystal display device 1 equipped with the polarizing plate 10 of the embodiment of the present disclosure. Note that in the drawings of the present specification, the scales of the components are changed and illustrate to facilitate visual recognition.

As illustrated in FIG. 1, the polarizing plate (laminate) 10 is equipped with a polarizing plate protective film 110 on the surface of a polarizer 100 toward the viewing side, a polarizing plate protective film 120 on the surface on the surface of the polarizer 100 toward the liquid crystal cell side, and an optically anisotropic layer 130 of the present disclosure on the surface of the polarizing plate protective film 120 toward the liquid crystal cell side.

The polarizer 100 is not particularly limited, and any of an iodine based polarizer, a dye based polarizer that employs a dichroic dye, and a polyene based polarizer may be utilized. An iodine based polarizer and a dye based polarizer iodine can generally be produced by immersing a polyvinyl alcohol based film in an iodine solution and then stretching the film.

The polarizing plate protective films 110 and 120 are protective films for suppressing the deterioration of the polarizer 100. It is preferable for the polarizing plate protective films 110 and 120 to be films having low moisture permeability. The polarizing plate protective films 110 and 120 are not particularly limited. However, it is preferable to select a polymer film from among the examples which may be utilized as the substrate above. One preferred example of a polarizing plate protective film is a cellulose acylate film such as triacetyl cellulose film.

If a homogenously oriented optically anisotropic layer of the present disclosure is laminated onto a linear polarizer as an optically anisotropic layer 130, it is preferable for the angle formed by the slow axis of the optically anisotropic layer and the absorption axis of the straight polarizer to be within a range from 45°±10° to 90°±10° and more preferably within a range from 45° to 90°.

As described above, the optically anisotropic layer 130 is an optically anisotropic layer having reverse wavelength dispersing properties property and superior production suitability. Therefore, it can be preferably utilized in display devices that employ phase differences. Examples of applications include an aspect in which the optically anisotropic layer 130 is utilized as an optically compensating film for a liquid crystal display device, and an aspect in which the optically anisotropic layer 130 is utilized as an antireflection layer that employs a circularly polarizing plate of an organic EL display device.

It is preferable for the driving mode of liquid crystal cells in a liquid crystal display device to be the TN mode, the VA mode, the OCB mode, the IPS mode, or the ECB mode, and more preferably the IPS mode. It is particularly preferable for the driving mode to be the IPS mode utilizing optical orientation.

As illustrated in FIG. 2, liquid crystal cells of the IPS mode, is a mode for liquid crystal molecules 14a and 14b are constantly rotated in the plane of a substrate. Pixel electrodes 15 are provided only in one direction of a substrate, and apply a lateral electric field. A relatively wide viewing angle can be obtained in the IPS type, because the liquid crystal molecules do not rise obliquely. However, in the case that a display device is viewed from a direction shifted from a direction normal to the substrate, a phenomenon that the viewing angle is narrowed by light leakage cannot be avoided. The optically anisotropic layer 130 of the present embodiment is suitable as an optically anisotropic layer that compensates for such a phenomenon.

In the case that the optically anisotropic layer 130 is employed in a liquid crystal display device, it is preferable for the optically anisotropic layer 130 to be disposed between the liquid crystal cell and a polarizing plate toward viewers or between the liquid crystal cell and the polarizing plate toward the backlight. Alternatively, the optically anisotropic layer 130 may be incorporated within the liquid crystal device as a part of a polarizing plate and provided between the liquid cell and a polarizer, such that it also functions as a protective film of the polarizing plate toward viewers or the polarizing plate toward the backlight.

In the case that the optically anisotropic layer 130 is utilized to optically compensate liquid crystal cells of the IPS mode (in particular, color shift reduction in the oblique direction when displaying black), the optically anisotropic layer 130 may be used in combination with a positive A plate.

The liquid crystal display device 1 illustrated in FIG. 3 is an example of a transmissive IPS type liquid crystal display device which is equipped with the optically anisotropic layer 130 of the present embodiment, in which the optically anisotropic layer 130 is provided on the surface of a liquid crystal cell toward the side of a polarizing plate toward viewers. The liquid crystal display device 1 includes a pair of polarizing plates (an upper polarizing plate 10 and a lower polarizing plate 18), a liquid crystal cell 2 sandwiched between the polarizing plates. The liquid crystal cell 2 has a liquid crystal layer 14, a liquid cell upper substrate 13 provided above the liquid crystal layer 14, and a liquid crystal cell lower substrate 16 provided beneath the liquid crystal layer 14. The lower substrate 16 is equipped with transparent pixel electrodes 15a and 15b. Although not shown in FIG. 3, a back light unit is provided under the polarizing plate 18, and a color filter is provided between the liquid crystal layer 14 and the polarizing plate 10 toward viewers.

The left side of FIG. 3 illustrates a state in which liquid crystal molecules 14a are in a voltage OFF state, and the right side of FIG. 3 illustrates a state in which liquid crystal molecules 14b are in a voltage ON state. When voltage is turned ON, a voltage is applied between the pixel electrodes 15a and 15b and an electric field is generated, the liquid crystal molecules 14a rotate substantially simultaneously in a direction substantially horizontal with respect to the surface of the substrate, and assume the state illustrated at the right side of FIG. 3. In FIG. 3, the absorption axis 17 of the polarizing plate 18 toward the backlight and the direction 11 of the axes of the liquid crystal molecules of the polarizing plate 10 toward viewers are substantially perpendicular to each other. When voltage is turned OFF, the direction 12 of the axes of the liquid crystal molecules is substantially parallel to the absorption axis 17.

In the present embodiment, it is preferable for retardation layers other than the optically anisotropic layer 130 to not be present between the polarizing plate toward a display surface and the liquid cell, as well as between the polarizing plate toward the backlight and the liquid cell. Accordingly, it is preferable for isotropic polymer films in which both the in plane phase difference Re and the phase difference Rth in the thickness direction are approximately zero to be employed as the polarizing plate protective films 110 and 120. A cellulose acylate film such as that disclosed in Japanese Unexamined Patent Publication No. 2006-030937 may be favorably employed as such a polymer film.

The optically anisotropic layer 130 is an optically anisotropic layer of the present disclosure, which is obtained employing a liquid crystal compound that exhibits reverse dispersing properties having a lower phase transition temperature necessary for liquid crystal orientation and higher solubility in solvents compared to conventional liquid crystal compounds. Therefore, the polarizing plate 10 and the liquid crystal display device 1 are provided with an optically anisotropic layer having reverse wavelength dispersing properties, and less influence is exerted on display characteristics due to the difference in wavelengths of transmitted light.

EXAMPLES

The characteristic features of the present disclosure will be described in greater detail by Examples and Comparative Examples below. The materials, amounts, ratios, processing contents, processing procedures and the like shown in connection with the following examples may be appropriately changed within a scope that does not depart from the spirit of the disclosure.

Accordingly, the disclosure should not be interpreted as being limited by the Examples below.

Example 1

Compound (I-1) was synthesized according to the following scheme.

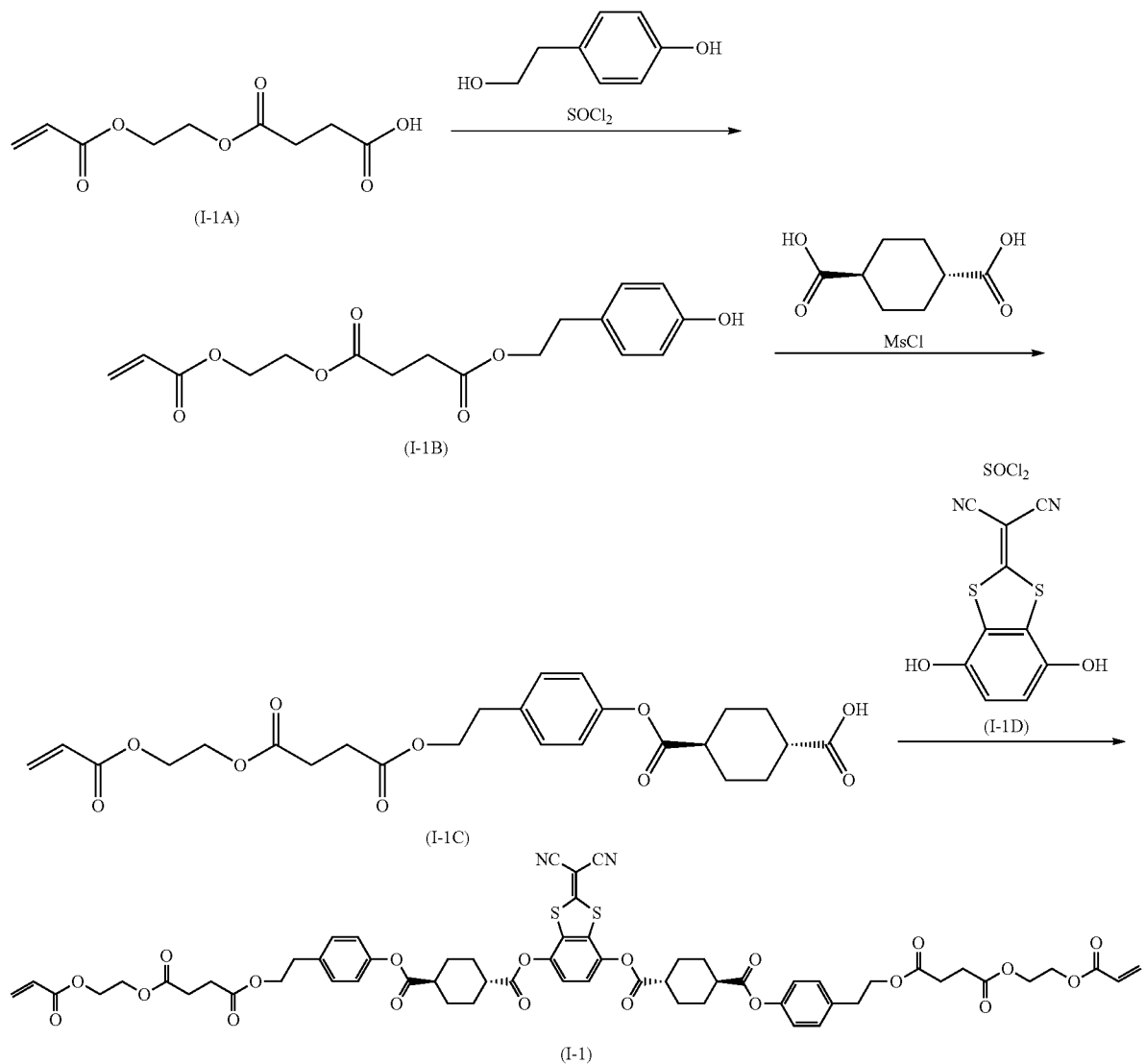

<Synthesis of Compound (I-1B)>

182 g (839 mmol) of succinic acid mono (2-acryloyloxyethyl) (I-1A), 600 mL of ethyl acetate, 150 mL of N,N-dimethylacetamide, and 680 mg of 2,6-di-t-butyl-4-methylphenol were mixed, and the internal temperature was cooled to 5° C. 642 mL (879 mmol) of thionyl chloride was dropped into the mixture in a manner such that the internal temperature did not become 10° C. or greater. After stirring for 1 hour at 5° C., 220 ml of an ethanol N-dimethylacetamide solution containing 111 g (800 mmol) of N 2-(4-hydroxyphenyl) was added. Then, after stirring for 12 hours at room temperature, 400 mL of water was added to carry out liquid separation. A collected organic layer was cleansed with 1N hydrochloric acid, a saturated aqueous sodium bicarbonate solution, and a saturated saline solution, then dried with anhydrous sodium sulfate. The sodium sulfate was filtered out and the solvent was removed by a rotary evaporator to obtain 255 g (758 mmol) of Compound (I-1B) as a clear oil (95% yield).

$^1$H-NMR (solvent: CDCl$_3$) δ (ppm): 2.63 (t, 4H), 2.85 (t, 2H), 4.25 (t, 2H), 4.28-4.40 (m, 4H), 5.75 (br s, 1H), 5.86 (dd, 1H), 6.14 (dd, 1H), 6.45 (dd, 1H), 6.78-6.80 (m, 2H), 7.02-7.10 (m, 2H)

<Synthesis of Compound (I-1C)>

305 g (1.77 mol) of 1,4-trans-cyclohexane dicarboxylic acid, 74.2 g (648 mmol) of methane sulfonic acid chloride (MsCl), 576 mL of tetrahydrofuran, and 576 mL of N,N-dimethylacetamide were mixed at room temperature. 72 g (708 mmol) of triethylamine was dropped into the mixture in a manner such that the internal temperature did not become 30° C. or greater, and then the mixture was stirred for 2 hours at room temperature. 50 mL of a tetrahydrofuran solution containing including 198 g (589 mmol) of Compound (I-1B) and 12 mg of 2,6-di-t-butyl-4-methyl phenol was added to this reaction solution. Then, after adding 1.4 g (11 mmol) of N,N-dimethylaminopyridine, 72 g (708 mmol)

of triethylamine was dropped to the mixture in a manner such that the internal temperature did not become 30° C. or greater. After that, the mixture was stirred for 12 hours at room temperature, and the reaction was stopped by the addition of 57 mL of water. The resulting reaction solution was dropped into 5.7 L of a 1.8 wt % aqueous sodium bicarbonate solution, and precipitated solids were collected by filtration. The resulting solids were mixed with 1.6 L of methanol, 1.9 L of water was added, and precipitated solids were collected by filtration again. After drying, the resulting solid was dissolved in 1.6 L of ethyl acetate. 1.9 L of hexane was slowly added to the resulting solution, and recrystallized to become 202 g of a white solid (I-1C) by collecting precipitated crystals by filtration (70% yield). At this time, a diester of cyclohexanedicarboxylic acid remains as an impurity, but the impurity can be removed by the next step, and therefore the compound (I-1C) was utilized in the next step as a mixture.

$^1$H-NMR (solvent: CDCl$_3$) δ (ppm): 1.40-1.73 (m, 4H), 2.08-2.31 (m, 4H), 2.31-2.45 (m, 1H), 2.45-2.70 (m, 1H), 2.63 (m, 4H), 2.93 (t, 2H), 4.29 (t, 2H), 4.29-4.40 (m, 4H), 5.86 (dd, 1H), 6.15 (dd, 1H), 6.44 (dd, 1H), 6.95-7.05 (m, 2H), 7.17-7.25 (m, 2H)

<Synthesis of Compound (I-1D)>

Synthesis of Compound (I-1D) was performed according to the method disclosed in D. Sun et al., "Benzoquinone derived 1,3-dithiole-2-ones and thiones", Journal of Chemical Crystallography, Vol. 27, No. 9, pp. 515-526, 1997.

<Synthesis of Compound (I-1)>

92.0 g (188 mmol) of Compound (I-1C), 560 mL of ethyl acetate, 140 mL of N,N-dimethylacetamide, and 910 mg of 2,6-di-t-butyl-4-methylphenol were mixed at room temperature, and the internal temperature was cooled to 5° C. 18 mL (248 mmol) of thionyl chloride was dropped into the mixture in a manner such that the internal temperature did not become 10° C. or greater. After stirring for 1 hour at 5° C., 30.3 mL (174 mmol) of N,N-diisopropylethylamine was added. Then, after adding 190 mL of a tetrahydrofuran solution containing 19.6 g (79 mmol) of the compound (I-D) and 1.4 g (11 mmol) of N,N-dimethylaminopyridine, 67 mL (385 mmol) of N,N-diisopropylethylamine was dropped into the mixture in a manner such that the internal temperature did not become 10° C. or greater. Then, after stirring at room temperature for 3 hours, 650 mL of water and 800 mL of ethyl acetate were added to stop the reaction and to carry out liquid separation. A collected organic layer was cleansed with 1N hydrochloric acid, a saturated aqueous sodium bicarbonate solution, and a saturated saline solution, then dried with anhydrous sodium sulfate. The sodium sulfate was filtered out, the solvent was removed by a rotary evaporator, and recrystallization was performed with 110 mL of ethyl acetate and 200 mL of methanol, to obtain 85.0 g of Compound (I-1) (90% yield).

$^1$H-NMR (solvent: CDCl$_3$) δ (ppm): 1.50-1.80 (m, 8H), 2.20-2.45 (m, 8H), 2.50-2.75 (m, 4H), 2.65 (s, 8H), 2.93 (t, 4H), 4.30 (t, 4H), 4.25-4.40 (m, 8H), 5.84 (dd, 2H), 6.14 (dd, 2H), 6.44 (dd, 2H), 6.95-7.05 (m, 4H), 7.17-7.26 (m, 4H), 7.32 (s, 2H)

Example 2

Compound (I-2) was synthesized according to the following scheme.

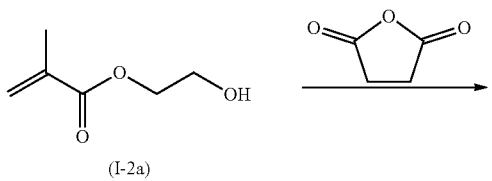

(I-2a)

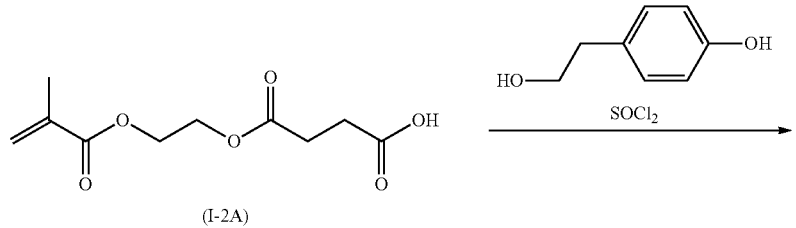

(I-2A)

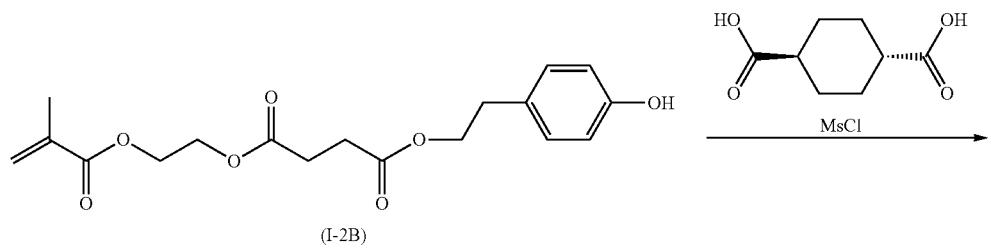

(I-2B)

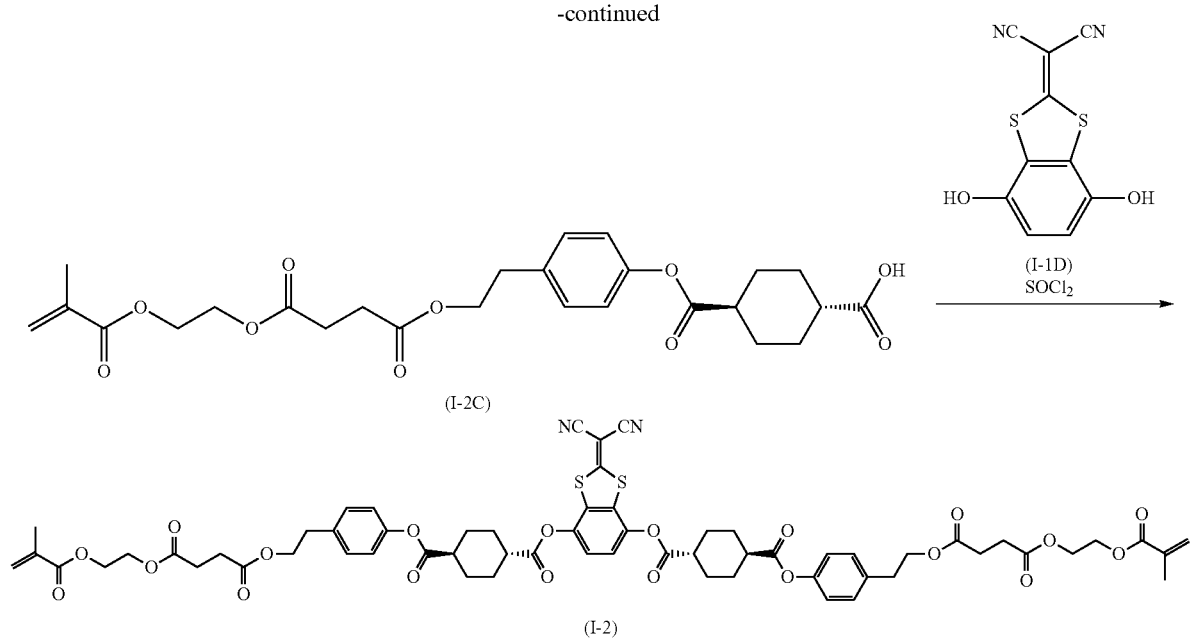

<Synthesis of Compound (I-2A)>

40 g (307 mmol) of 2-hydroxyethyl methacrylate (I-2a), 300 mL of dichloromethane, 3.8 g (30.7 mmol) of N,N-dimethylaminopyridine, 33.8 g (338 mmol) of succinic anhydride, and 200 mg of 2,6-di-t-butyl-4-methylphenol were mixed and the internal temperature was heated to 40° C. After stirring for 12 hours, the mixture was cooled to room temperature, 300 mL of water was added, and the mixture was stirred for 1 hour to carry out liquid separation. A collected organic layer was cleansed with 1N hydrochloric acid and a saturated saline solution, and dried with anhydrous sodium sulfate. The sodium sulfate was filtered out and the solvent was removed by a rotary evaporator, to obtain 64 g (278 mmol) of Compound (I-2A) as a clear oil (91% yield).

<Synthesis of Compound (I-2B)>

30 g (130 mmol) of Compound (I-2A), 50 mL of ethyl acetate, 15 mL of N,N-dimethylacetamide, and 100 mg of 2,6-di-t-butyl-4-methylphenol were mixed, and the internal temperature was cooled to 5° C. 10.0 mL (137 mmol) of thionyl chloride was dropped into the mixture in a manner such that the internal temperature did not become 10° C. or greater. After stirring for 1 hour at 5° C., 100 mL of an N-dimethylacetamide solution that contains 18.0 g (130 mmol) of N 2-(4-hydroxyphenyl) ethanol was added to the mixture. Then, after stirring for 12 hours at room temperature, 100 mL was added to carry out liquid separation. The collected organic layer was cleansed with 1N hydrochloric acid, saturated aqueous sodium bicarbonate solution, and a saturated saline solution, then dried with anhydrous sodium sulfate. The sodium sulfate was filtered out and the solvent was removed by a rotary evaporator, to obtain 44.1 g (126 mmol) of Compound (I-2B) as a clear oil (97% yield).

<Synthesis of Compound (I-2C)>

14.7 g (85.6 mol) of 1,4-trans-cyclohexane dicarboxylic acid, 3.60 g (31.4 mmol) of methane sulfonic acid chloride, 28 mL of tetrahydrofuran, and 28 mL of N,N-dimethylacetamide were mixed at room temperature. 3.2 g (31.6 mmol) of triethylamine was dropped into the mixture in a manner such that the internal temperature did not become 30° C. or greater, and then stirred for 2 hours at room temperature. 10 mL of a tetrahydrofuran solution containing 10 g (28.5 mmol) of compound (I-1B) and 50 mg of 2,6-di-t-butyl-4-methyl phenol were added to the reaction mixture. Then, after adding 171 mg (1.4 mmol) of N,N-dimethylaminopyridine, 3.2 g (31.6 mmol) of triethylamine was dropped into the mixture in a manner such that the internal temperature did not become 30° C. or greater. Thereafter, the mixture was stirred for 12 hours at room temperature, and then 7 mL of water was added to stop the reaction. The resulting reaction solution was dropped into 275 mL of 1.8 wt % sodium bicarbonate water, and precipitated solids were collected by filtration. The resulting solid was mixed with 80 mL of methanol, then 92 mL of water was added, and precipitated solids were collected by filtration again. The resulting solid was dried and dissolved in 80 mL of ethyl acetate. 92 mL of hexane was slowly added to the resulting solution, and recrystallized to obtain a 9.8 g (19.4 mmol) of a white solid (I-2C) (68% yield) by collecting precipitated crystals by filtration. Here, the diester of cyclohexanedicarboxylic acid remains as an impurity but the impurity can be removed by the next step, and therefore the compound (I-2C) was utilized in the next step as a mixture.

$^1$H-NMR (solvent: CDCl$_3$) δ (ppm): 1.40-1.73 (m, 4H), 1.95 (s, 3H), 2.08-2.31 (m, 4H), 2.31-2.45 (m, 1H), 2.45-2.70 (m, 1H), 2.63 (m, 4H), 2.93 (t, 2H), 4.29 (t, 2H), 4.31 (s, 4H), 5.59 (s, 1H), 6.12 (s, 1H), 6.95-7.05 (m, 2H), 7.18-7.25 (m, 2H)

<Synthesis of Compound (I-2)>

Compound (I-2C) was synthesized in the same manner as the method for synthesizing Compound (I-1) of Example 1 except that Compound (I-1C) was changed to Compound (I-2). (80% yield).

$^1$H-NMR (solvent: CDCl$_3$) δ (ppm): 1.60-1.80 (m, 8H), 1.95 (s, 6H), 2.20-2.45 (m, 8H), 2.50-2.75 (m, 4H), 2.65 (t, 8H), 2.93 (t, 4H), 4.29 (t, 4H), 4.32 (s, 8H), 5.60 (s, 2H), 6.12 (s, 2H), 6.95-7.05 (m, 4H), 7.17-7.26 (m, 4H), 7.32 (s, 2H)

Example 3

Compound (I-3) was synthesized according to the following scheme.

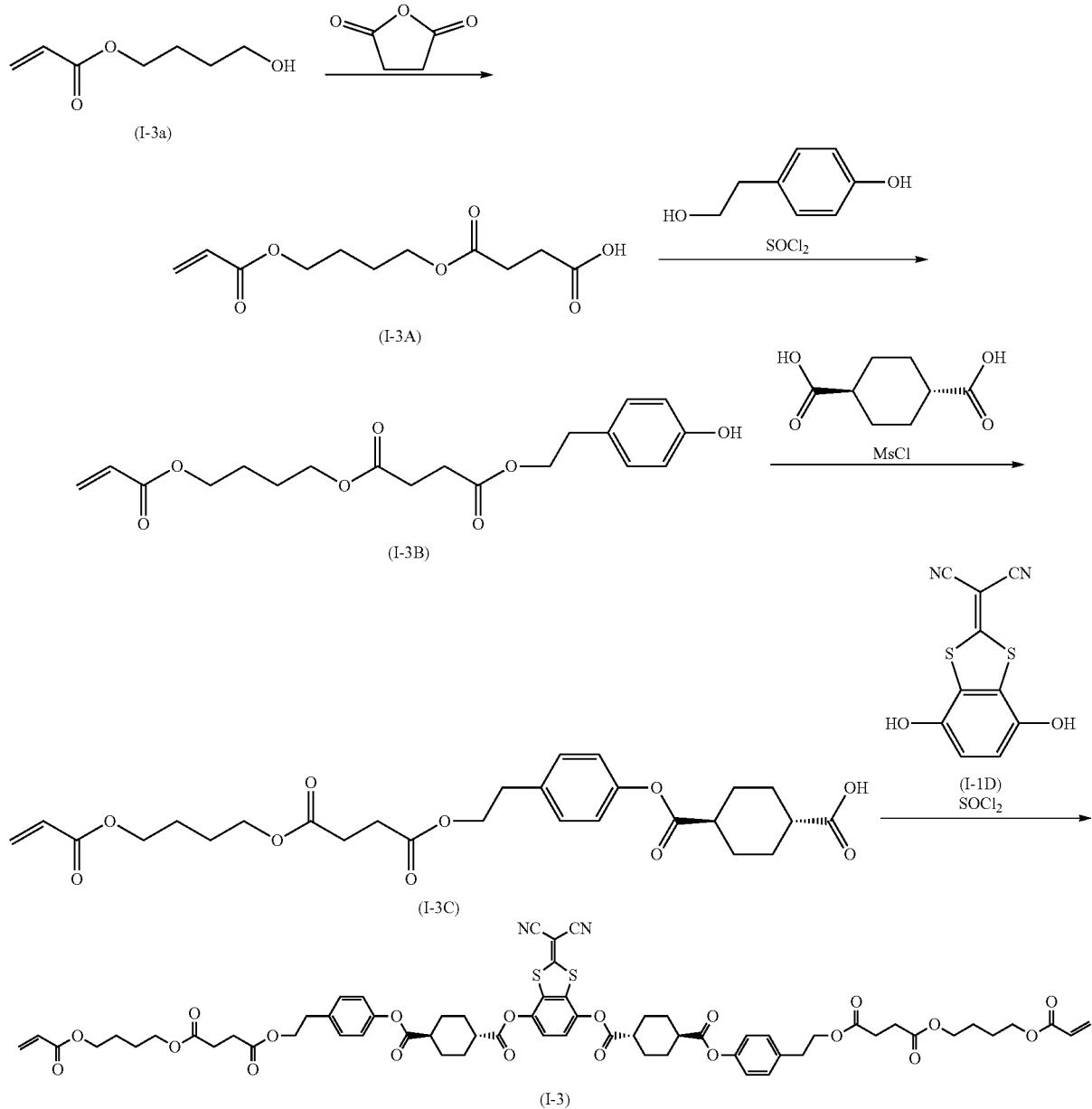

<Synthesis of Compound (I-3A)>

Compound (I-3A) was synthesized in the same manner as the method for synthesizing Compound (I-2A) of Example 2 except that Compound (I-2a) was changed to Compound (I-3a). (92% yield).

<Synthesis of Compound (I-3B)>

Compound (I-3B) was synthesized in the same manner as the method for synthesizing Compound (I-1B) of Example 1 except that Compound (I-1A) was changed to Compound (I-3A). (94% yield).

<Synthesis of Compound (I-3C)>

Compound (I-3C) was synthesized in the same manner as the method for synthesizing Compound (I-1C) of Example 1 except that Compound (I-1B) was changed to Compound (I-3B). (70% yield).

$^1$H-NMR (solvent: CDCl$_3$) δ (ppm): 1.45-1.72 (m, 4H), 1.72-1.80 (m, 4H), 2.10-2.30 (m, 4H), 2.33-2.45 (m, 1H), 2.47-2.65 (m, 1H), 2.62-(s, 4H), 2.93 (t, 2H), 4.10-4.22 (m, 4H), 4.30 (t, 2H), 5.83 (dd, 1H), 6.12 (dd, 1H), 6.41 (dd, 1H), 6.95-7.05 (m, 2H), 7.20-7.26 (m, 2H).

<Synthesis of Compound (J-3)>

Compound (J-3) was synthesized in the same manner as the method for synthesizing Compound (I-1) of Example 1 except that Compound (I-1C) was changed to Compound (I-3C). (88% yield)

$^1$H-NMR (solvent: CDCl$_3$) δ (ppm): 1.60-1.81 (m, 16H), 2.21-2.30 (m, 8H), 2.55-2.75 (m, 4H), 2.62 (s, 8H), 2.94 (t, 4H), 4.09-4.22 (m, 8H), 4.30 (t, 4H), 5.83 (dd, 2H), 6.12 (dd, 2H), 6.41 (dd, 2H), 6.95-7.05 (m, 4H), 7.20-7.26 (m, 4H), 7.32 (s, 2H)
Example 4
Compound (I-4) was synthesized according to the following scheme.
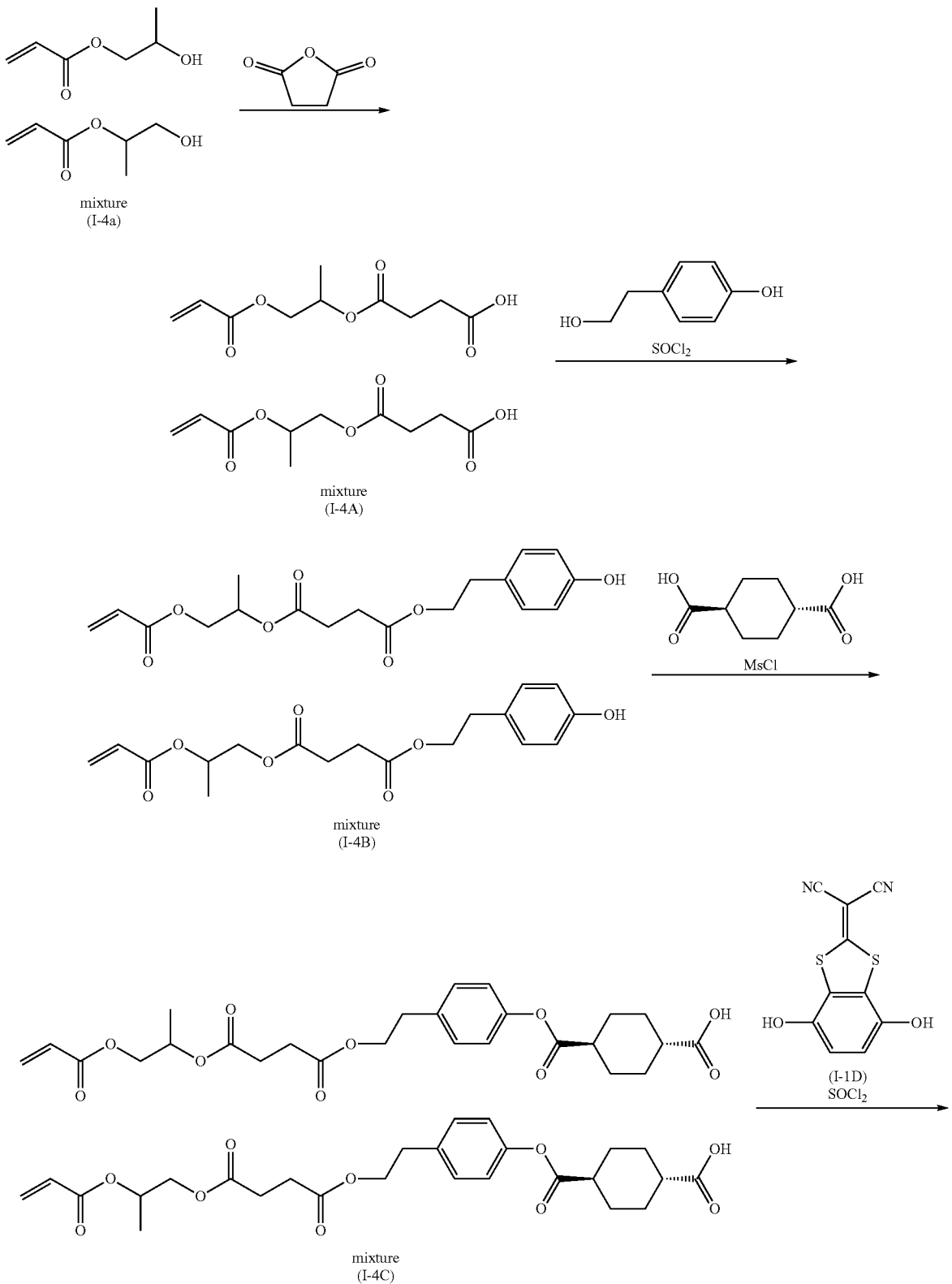

-continued

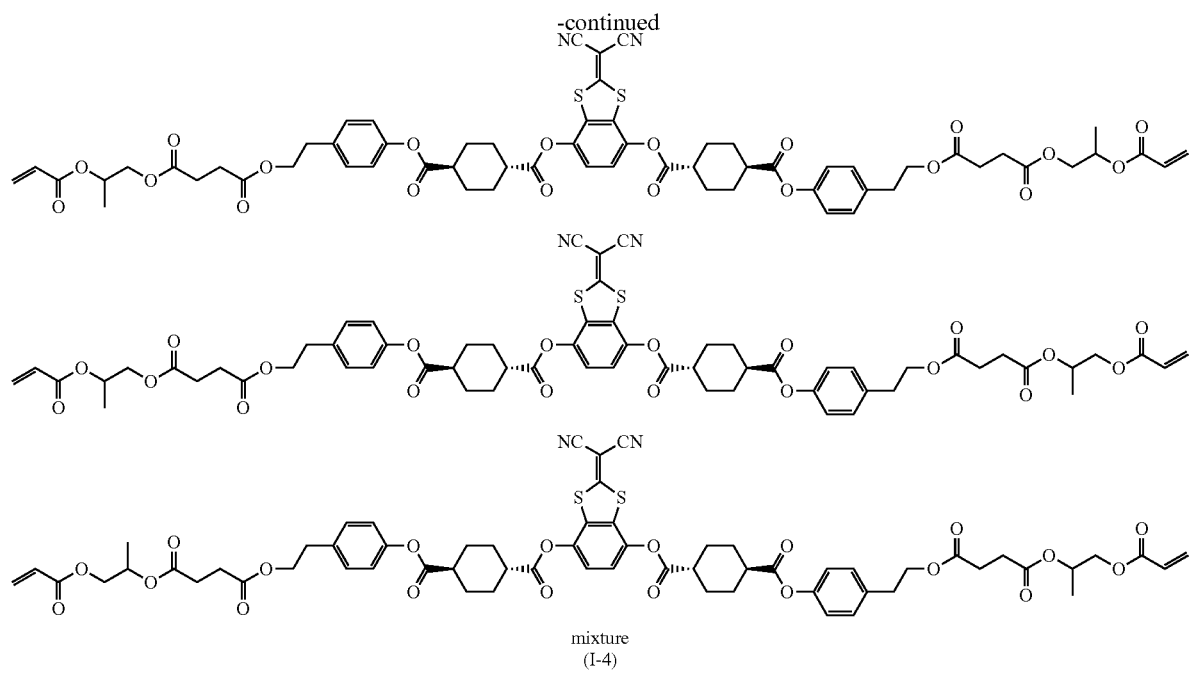

mixture
(I-4)

<Synthesis of Compound (I-4A)>
Compound (I-4A) was synthesized in the same manner as the method for synthesizing Compound (I-2A) of Example 2 except that Compound (I-2a) was changed to Compound (I-4a). (99% yield).

<Synthesis of Compound (I-4B)>
Compound (I-4B) was synthesized in the same manner as the method for synthesizing Compound (I-1B) of Example 1 except that Compound (I-1A) was changed to Compound (I-4A). (91% yield)

<Synthesis of Compound (I-4C)>
Compound (I-4C) was synthesized in the same manner as the method for synthesizing Compound (I-1C) of Example 1 except that Compound (I-1B) was changed to Compound (I-4B). (67% yield)

$^1$H-NMR (solvent: CDCl$_3$) δ (ppm): [Major Isomer] 1.27 (d, 3H), 1.45-1.73 (m, 4H), 2.10-2.32 (m, 4H), 2.32-2.45 (m, 1H), 2.48-2.70 (m, 1H), 2.62 (s, 4H), 2.93 (t, 2H), 4.15 (dd, 1H), 4.25 (dd, 1H), 4.29 (t, 2H), 5.20 (m, 1H), 5.85 (dd, 1H), 6.13 (dd, 1H), 6.42 (dd, 1H), 6.95-7.06 (m, 2H), 7.16-7.25 (m, 2H) [Minor Isomer] 1.29 (d, 3H), 1.45-1.73 (m, 4H), 2.10-2.32 (m, 4H), 2.32-2.45 (m, 1H), 2.48-2.70 (m, 1H), 2.62 (s, 4H), 2.93 (t, 2H), 4.13 (dd, 1H), 4.22 (dd, 1H), 4.29 (t, 2H), 5.20 (m, 1H), 5.84 (dd, 1H), 6.11 (dd, 1H), 6.41 (dd, 1H), 6.95-7.06 (m, 2H), 7.16-7.25 (m, 2H)

The purity of Compound (I-4) was 92%, and a total of 6% of the compound (I-4E) below due to the impurity (I-4b) included in the raw material (I-4a) is contained therein.

(I-4b)

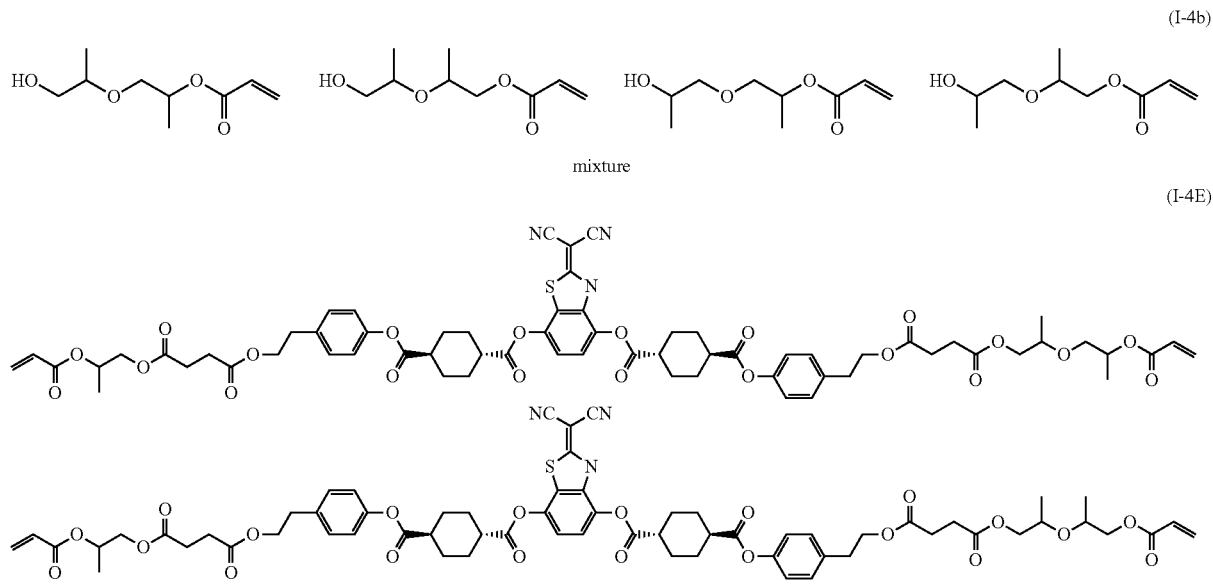

mixture (I-4E)

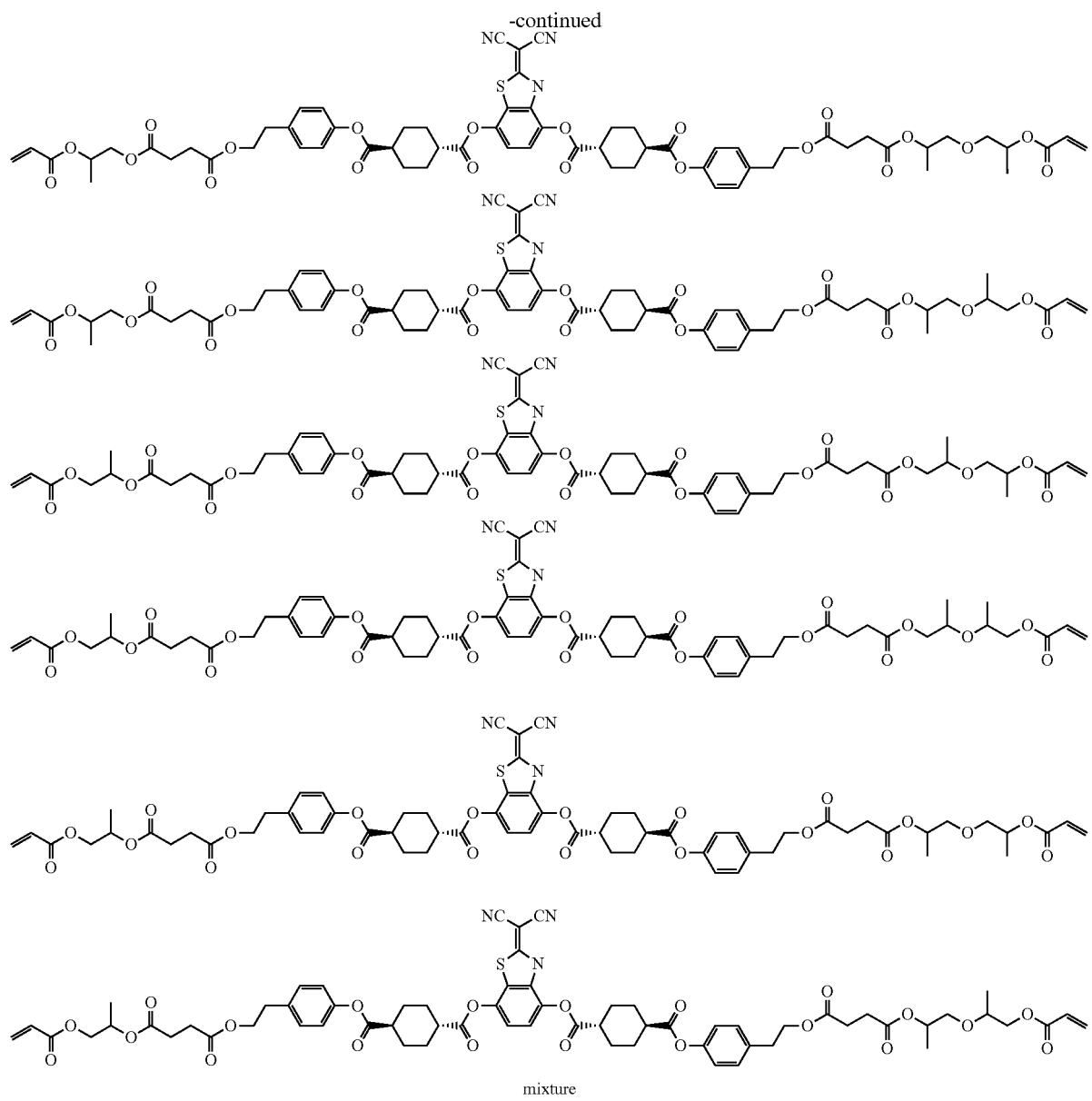

mixture

<Synthesis of Compound (I-4)>

Compound (I-4) was synthesized in the same manner as the method for synthesizing Compound (I-1) of Example 1 except that Compound (I-1C) was changed to Compound (I-4C). (80% yield)

$^1$H-NMR (solvent: CDCl$_3$) δ (ppm): [Major Isomer] 1.27 (d, 6H), 1.56-1.79 (m, 8H), 2.22-2.40 (m, 8H), 2.55-2.75 (m, 4H), 2.62 (s, 8H), 2.94 (t, 4H), 4.15 (dd, 2H), 4.25 (dd, 2H), 4.28 (t, 4H), 5.20 (m, 2H), 5.86 (dd, 2H), 6.13 (dd, 2H), 6.43 (dd, 2H), 6.99-7.06 (m, 4H), 7.20-7.25 (m, 4H), 7.32 (s, 2H)

[Minor Isomer] 1.29 (d, 6H), 1.56-1.79 (m, 8H), 2.22-2.40 (m, 8H), 2.55-2.75 (m, 4H), 2.62 (s, 8H), 2.94 (t, 4H), 4.12 (dd, 2H), 4.22 (dd, 2H), 4.28 (t, 4H), 5.20 (m, 2H), 5.84 (dd, 2H), 6.11 (dd, 2H), 6.41 (dd, 2H), 6.99-7.06 (m, 4H), 7.20-7.25 (m, 4H), 7.32 (s, 2H)

Example 5

Compound (I-5) was synthesized according to the following scheme.

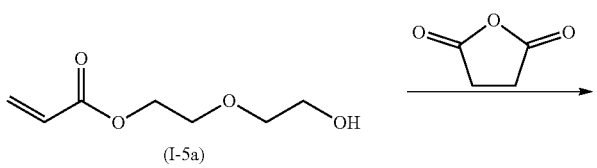

(I-5a)

-continued

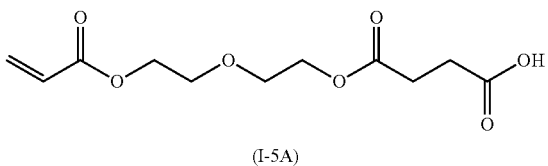
(I-5A)

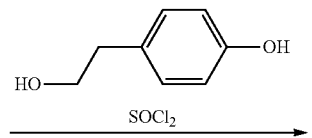

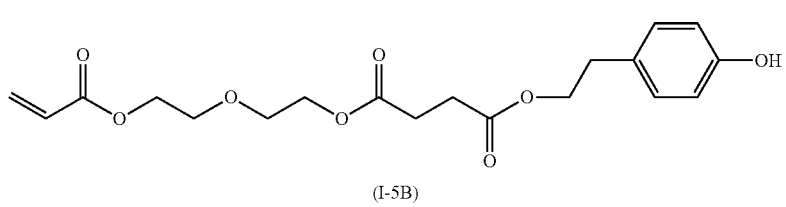
(I-5B)

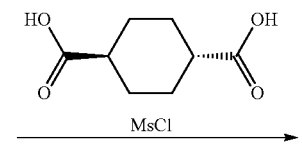

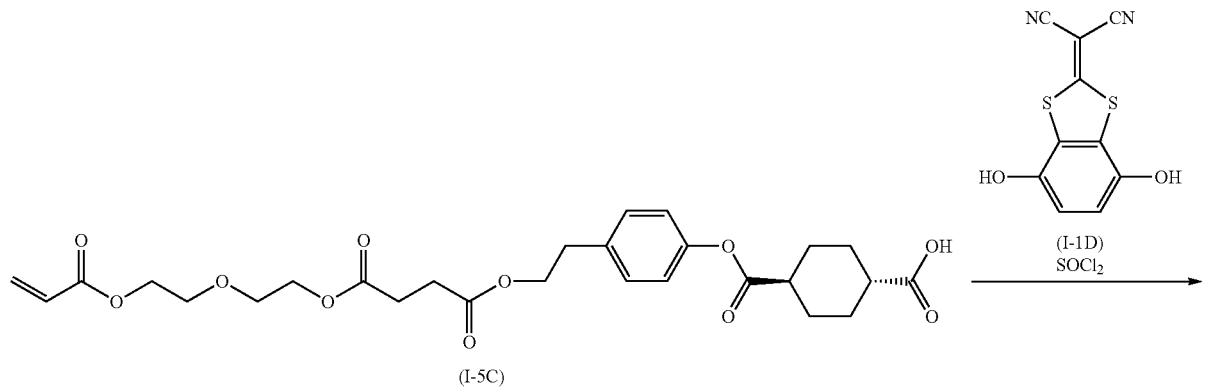
(I-5C)

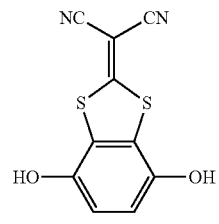
(I-1D)
SOCl$_2$ (I-5)

<Synthesis of Compound (I-5A)>

Compound (I-5A) was synthesized in the same manner as the method for synthesizing Compound (I-2A) of Example 2 except that Compound (I-2a) was changed to Compound (I-5a).

<Synthesis of Compound (I-5B)>

Compound (I-5B) was synthesized in the same manner as the method for synthesizing Compound (I-1B) of Example 1 except that Compound (I-1A) was changed to Compound (I-5A).

<Synthesis of Compound (I-5C)>

Compound (I-5C) was synthesized in the same manner as the method for synthesizing Compound (I-1C) of Example 1 except that Compound (I-1B) was changed to Compound (I-5B). (Three step yield of 45%)

$^1$H-NMR (solvent: CDCl$_3$) δ (ppm): 1.45-1.72 (m, 4H), 2.10-2.32 (m, 4H), 2.32-2.45 (m, 1H), 2.48-2.70 (m, 1H), 2.63 (m, 4H), 2.93 (t, 2H), 3.72 (m, 4H), 4.22-4.35 (m, 4H), 4.32 (t, 2H), 5.84 (dd, 1H), 6.16 (dd, 1H), 6.44 (dd, 1H), 6.95-7.05 (m, 2H), 7.16-7.25 (m, 2H)

<Synthesis of Compound (I-5)>

Compound (I-5) was synthesized in the same manner as the method for synthesizing Compound (I-1) of Example 1 except that Compound (I-1C) was changed to Compound (I-5C). (88% yield)

$^1$H-NMR (solvent: CDCl$_3$) δ (ppm): 1.61-1.79 (m, 8H), 2.25-2.40 (m, 8H), 2.55-2.73 (m, 4H), 2.61 (t, 4H), 2.62 (t, 4H), 2.94 (t, 4H), 3.72 (m, 8H), 4.22-4.33 (m, 8H), 4.33 (t, 4H), 5.84 (dd, 2H), 6.16 (dd, 2H), 6.44 (dd, 2H), 6.99-7.06 (m, 4H), 7.18-7.26 (m, 4H), 7.32 (s, 2H)

Example 6

Compound (I-6) was synthesized according to the following scheme.

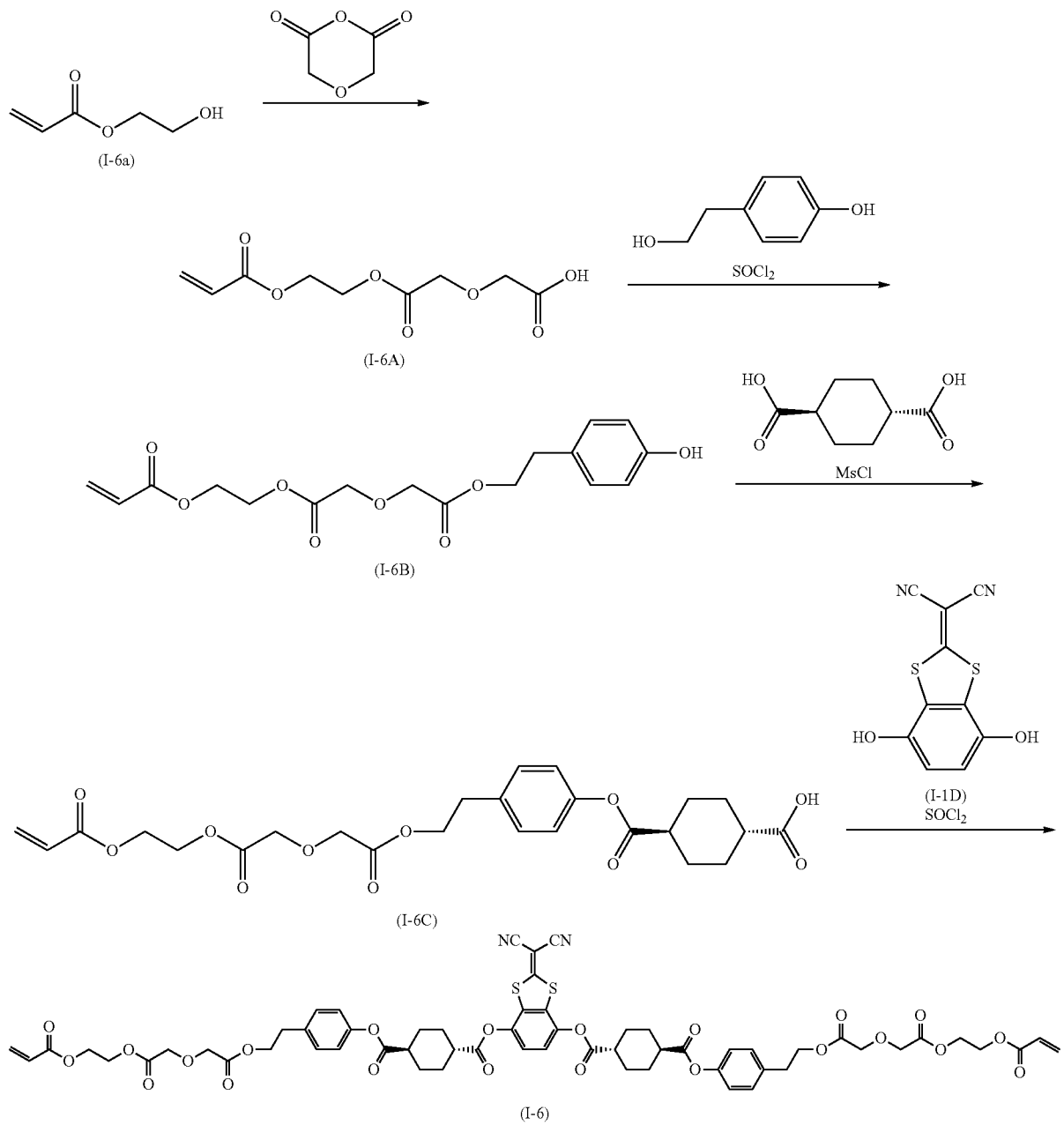

<Synthesis of Compound (I-6A)>

10 g (86.1 mmol) of 2-hydroxyethyl acrylate (I-6a), 50 mL of N,N-dimethylacetamide, 15 mL of pyridine, 11.0 g (94.8 mmol) of diglycolic anhydride, 1.1 g (8.6 mmol) of N,N-dimethylaminopyridine, and 50 mg of 2,6-di-t-butyl-4-methylphenol, and the internal temperature was heated to 50° C. After stirring for 12 hours, the mixture was cooled to room temperature, and liquid separation was carried out by adding 1N aqueous hydrochloric acid. After a collected organic layer was washed with a saturated saline solution and dried with anhydrous sodium sulfate, the solvent was removed by a rotary evaporator, to obtain 14.3 g (278 mmol) of Compound (I-6A) as a clear oil (72% yield).

<Synthesis of Compound (I-6B)>

Compound (I-6B) was synthesized in the same manner as the method for synthesizing Compound (I-1B) of Example 1 except that Compound (I-1A) was changed to Compound (I-6A).

<Synthesis of Compound (I-6C)>

Compound (I-6C) was synthesized in the same manner as the method for synthesizing Compound (I-1C) of Example 1 except that Compound (I-1B) was changed to Compound (I-6B). (Two step yield 58%)

$^1$H-NMR (solvent: CDCl$_3$) δ (ppm): 1.42-1.75 (m, 4H), 2.10-2.30 (m, 4H), 2.30-2.48 (m, 1H), 2.48-2.70 (m, 1H), 2.97 (t, 2H), 4.22 (s, 2H), 4.24 (s, 2H), 4.33-4.45 (m, 6H), 5.86 (dd, 1H), 6.13 (dd, 1H), 6.44 (dd, 1H), 6.98-7.05 (m, 2H), 7.19-7.25 (m, 2H)

<Synthesis of Compound (I-6)>

Compound (I-6) was synthesized in the same manner as the method for synthesizing Compound (I-1) of Example 1 except that Compound (I-1C) was changed to Compound (I-6C), and that purification was carried out by silica gel column chromatography using chloroform-methanol as a solvent. (40% yield)

$^1$H-NMR (solvent: CDCl$_3$) δ (ppm): 1.62-1.78 (m, 8H), 2.23-2.49 (m, 8H), 2.49-2.67 (m, 4H), 2.97 (t, 4H), 4.22 (s, 4H), 4.24 (s, 4H), 4.35-4.44 (m, 12H), 5.87 (dd, 2H), 6.13 (dd, 2H), 6.44 (dd, 2H), 7.00-7.05 (m, 4H), 7.20-7.25 (m, 4H), 7.32 (s, 2H)

Example 7

Compound (I-7) was synthesized according to the following scheme.

<Synthesis of Compound (I-7B)>

3.9 g (19.5 mmol) of Karenz MOI-EG (I-7A, manufactured by Showa Denko KK), 1.5 g (10.9 mmol) of 2-(4-hydroxyphenyl) ethanol, 2 mL of N,N-dimethylacetamide, and 10 mL of chloroform were mixed and the internal temperature was heated to 60° C. After stirring for 12 hours, the mixture was cooled to room temperature, and then stirred for another 12 hours. Next, a saturated aqueous sodium bicarbonate solution was added, the mixture was stirred for 1 hour, and then liquid separation was carried out. A collected organic layer was cleansed with 1N hydrochloric acid and a saturated saline solution, and then dried with anhydrous sodium sulfate. The solvent was removed by rotary evaporation, and purification by silica gel chromatography was performed to obtain 3.1 g (9.19 mmol) of Compound (I-7B) as a clear oil (85% yield).

<Synthesis of Compound (I-7C)>

Compound (I-7C) was synthesized in the same manner as the method for synthesizing Compound (I-1C) of Example 1 except that Compound (I-1B) was changed to Compound (I-7B). (Two step yield of 45%)

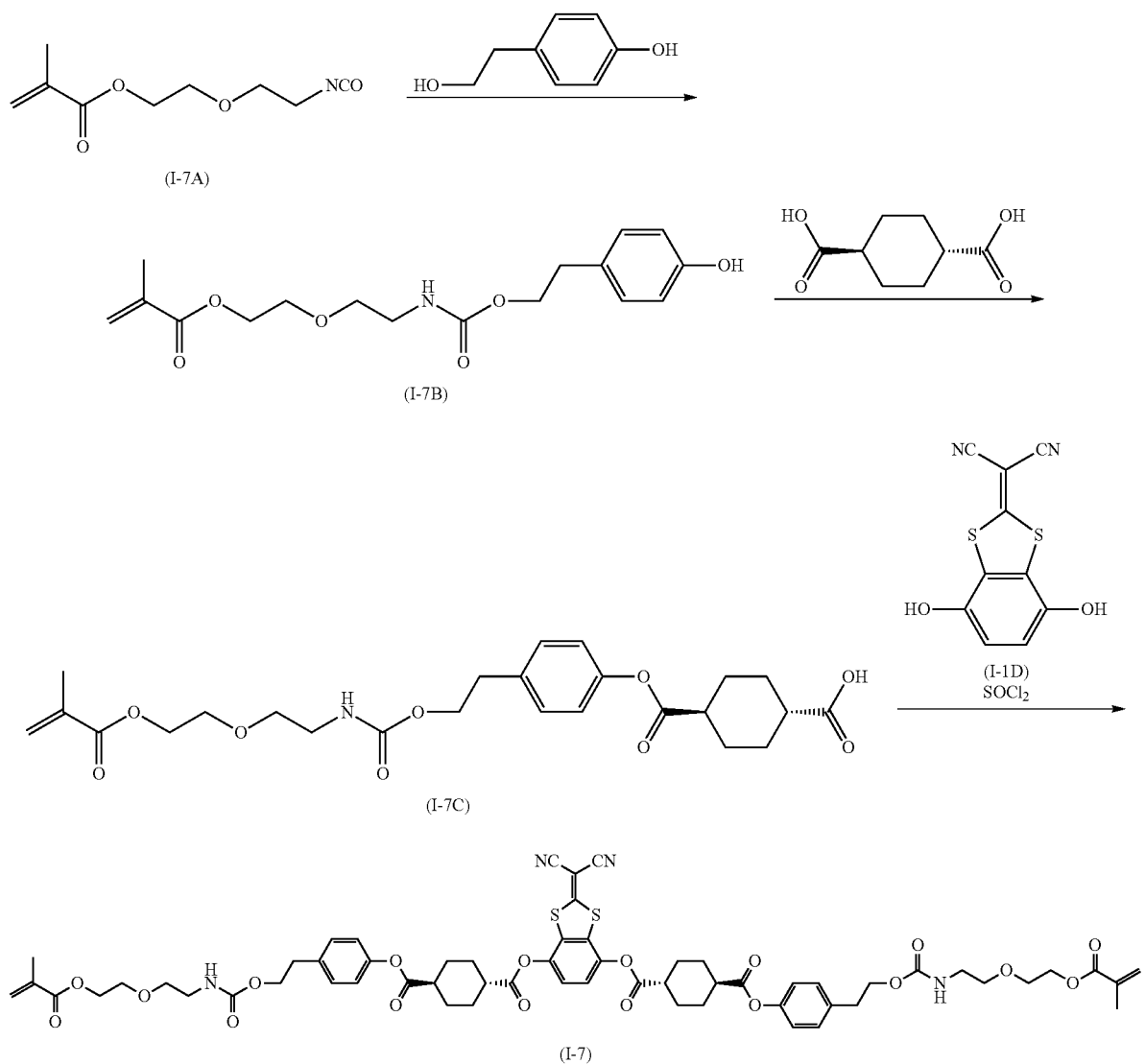

$^1$H-NMR (solvent: CDCl$_3$) δ (ppm): 1.42-1.75 (m, 4H), 1.95 (s, 3H), 2.10-2.30 (m, 4H), 2.30-2.48 (m, 1H), 2.48-2.70 (m, 1H), 2.92 (m, 2H), 3.37 (m, 2H), 3.56 (br t, 2H), 3.70 (br t, 2H), 4.20-4.45 (m, 4H), 5.05 (br s, 1H), 5.58 (s, 1H), 6.13 (s, 1H), 6.98-7.06 (m, 2H), 7.18-7.25 (m, 2H)

<Synthesis of Compound (I-7)>

Compound (I-7) was synthesized in the same manner as the method for synthesizing Compound (I-1) of Example 1 except that Compound (I-1C) was changed to Compound (I-7C). (69% yield)

$^1$H-NMR (solvent: CDCl$_3$) δ (ppm): 1.52-1.78 (m, 8H), 1.95 (s, 6H), 2.25-2.49 (m, 8H), 2.55-2.72 (m, 4H), 2.93 (br t, 4H), 3.37 (m, 4H), 3.56 (br t, 4H), 3.70 (br t, 4H), 4.22-4.35 (m, 8H), 5.04 (br s, 2H), 5.58 (s, 2H), 6.13 (s, 2H), 7.01 (br d, 4H), 7.23 (br d, 4H), 7.32 (s, 2H)

Example 8

Compound (I-9) was synthesized according to the following scheme.

<Synthesis of Compound (I-9B)>

Compound (I-9B) was synthesized in the same manner as that of Example 1 except that Karenz MOI-EG (I-7A, manufactured by Showa Denko KK) was changed to Karenz MOI (I-9A, manufactured by Showa Denko KK) in the method for synthesizing Compound (I-7B) of Example 7.

<Synthesis of Compound (I-9C)>

Compound (I-9C) was synthesized in the same manner as the method for synthesizing Compound (I-1C) of Example 1 except that Compound (I-1B) was changed to Compound (I-9B). (Two step yield 40%)

$^1$H-NMR (solvent: CDCl$_3$) δ (ppm): 1.42-1.75 (m, 4H), 1.95 (s, 3H), 2.10-2.30 (m, 4H), 2.30-2.48 (m, 1H), 2.48-2.70 (m, 1H), 2.92 (m, 2H), 3.49 (m, 2H), 4.10-4.35 (m, 4H), 4.90 (br s, 1H), 5.58 (s, 1H), 6.13 (s, 1H), 6.98-7.06 (m, 2H), 7.18-7.25 (m, 2H)

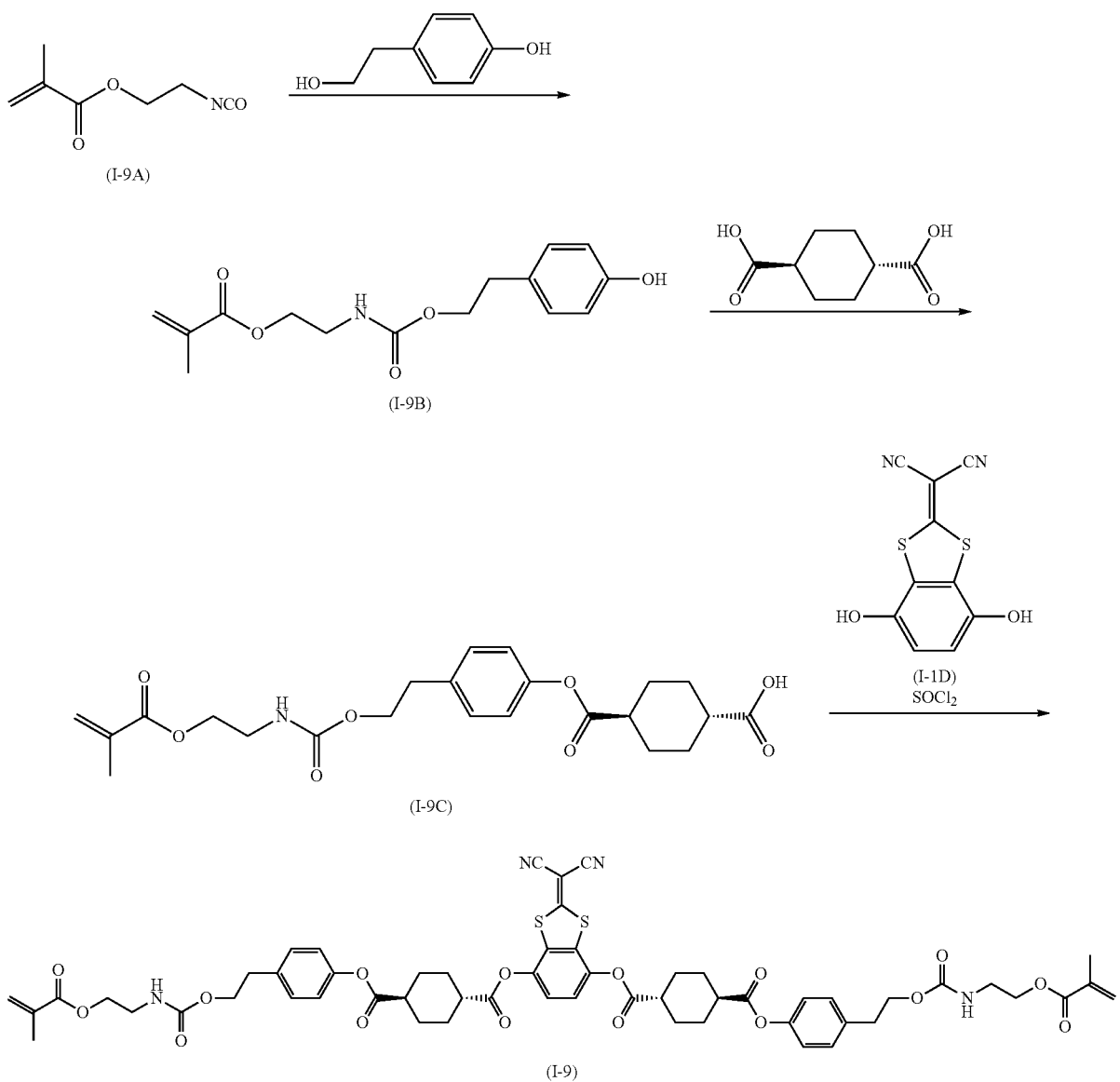

<Synthesis of Compound (I-9)>

Compound (I-9) was synthesized in the same manner as the method for synthesizing Compound (I-1) of Example 1 except that Compound (I-1C) was changed to Compound (I-9C). (66% yield)

$^1$H-NMR (solvent: CDCl$_3$) δ (ppm): 1.52-1.78 (m, 8H), 1.95 (s, 6H), 2.25-2.49 (m, 8H), 2.55-2.72 (m, 4H), 2.92 (br t, 4H), 3.49 (m, 4H), 4.10-4.35 (m, 8H), 4.91 (br s, 2H), 5.60 (s, 2H), 6.13 (s, 2H), 6.95-7.05 (m, 4H), 7.17-7.26 (m, 4H), 7.32 (s, 2H)

Example 9

Compound (I-14) was synthesized according to the following scheme.

<Synthesis of Compound (I-14B)>

Compound (I-14B) was synthesized in the same manner as the method for synthesizing Compound (I-1B) of Example 1 except that Compound (I-1) was changed to 10-undecenoic acid (I-14A).

<Synthesis of Compound (I-14C)>

Compound (I-14C) was synthesized in the same manner as the method for synthesizing Compound (I-1C) of Example 1 except that Compound (I-1B) was changed to Compound (I-14B). (Two step yield 60%)

$^1$H-NMR (solvent: CDCl$_3$) δ (ppm): 1.20-1.45 (m, 10H), 1.45-1.80 (m, 6H), 2.00-2.10 (m, 2H), 2.10-2.25 (m, 4H), 2.25-2.45 (m, 3H), 2.45-2.70 (m, 1H), 2.94 (t, 2H), 4.25 (t, 2H), 4.88-5.07 (m, 2H), 5.71-5.90 (m, 1H), 6.96-7.05 (m, 2H), 7.18-7.26 (m, 2H)

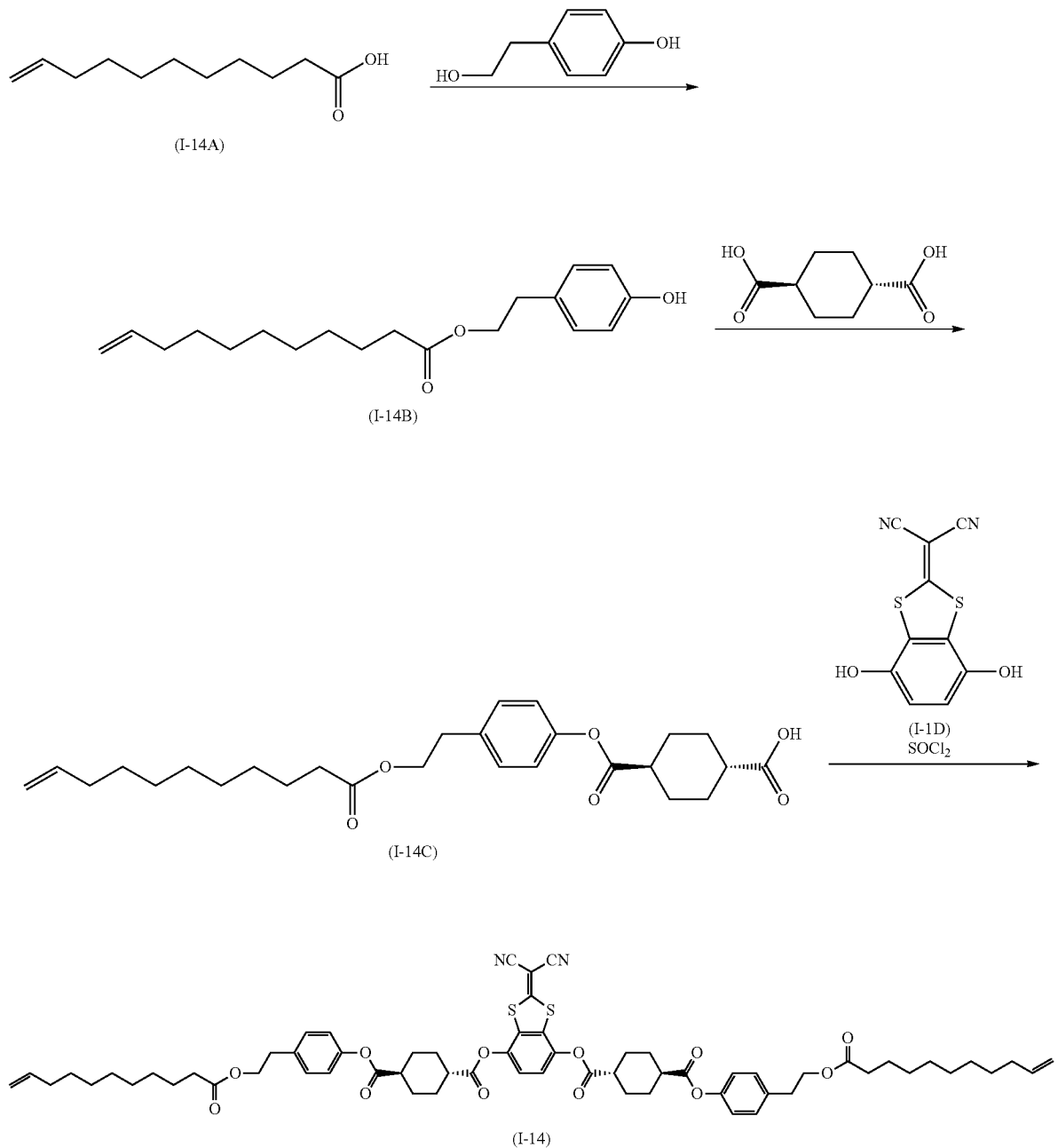

<Synthesis of Compound (I-14)>

Compound (I-14) was synthesized in the same manner as the method for synthesizing Compound (I-1) of Example 1 except that Compound (I-1C) was changed to Compound (I-14C). (91% yield)

$^1$H-NMR (solvent: CDCl$_3$) δ (ppm): 1.20-1.45 (m, 20H), 1.50-1.60 (m, 4H) 1.60-1.80 (m, 8H), 2.00-2.10 (m, 4H), 2.20-2.45 (m, 12H), 2.65-2.80 (m, 4H), 2.93 (t, 4H), 4.25 (t, 4H), 4.88-5.05 (m, 4H), 5.70-5.90 (m, 2H), 6.95-7.05 (m, 4H), 7.17-7.26 (m, 4H), 7.32 (s, 2H)

Example 10

Compound (I-15) below was synthesized.

120 mg (0.106 mmol) of Compound (1-14), 56.4 mg of 3-chloroperbenzoic acid (30 wt % water content), and 1 mL of dichloromethane were mixed, then stirred for 4 hours at room temperature. Thereafter, water was added to carry out liquid separation. A collected organic layer was cleansed with a saturated aqueous sodium thiosulfate solution, a saturated aqueous sodium bicarbonate solution, and a saturated saline solution, and then dried with anhydrous sodium sulfate. The sodium sulfate was filtered out and the solvent was removed by a rotary evaporator, and recrystallization was performed using ethyl acetate and methanol to obtain 80 mg of Compound (I-15) (65% yield).

$^1$H-NMR (solvent: CDCl$_3$) δ (ppm): 1.20-1.80 (m, 36H), 2.20-2.45 (m, 12H), 2.45 (m, 2H) 2.55-2.75 (m, 4H), 2.75 (m, 2H) 2.85-3.00 (m, 2H), 2.93 (t, 4H), 4.27 (t, 4H), 6.95-7.05 (m, 4H), 7.17-7.26 (m, 4H), 7.32 (s, 2H)

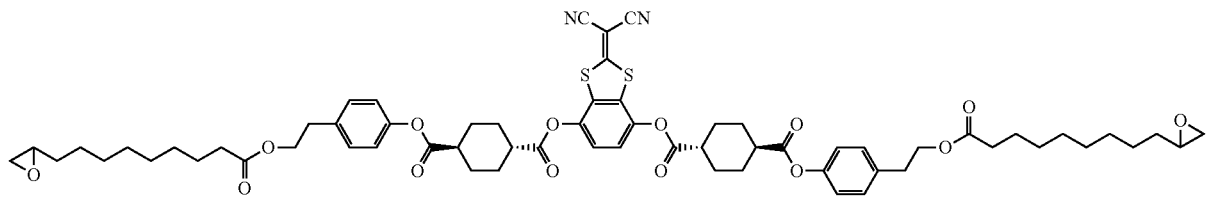

(I-15)

Example 11

Compound (II-8) was synthesized according to the following scheme.

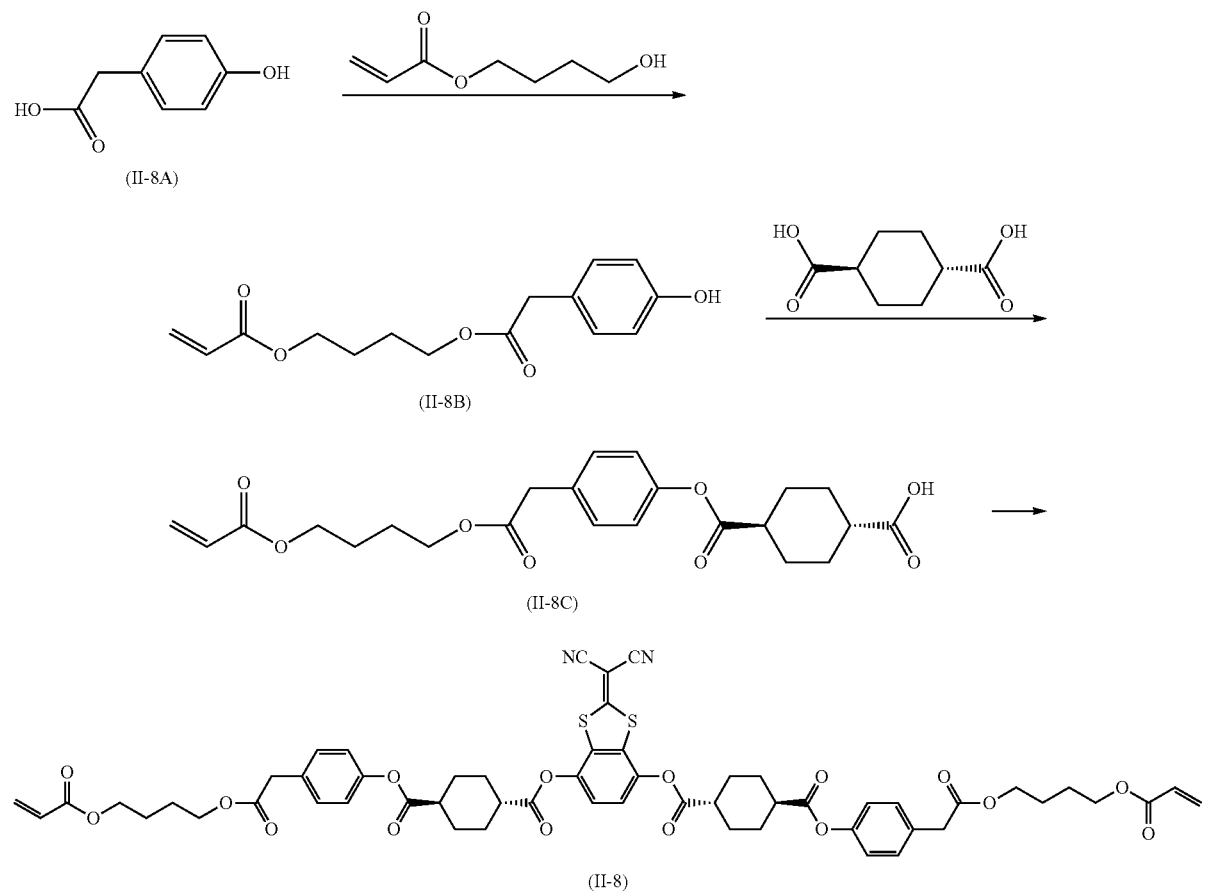

<Synthesis of Compound (II-8B)>

20 g (131 mmol) of Compound (II-8A) and N,N-dimethylacetamide 80 mL were mixed, and cooled to 0° C. 19.2 mL (263 mmol) of thionyl chloride was dropped into the mixture in a manner such that the internal temperature did not become 5° C. or greater. After stirring for 1 hour at 5° C., 18.2 mL (131 mmol) of 4-hydroxy butyl acrylic acid was dropped into the mixture. Then, after stirring for 12 hours at room temperature, liquid separation was carried out by adding 200 mL of water. A collected organic layer was cleansed with 1N hydrochloric acid, a saturated aqueous sodium bicarbonate solution, and a saturated saline solution, and dried with anhydrous sodium sulfate. The sodium sulfate was filtered out and the solvent was removed by a rotary evaporator, and 23.9 g (96 mmol) of Compound (II-8B) was obtained as a clear oil by performing purification by silica gel chromatography (73% yield).

<Synthesis of Compound (II-8C)>

Compound (II-8C) was synthesized in the same manner as the method for synthesizing Compound (I-1C) of Example 1 except that Compound (I-1B) was changed to Compound (II-8B). (57% yield)

$^1$H-NMR (solvent: CDCl$_3$) δ (ppm): 1.40-1.90 (m, 8H), 2.10-2.30 (m, 4H), 2.30-2.45 (m, 1H), 2.45-2.60 (m, 1H), 3.62 (s, 2H), 4.08-4.22 (m, 4H), 5.83 (dd, 1H), 6.13 (dd, 1H), 6.41 (dd, 1H), 6.97-7.07 (m, 2H), 7.27-7.34 (m, 2H)

<Synthesis of Compound (II-8)>

536 mg (1.24 mmol) of Compound (II-8C), 150 mg (0.60 mmol) compound (I-D), and 5 mL of tetrahydrofuran were mixed, then stirred at room temperature. 7.5 mg (0.06 mmol) of N,N-dimethylaminopyridine and 350 mg (1.83 mmol of) 1-(3-dimethylaminopropyl)-3-ethylcarbodiimide hydrochloride were added to the mixture, and the mixture was stirred at room temperature for 5 hours. Thereafter, liquid separation was carried out by adding 20 mL of ethyl acetate and 20 mL of water. A collected organic layer was cleansed with 1N aqueous hydrochloric acid, saturated aqueous sodium bicarbonate solution, and a saturated saline solution, and then dried with anhydrous sodium sulfate. The sodium sulfate was filtered out and the solvent was removed by a rotary evaporator, and 257 mg (0.24 mmol) of Compound (II-8) was obtained by performing purification by silica gel chromatography (40% yield).

$^1$H-NMR (solvent: CDCl$_3$) δ (ppm): 1.62-1.80 (m, 16H), 2.25-2.40 (m, 8H), 2.55-2.75 (m, 4H), 3.62 (s, 4H), 4.10-4.20 (m, 8H), 5.83 (dd, 2H), 6.12 (dd, 2H), 6.41 (dd, 2H), 7.02-7.08 (m, 4H), 7.28-7.33 (m, 4H), 7.32 (s, 2H)

Example 12

Compound (II-9) was synthesized according to the following scheme.

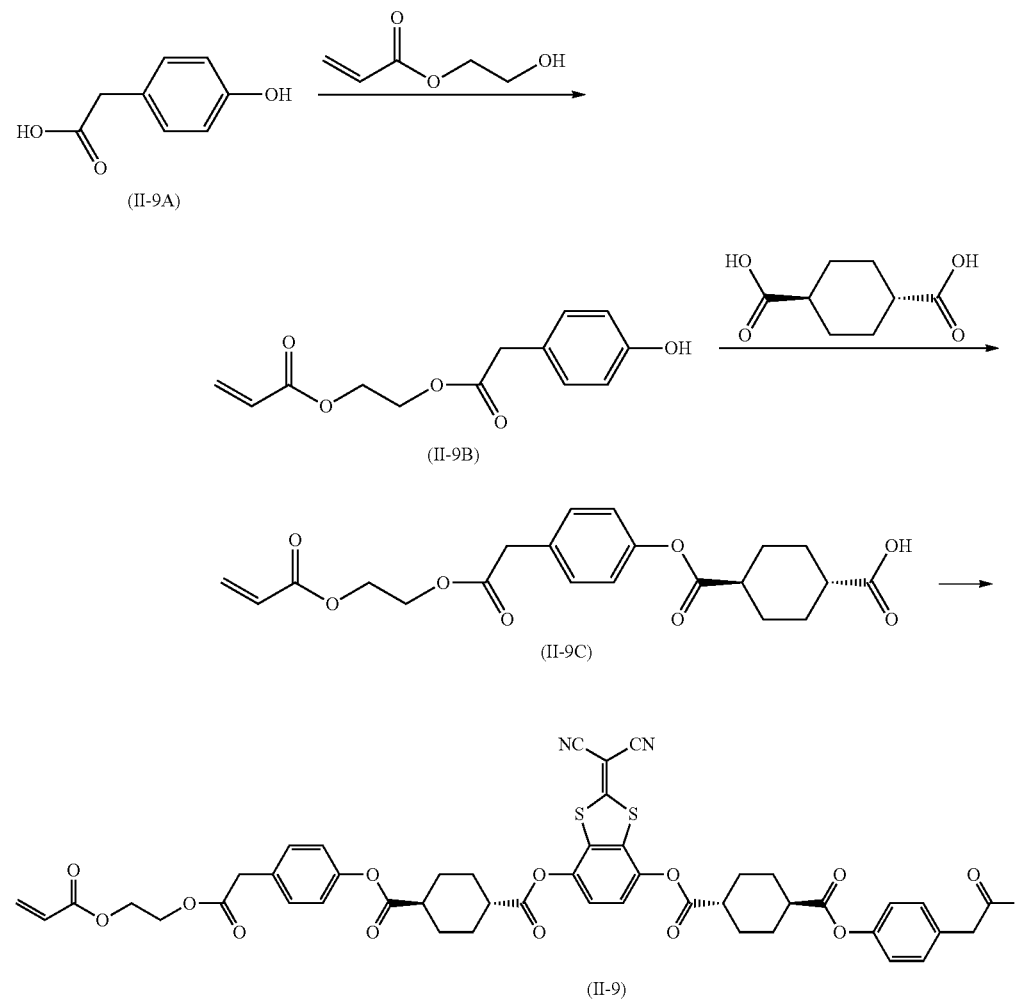

<Synthesis of Compound (II-9B)>

Compound (II-9B) was synthesized in the same manner as the method for synthesizing Compound (II-8B) of Example 11 except that 4-hydroxybutyl acrylate was changed to 2-hydroxyethyl acrylate. (69% yield)

<Synthesis of Compound (II-9C)>

Compound (II-9C) was synthesized in the same manner as the method for synthesizing Compound (I-1C) of Example 1 except that Compound (I-1B) was changed to Compound (II-9B). (59% yield)

$^1$H-NMR (solvent: CDCl$_3$) δ (ppm): 1.40-1.74 (m, 4H), 2.10-2.30 (m, 4H), 2.30-2.45 (m, 1H), 2.45-2.60 (m, 1H), 3.64 (s, 2H), 4.36 (m, 4H), 5.86 (dd, 1H), 6.13 (dd, 1H), 6.41 (dd, 1H), 6.95-7.05 (m, 2H), 7.27-7.34 (m, 2H)

<Synthesis of Compound (II-9)>

500 mg (1.24 mmol) of Compound (II-9C), 150 mg (0.60 mmol) of Compound (I-D) and 5 mL of tetrahydrofuran were mixed then stirred at room temperature. 7.5 mg (0.06 mmol) of N,N-dimethylaminopyridine and 350 mg (1.83 mmol) of 1-(3-dimethylaminopropyl)-3-ethylcarbodiimide hydrochloride were added to the mixture, and the mixture was stirred at room temperature for 5 hours. Thereafter, liquid separation was carried out by adding adding 20 mL of ethyl acetate and 20 mL of water. A collected organic layer was cleansed with 1N aqueous hydrochloric acid, saturated aqueous sodium bicarbonate solution, and a saturated saline solution, and then dried with anhydrous sodium sulfate. The sodium sulfate was filtered out and the solvent was removed by a rotary evaporator, and 270 mg (0.26 mmol) of Compound (II-9) was obtained by performing purification by silica gel chromatography (44% yield).

$^1$H-NMR (solvent: CDCl$_3$) δ (ppm): 1.62-1.77 (m, 8H), 2.25-2.40 (m, 8H), 2.56-2.73 (m, 4H), 3.65 (s, 4H), 4.32-4.40 (m, 8H), 5.86 (dd, 2H), 6.12 (dd, 2H), 6.41 (dd, 2H), 7.02-7.08 (m, 4H), 7.28-7.33 (m, 4H), 7.32 (s, 2H)

Example 13

Compound (III-3) was synthesized according to the following scheme.

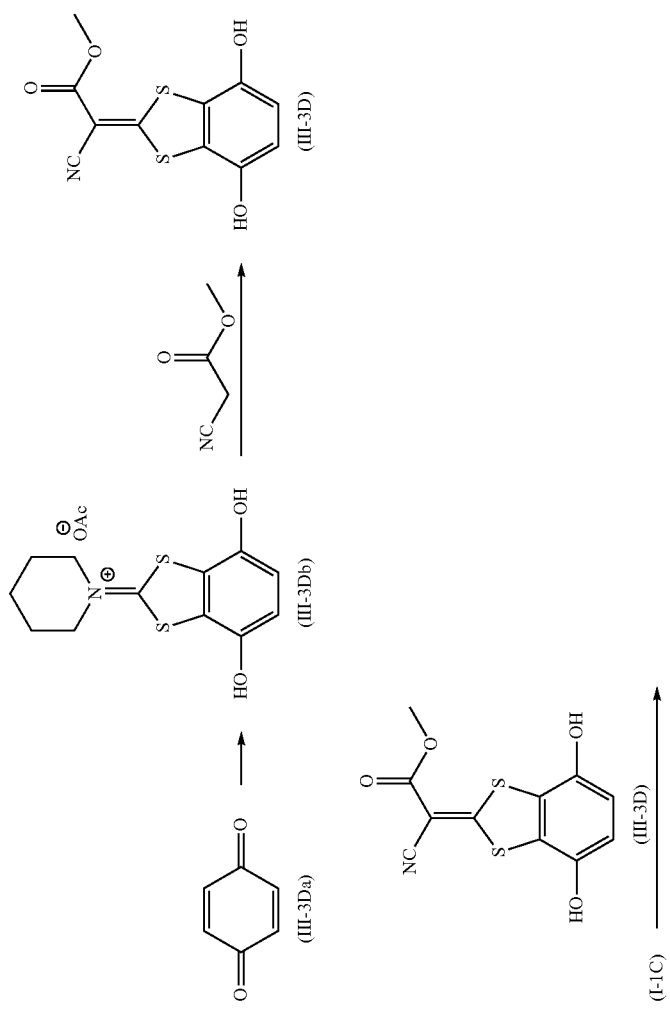

<Synthesis of Compound (III-3Db)>

Compound (III-3Db) was synthesized according to the method disclosed in F. Dumur et al., "Novel Fused D-A Dyad and A-D-A Triad Incorporating Tetrathiafulvalene and p-Benzoquinone", Journal of Organic Chemistry, Vol. 69, No. 6, pp. 2164-2177, 2004.

<Synthesis of Compound (III-3D)>

5.0 g (15.3 mmol) of Compound (III-3Db), 1.66 g (16.80 mmol) of methyl cyanoacetate, and 25 mL of isopropyl alcohol were mixed, and stirred for 3 hours under reflux heating. Thereafter, the mixture was cooled to room temperature, 50 mL of water was added, and precipitated crystals were filtered. The obtained crystals were cleansed with a water-isopropyl alcohol solution (10:1) and 0.5N aqueous hydrochloric acid, dissolved in N, N-dimethylacetamide, and then filtered. Water was added to the obtained filtrate, and precipitated crystals were filtered to obtain 2.2 g (7.82 mmol) of Compound (III-3D) (51% yield).

<Synthesis of Compound (III-3)>

Compound (III-3) was synthesized in the same manner as the method for synthesizing Compound (I-1) of Example 1 except that Compound (I-4D) was changed to Compound (III-3D). (80% yield)

$^1$H-NMR (solvent: CDCl$_3$) δ (ppm): 1.60-1.85 (m, 8H), 2.20-2.45 (m, 8H), 2.55-2.75 (m, 4H), 2.65 (t, 8H), 2.93 (t, 4H), 3.91 (s, 3H), 4.30 (t, 4H), 4.25-4.40 (m, 8H), 5.84 (dd, 2H), 6.14 (dd, 2H), 6.44 (dd, 2H), 6.98-7.05 (m, 4H), 7.17-7.26 (m, 4H), 7.27 (s, 2H)

Example 14

Compound (III-7) was synthesized according to the following scheme.

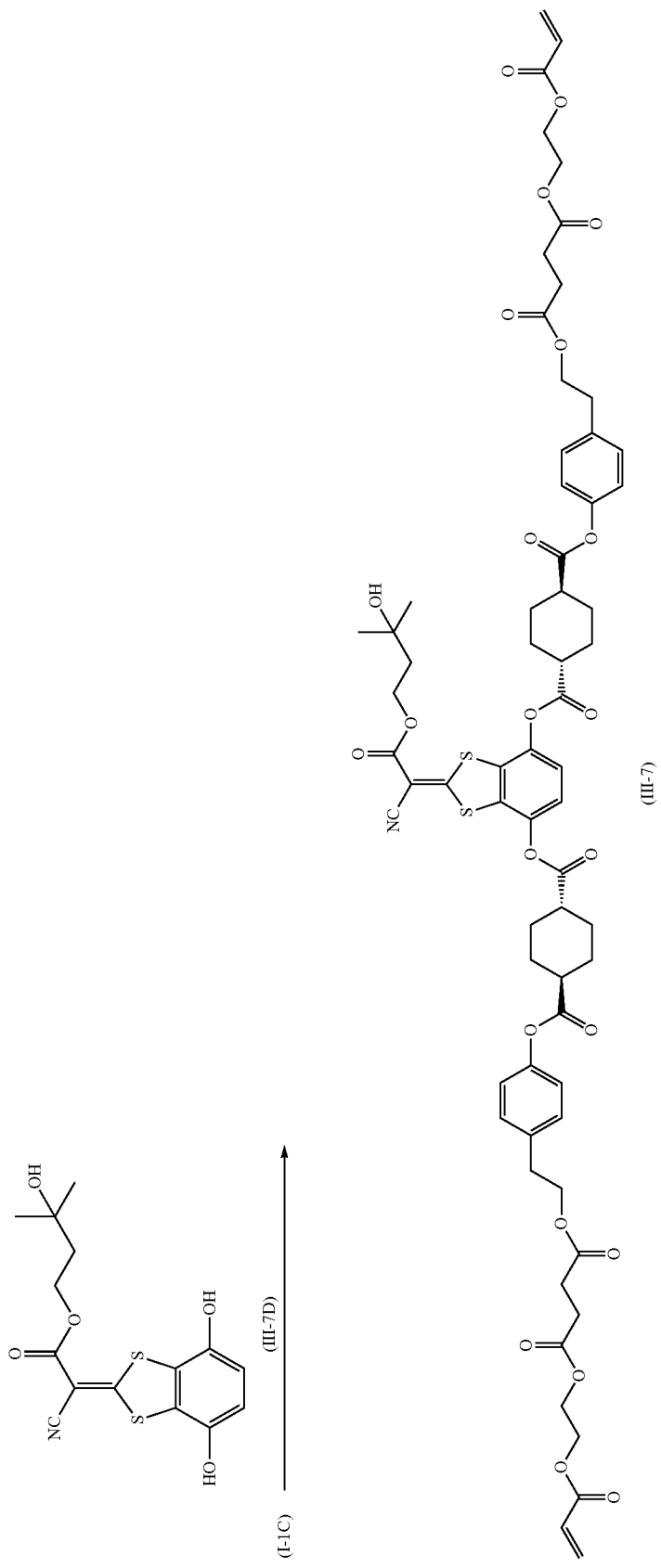

<Synthesis of Compound (III-7D)>

Compound (III-7D) was synthesized according to the method disclosed in Japanese Unexamined Patent Publication No. 2008-107767.

<Synthesis of Compound (III-7)>

Compound (III-7) was synthesized in the same manner as the method for synthesizing Compound (I-1) of Example 1 except that Compound (I-4D) was changed to Compound (III-7D). (78% yield)

$^1$H-NMR (solvent: CDCl$_3$) δ (ppm): 1.31 (s, 6H), 1.65-1.80 (m, 8H), 1.96 (t, 2H) 2.25-2.50 (m, 8H), 2.55-2.75 (m, 4H), 2.65 (t, 8H), 2.93 (t, 4H), 4.30 (t, 4H), 4.25-4.40 (m, 8H), 4.48 (t, 2H), 5.84 (dd, 2H), 6.14 (dd, 2H), 6.44 (dd, 2H), 6.98-7.05 (m, 4H), 7.20-7.26 (m, 4H), 7.27 (s, 2H)

Example 15

Compound (IV-1) was synthesized according to the following scheme.

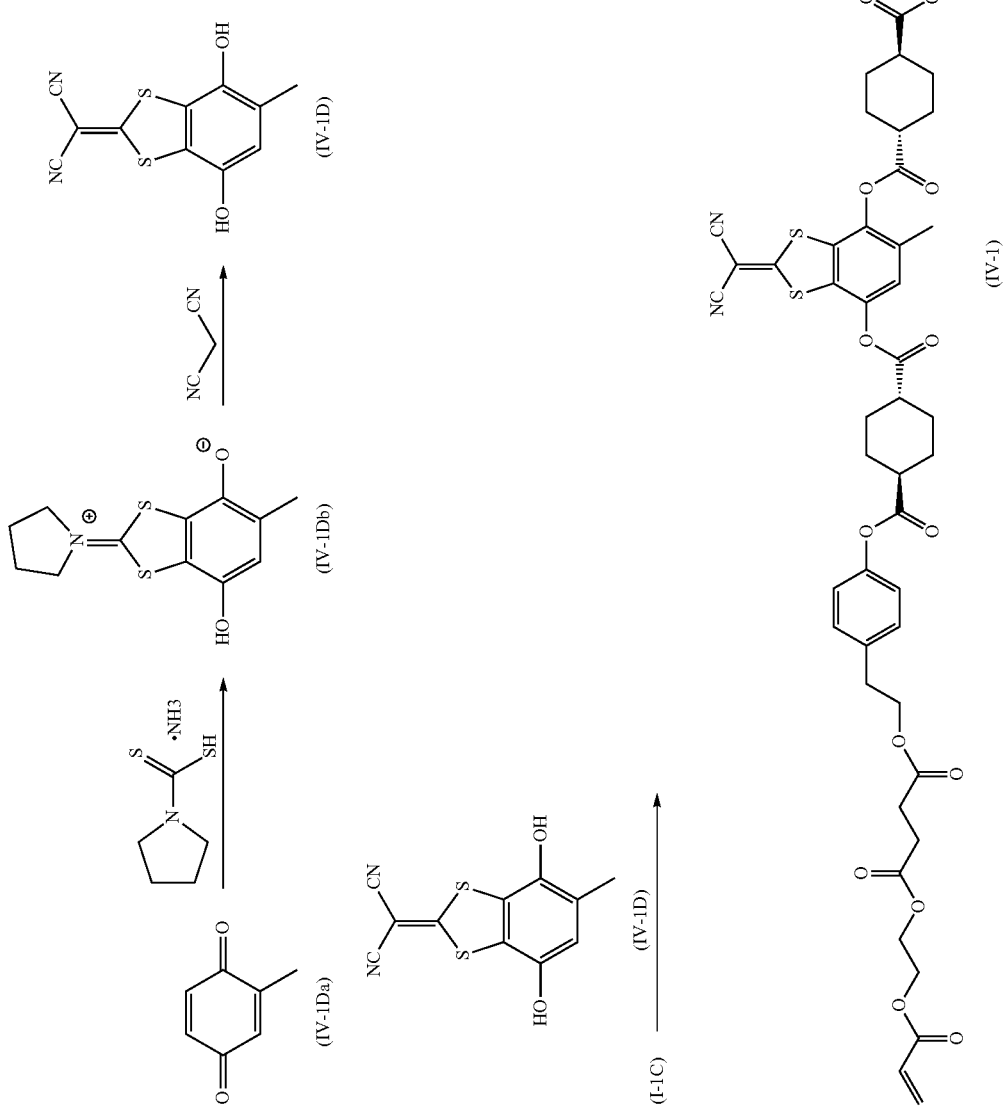

<Synthesis of Compound (IV-1Db)>

8.2 g (50.0 mmol) of 1-pyrrolidine carbonitrile dithio ammonium and 50 mL of N,N-dimethylformamide 50 mL were mixed and cooled to 5° C. 40 mL of an acetic acid solution containing 6.7 g (55.0 mmol) of toluquinone (IV-1Da) was dropped into the mixture, and the mixture was stirred at room temperature for two hours. Next, the internal temperature was cooled to 5° C., and 40 mL of a dimethylsulfoxide solution containing 5.9 g (55.0 mmol) of 1,4-benzoquinone was dropped slowly into the mixture in a manner such that the internal temperature did not become greater than 15° C. The mixture was stirred for 1 hour at room temperature, and then 1 L of water was added. An aqueous solution of 28 wt % sodium hydroxide was added until crystals precipitated, the precipitated crystals were filtered, and cleansed with water and methanol to obtain 5.4 g (20.1 mmol) of Compound (IV-Db) (40% yield).

<Synthesis of Compound (IV-1D)>

1.5 g (5.6 mmol) of Compound (IV-1Db), 410 mg (6.2 mmol) of malononitrile, 16 mL of isopropyl alcohol, 0.3 mL of acetic acid and 0.2 mL acetic acid anhydride were mixed and stirred for 3 hours under reflux heating. After cooling to room temperature, water was added to the mixture, and precipitated crystals were filtered out to obtain 1.1 g (4.2 mmol) of Compound (IV-1D) (75% yield).

$^1$H-NMR (solvent: DMSO-d6) δ (ppm): 2.19 (s, 3H), 6.71 (s, 1H), 9.60 (br s, 1H), 10.55 (br s, 1H)

<Synthesis of Compound (IV-1)>

Compound (IV-1) was synthesized in the same manner as the method for synthesizing Compound (I-1) of Example 1 except that Compound (I-4D) was changed to Compound (IV-1D). (68% yield)

$^1$H-NMR (solvent: CDCl$_3$) δ (ppm): 1.50-1.80 (m, 8H), 2.20-2.45 (m, 8H), 2.22 (s, 3H), 2.50-2.75 (m, 4H), 2.65 (t, 8H), 2.93 (t, 4H), 4.30 (t, 4H), 4.25-4.40 (m, 8H), 5.86 (dd, 2H), 6.14 (dd, 2H), 6.44 (dd, 2H), 6.95-7.05 (m, 4H), 7.17-7.26 (m, 4H), 7.23 (s, 1H)

Example 16

Compound (IV-2) was synthesized according to the following scheme.

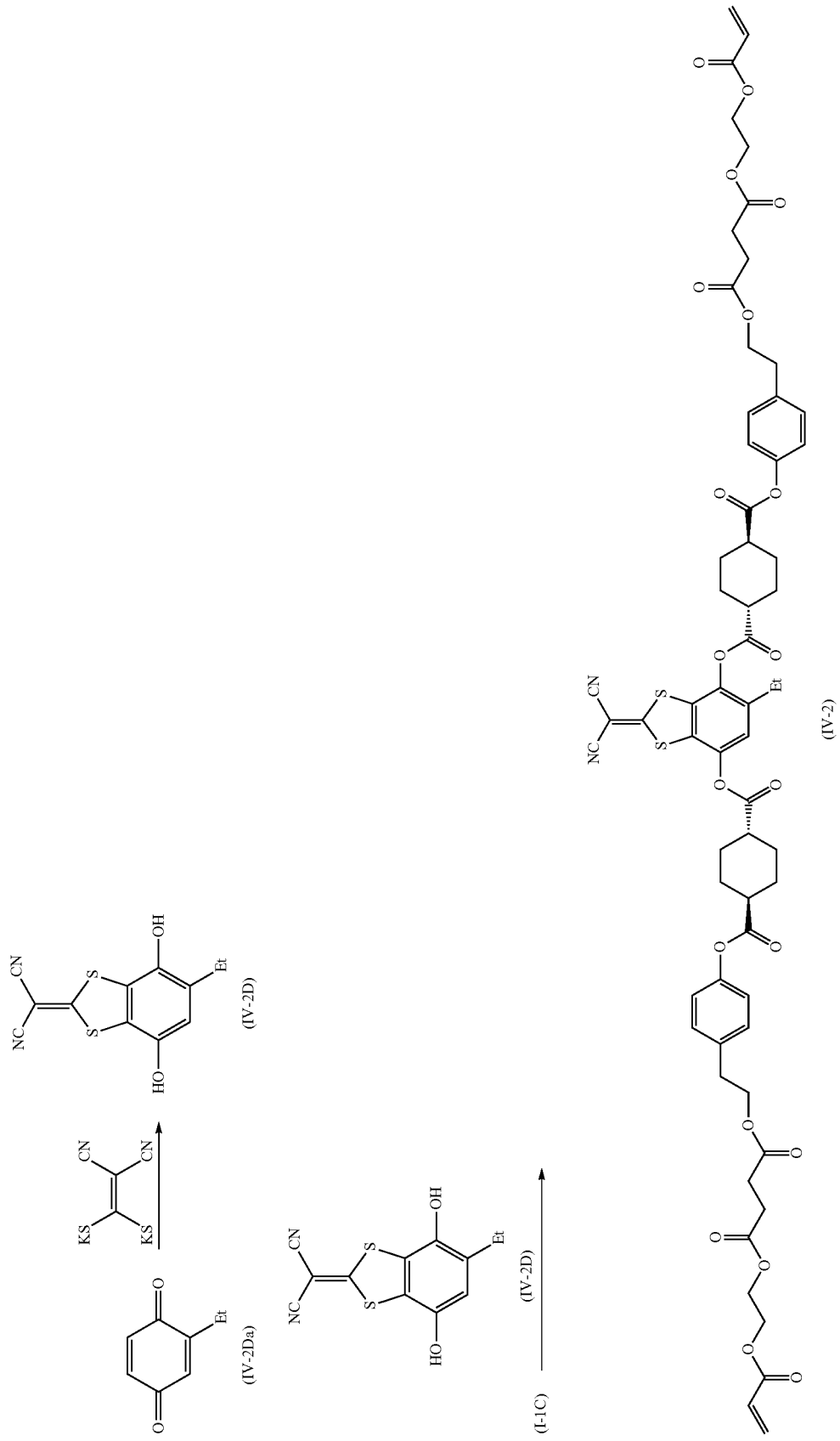

<Synthesis of Compound (IV-2Da)>

Compound (IV-2Da) was synthesized according to the method disclosed in B. Errazuriz et al., "Studies on quinones. XIV[1]. Oxidative demethylation of hydroquinones dimethylethers with nitric acid-impregnated manganese dioxide", Tetrahedron Letters, Vol. 26, Issue 7, pp. 819-822, 1985.

<Synthesis of Compound (IV-2D)>

5 mL of water, 1.38 g (21.0 mmol) of potassium hydroxide, and 4 mL of isopropyl alcohol were mixed and cooled to 5° C. An isopropyl alcohol solution containing 690 mg (10.5 mmol) of malononitrile was dropped into the mixture in a manner such that the internal temperature did not become greater than 8° C., and then an isopropyl alcohol solution containing 0.63 mL (10.5 mmol) of carbon disulfide was dropped into the mixture in a manner such that the internal temperature did not become greater than 8° C. After stirring for 40 minutes, 0.18 mL of acetic acid was added. Next, 3.12 g (20.8 mmon) of Compound (IV-2Da) and 9 mL of an acetone solution containing 1.19 mL of acetic acid was dropped into the mixture in a manner such that the internal temperature did not become greater than 3° C. After stirring for 1 hour, 50 mL of water was added, and 2.45 g (8.4 mmol) of Compound (IV-2D) was obtained by filtering precipitated crystals (80% yield).

$^1$H-NMR (solvent: DMSO-d6) δ (ppm): 1.12 (t, 3H), 2.60 (q, 2H), 6.73 (s, 1H), 9.57 (br s, 1H), 10.55 (br s, 1H)

<Synthesis of Compound (IV-2)>

2.09 g (4.26 mmol) of Compound (I-1C), 0.50 g (1.72 mmol) of Compound (IV-2D) and 10 mL of tetrahydrofuran were mixed, and the mixture was stirred at room temperature. 84.2 mg (0.69 mmol) of N,N-dimethylaminopyridine and 1.00 g (5.22 mmol) of 1-(3-dimethylaminopropyl)-3-ethylcarbodiimide hydrochloride were added to the mixture, and the mixture was stirred for 3 hours at room temperature. Thereafter, liquid separation was carried out by adding ethyl acetate and water. A collected organic layer was cleansed with 1N aqueous hydrochloric acid, a saturated aqueous sodium bicarbonate solution, and a saturated saline solution, and dried with anhydrous sodium sulfate. The sodium sulfate was filtered out, the solvent was removed by a rotary evaporator, and purification by silica gel chromatography was performed, to obtain 1.00 g (0.81 mmol) of Compound (IV-2) (47% yield).

$^1$H-NMR (solvent: CDCl$_3$) δ (ppm): 1.25 (t, 3H), 1.50-1.80 (m, 8H), 2.20-2.45 (m, 8H), 2.50-2.75 (m, 4H), 2.57 (q, 2H), 2.65 (t, 8H), 2.93 (t, 4H), 4.30 (t, 4H), 4.25-4.40 (m, 8H), 5.86 (dd, 2H), 6.14 (dd, 2H), 6.44 (dd, 2H), 6.95-7.05 (m, 4H), 7.17-7.26 (m, 4H), 7.23 (s, 1H)

Example 17

Compound (IV-6) was synthesized according to the following scheme.

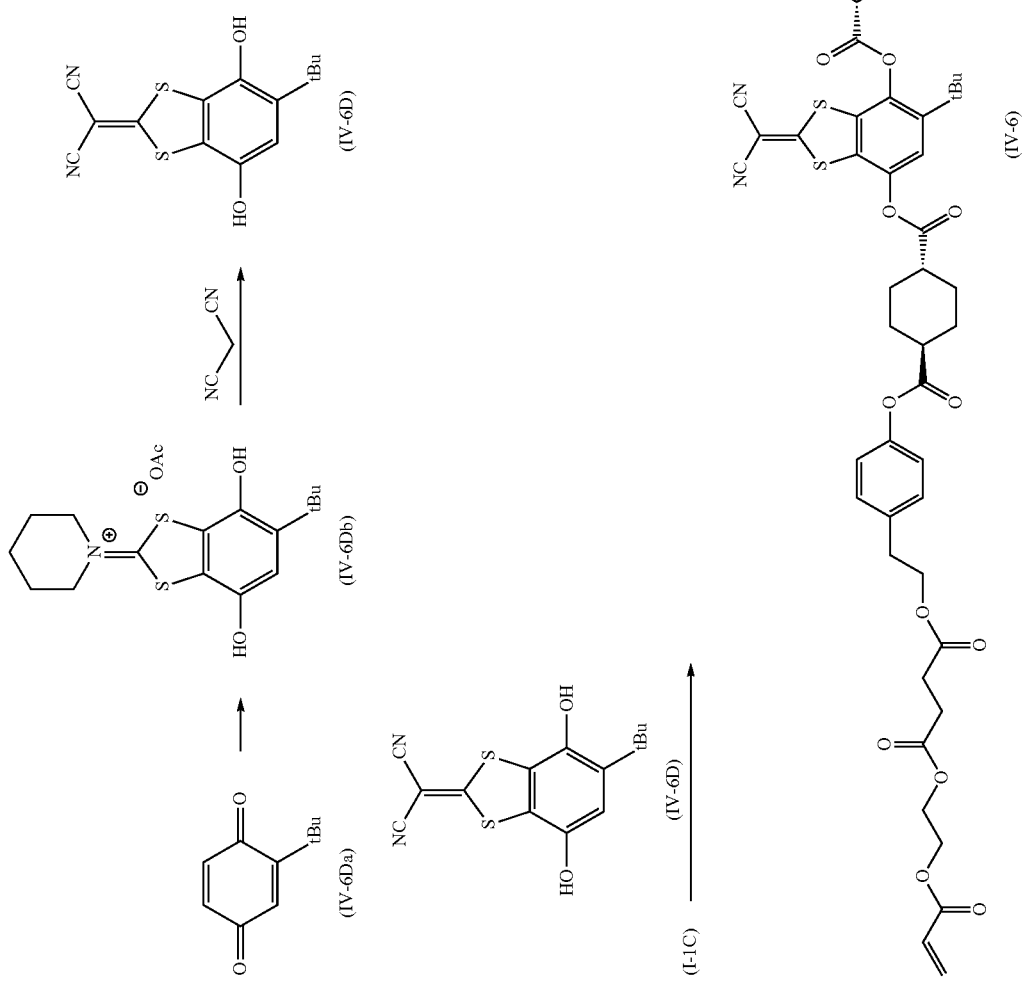

<Synthesis of Compound (IV-6Db)>

12.5 g (51.0 mmol) of Piperidinium pentamethylene dithiocarbamate and 40 mL of N-methylpyrrolidone were mixed and cooled to 5° C. 20 mL of an N-methylpyrrolidone solution containing 10.0 g (61.0 mmol) of 2-tert-butyl-1,4-benzoquinone (IV-6Da) and 12.5 mL of acetic acid was dropped into the mixture, and the mixture was stirred for two hours at 10° C. Next, the internal temperature was cooled to 5° C., and 20 mL of an N-methylpyrrolidone solution containing 6.6 g (61.0 mmol) of 1,4-benzoquinone and 12.5 mL of acetic acid was slowly dropped into the mixture in a manner such that the internal temperature did not become greater than 15° C. The mixture was stirred for 1 hour at room temperature, the internal temperature was raised to 50° C., and the mixture was further stirred for 1 hour. The mixture was cooled to room temperature, acetone was added crystals were precipitated, and the precipitated crystals were filtered and cleansed with acetone to obtain 6.0 g (15.6 mmol) of Compound (IV-6Db) (yield: 31%).

<Synthesis of Compound (IV-6D)>

1.5 g (3.9 mmol) of Compound (IV-6Db), 290 mg (4.4 mmol) of malononitrile, 16 mL of isopropyl alcohol, 0.3 mL of acetic acid, and 0.2 mL of acetic acid anhydride were mixed and stirred for 3 hours under reflux heating. The mixture was cooled to room temperature, water was added to the mixture, and precipitated crystals were filtered, to obtain 0.9 g (2.9 mmol) of Compound (IV-1D) (76% yield).

$^1$H-NMR (solvent: DMSO-d6) δ (ppm): 1.35 (s, 9H), 6.89 (s, 1H), 9.32 (br s, 1H), 10.60 (br s, 1H)

<Synthesis of Compound (IV-6)>

Compound (IV-6) was synthesized in the same manner as the method for synthesizing Compound (IV-2) of Example 16 except that Compound (IV-2D) was changed to Compound (IV-6D).

$^1$H-NMR (solvent: CDCl$_3$) δ (ppm): 1.65-1.80 (m, 8H), 2.25-2.40 (m, 8H), 2.50-2.75 (m, 4H), 2.65 (t, 8H), 2.94 (t, 4H), 4.30 (t, 4H), 4.25-4.40 (m, 8H), 5.87 (dd, 2H), 6.14 (dd, 2H), 6.44 (dd, 2H), 6.97-7.05 (m, 4H), 7.20-7.26 (m, 4H), 7.31 (s, 1H)

Example 18

Compound (IV-10) was synthesized according to the following scheme.

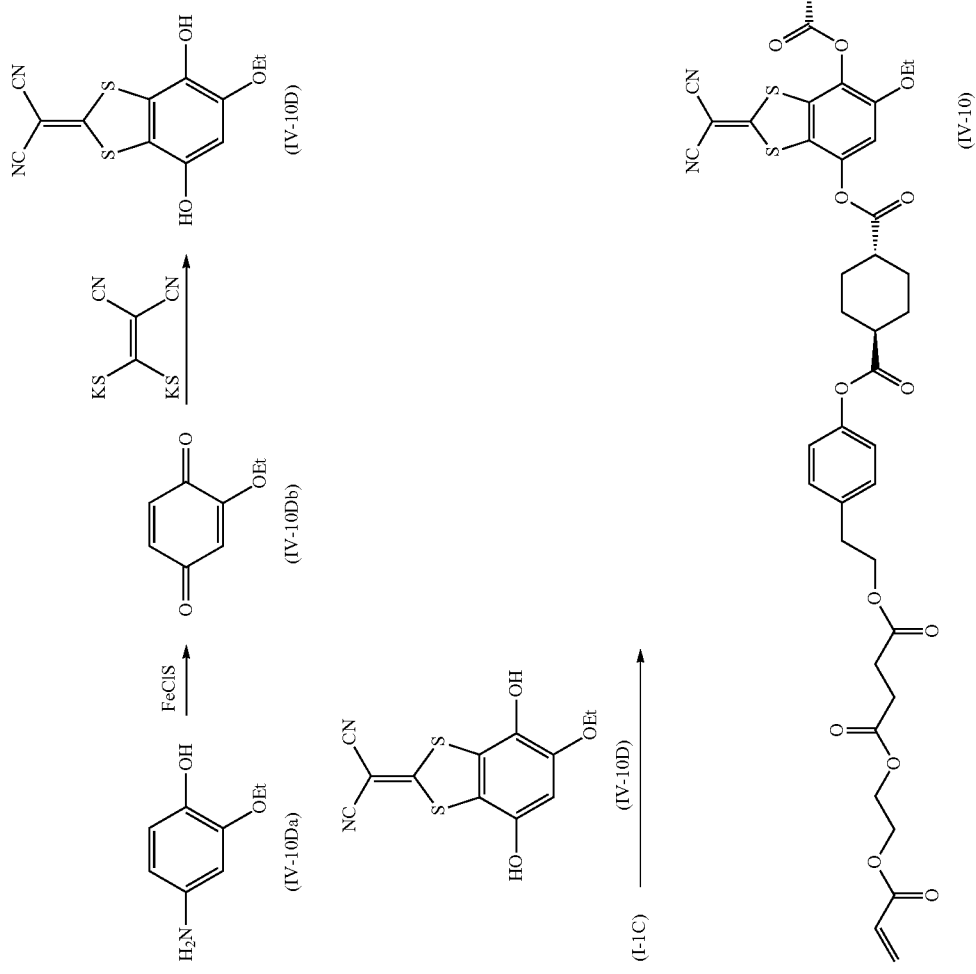

<Synthesis of Compound (IV-10Da)>

Compound (IV-10Da) was synthesized according to the method disclosed in T. Fujisawa et al., "Metabolism of Fungicide Diethofencarb in Grape (*Vitis vinifera* L.): Definitive Identification of Thiolactic Acid Conjugated Metabolites", Journal of Agricultural and Food Chemistry, Vol. 51, No. 18, pp. 5329-5336, 2003.

<Synthesis of Compound (IV-10Db)>

2.6 g (16.7 mmol) of Compound (IV-10Da), 67 mL of water, 2 mL of hydrochloric acid, and 67 mL of ethyl acetate were mixed. 42 mL of an aqueous solution containing 5.4 g (33.4 mmol) of iron chloride (III) was dropped into the mixture, and the mixture was stirred for 30 minutes. Then, liquid separation was carried out by adding water and ethyl acetate to carry out a liquid separation. Thereafter, a rotary evaporator was used to remove the solvent, and purification by silica gel chromatography was performed, to obtain 0.72 g (4.73 mmol) of Compound (IV-10Da) (28% yield).

<Synthesis of Compound (IV-10D)>

Compound (IV-10D) was synthesized in the same manner as the method for synthesizing Compound (IV-2D) of Example 16 except that Compound (IV-2Db) was changed to Compound (IV-10Db).

$^1$H-NMR (solvent: DMSO-d6) δ (ppm): 1.35 (t, 3H), 4.04 (q, 2H), 6.63 (s, 1H), 9.75 (br s, 1H)

<Synthesis of Compound (IV-10)>

Compound (IV-10) was synthesized in the same manner as the method for synthesizing Compound (IV-2) of Example 16 except that Compound (IV-2D) was changed to Compound (IV-10D).

$^1$H-NMR (solvent: CDCl$_3$) δ (ppm): 1.25 (t, 3H), 1.60-1.78 (m, 8H), 2.25-2.40 (m, 8H), 2.55-2.70 (m, 4H), 2.63 (m, 8H), 2.94 (t, 4H), 4.08 (q, 2H) 4.30 (t, 4H), 4.30-4.40 (m, 8H), 5.86 (dd, 2H), 6.16 (dd, 2H), 6.44 (dd, 2H), 6.90 (s, 1H), 7.00-7.08 (m, 4H), 7.20-7.25 (m, 4H)

Example 19

Compound (VI-1) was synthesized according to the following scheme.

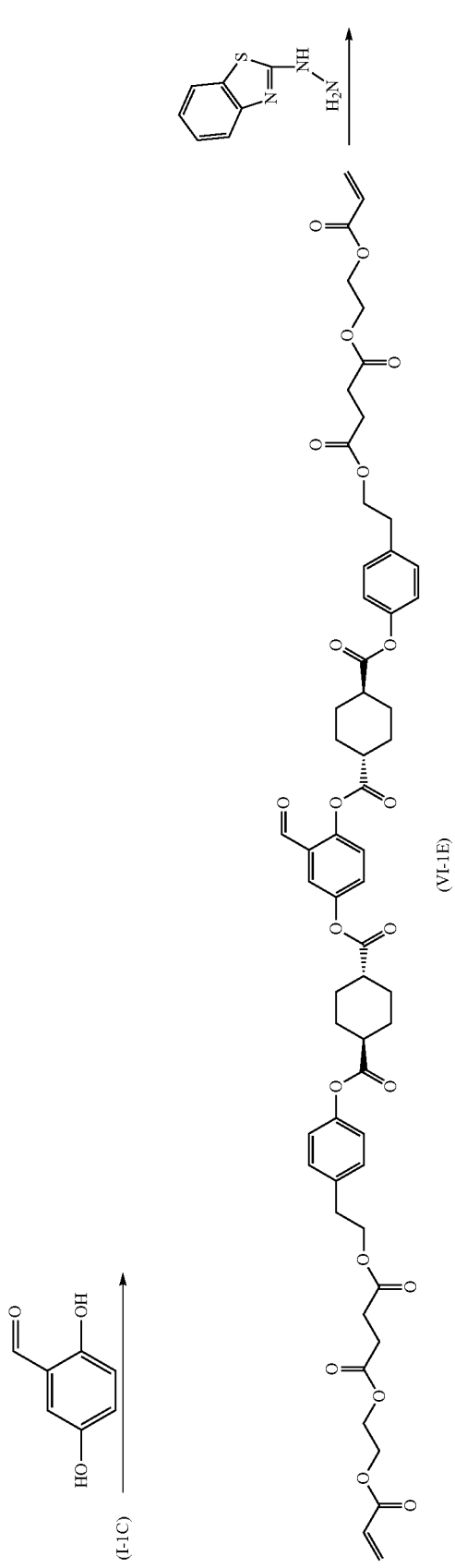
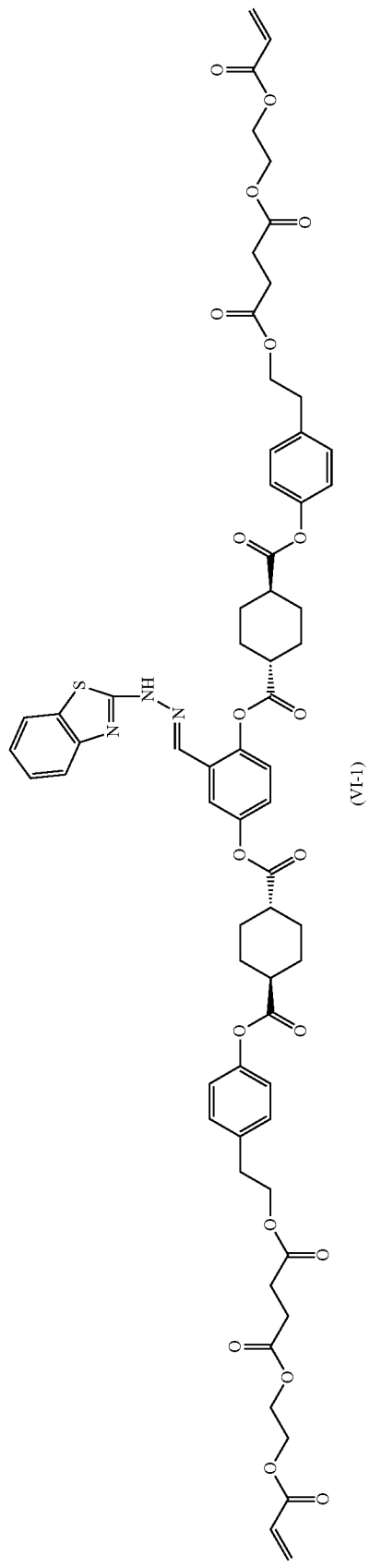

<Synthesis of Compound (VI-1E)>

Compound (VI-1E) was synthesized in the same manner as the method for synthesizing Compound (IV-2) of Example 16 except that Compound (IV-2D) was changed to 2,5-dihydroxy benzaldehyde.

<Synthesis of Compound (VI-1)>

0.5 g (0.46 mmol) of Compound (VI-1E), 99 mg (0.60 mmol) of 2-hydrazino-benzothiazole, 5.4 mg (0.01 mmol) of 10-camphorsulfonic acid, and 10 mL of tetrahydrofuran were mixed, and stirred for 12 hours at room temperature. Liquid separation was carried out by adding ethyl acetate and water to the mixture. A collected organic layer was cleansed with 1N aqueous hydrochloric acid and a saturated saline solution, and then dried with anhydrous sodium sulfate. The sodium sulfate was filtered out, the solvent was removed by a rotary evaporator, and purification by silica gel chromatography was carried out to obtain 0.4 g (0.33 mmol) of Compound (VI-1) (70% yield).

$^1$H-NMR (solvent: DMSO-d6) δ (ppm): 1.40-1.75 (m, 8H), 2.10-2.30 (m, 8H), 2.55 (s, 8H), 2.60-2.80 (m, 4H), 2.89 (t, 4H), 4.23 (t, 4H), 4.23-4.35 (m, 8H), 5.96 (dd, 2H), 6.18 (dd, 2H), 6.35 (dd, 2H), 7.05 (d, 4H), 7.13 (m, 1H), 7.20-7.35 (m, 3H), 7.30 (d, 4H), 7.47 (br s, 1H), 7.60 (d, 1H), 7.80 (br d, 1H), 8.09 (s, 1H), 12.5 (br s, 1H)

Example 20

Compound (VI-7) was synthesized according to the following scheme.

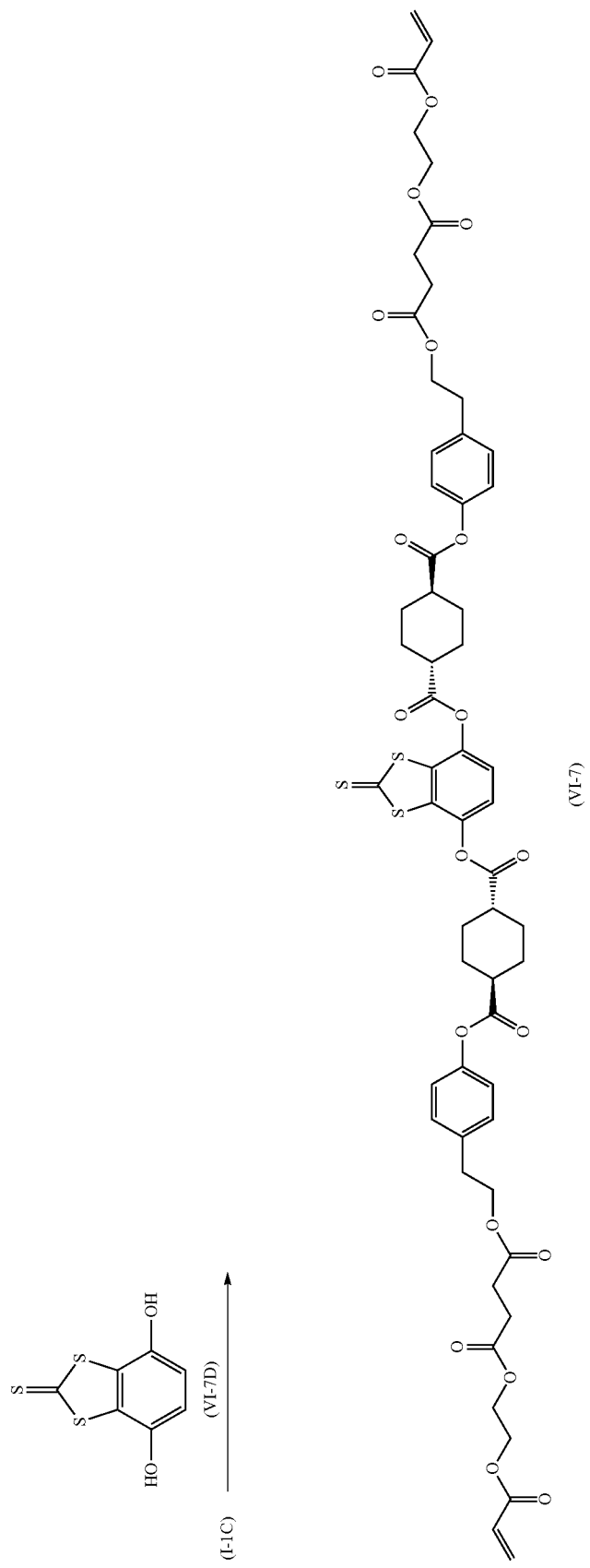

<Synthesis of Compound (VI-7D)>

Compound (VI-7D) was synthesized according to the method disclosed in F. Dumur et al., "Novel Fused D-A Dyad and A-D-A Triad Incorporating Tetrathiafulvalene and p-Benzoquinone", Journal of Organic Chemistry, Vol. 69, No. 6, pp. 2164-2177, 2004.

<Synthesis of Compound (VI-7)>

Compound (VI-7) was synthesized in the same manner as the method for synthesizing Compound (IV-2) of Example 16 except that Compound (IV-2D) was changed to Compound (VI-7D).

$^1$H-NMR (solvent: CDCl$_3$) δ (ppm): 1.58-1.78 (m, 8H), 2.20-2.40 (m, 8H), 2.55-2.70 (m, 4H), 2.63 (m, 8H), 2.94 (t, 4H), 4.30 (t, 4H), 4.30-4.40 (m, 8H), 5.86 (dd, 2H), 6.14 (dd, 2H), 6.44 (dd, 2H), 6.98-7.05 (m, 4H), 7.20-7.24 (m, 4H), 7.25 (s, 2H)

Example 21

Compound (IV-4) was synthesized according to the following scheme.

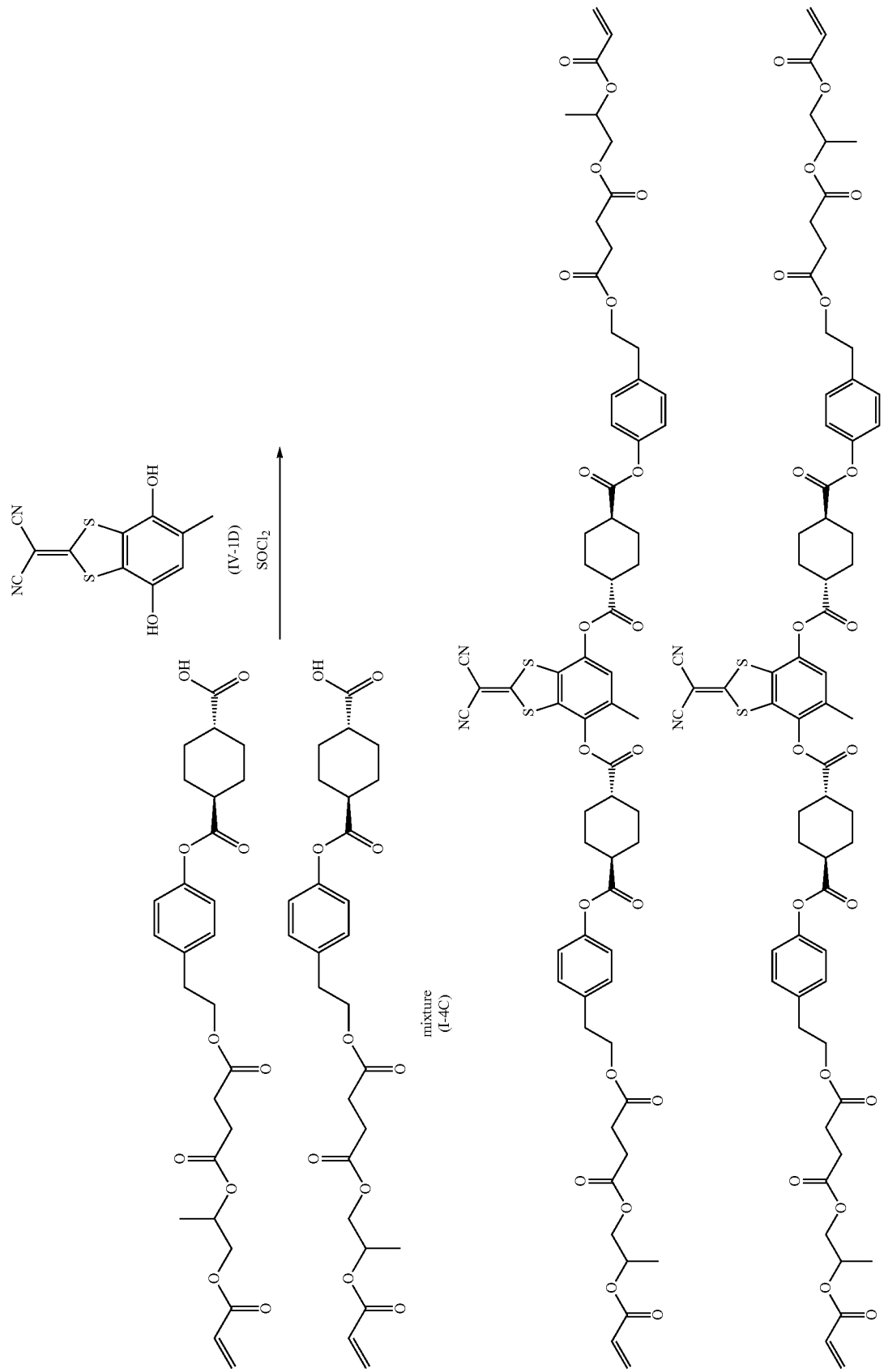

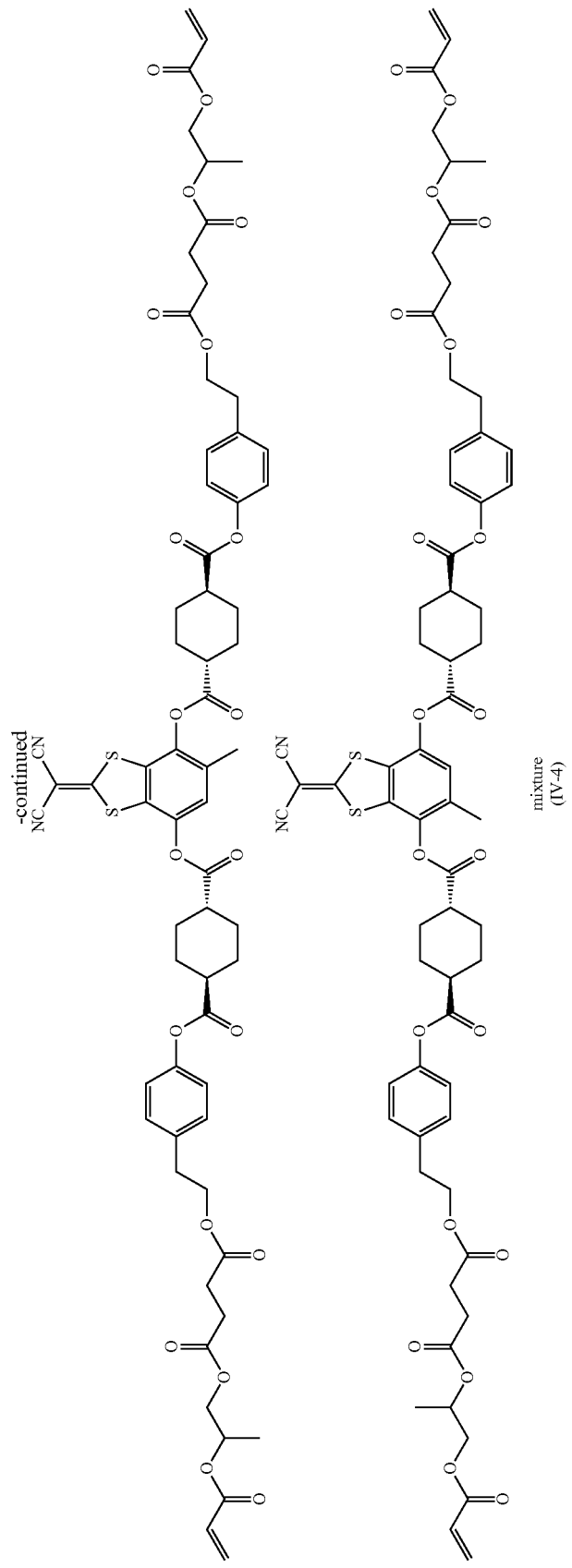

<Synthesis of Compound (IV-4)>

Compound (IV-4) was synthesized in the same manner as the method for synthesizing Compound (I-4) of Example 4 except that Compound (I-1D) was changed to Compound (IV-1D). (81% yield)

$^1$H-NMR (solvent: CDCl$_3$) δ (ppm): [Major Isomer] 1.27 (d, 6H), 1.56-1.79 (m, 8H), 2.22 (s, 3H), 2.22-2.40 (m, 8H), 2.55-2.75 (m, 4H), 2.62 (s, 8H), 2.94 (t, 4H), 4.15 (dd, 2H), 4.25 (dd, 2H), 4.28 (t, 4H), 5.20 (m, 2H), 5.86 (dd, 2H), 6.13 (dd, 2H), 6.43 (dd, 2H), 6.99-7.06 (m, 4H), 7.20-7.25 (m, 4H), 7.25 (s, 1H) [Minor Isomer] 1.29 (d, 6H), 1.56-1.79 (m, 8H), 2.22 (s, 3H), 2.22-2.40 (m, 8H), 2.55-2.75 (m, 4H), 2.62 (s, 8H), 2.94 (t, 4H), 4.12 (dd, 2H), 4.22 (dd, 2H), 4.28 (t, 4H), 5.20 (m, 2H), 5.84 (dd, 2H), 6.11 (dd, 2H), 6.41 (dd, 2H), 6.99-7.06 (m, 4H), 7.20-7.25 (m, 4H), 7.25 (s, 1H)

The purity of Compound (IV-4) was 92%, and a total of 6% of the compound (IV-4E) below due to the impurity (I-4a') included in the raw material (I-4a) is contained therein.

(IV-4E)
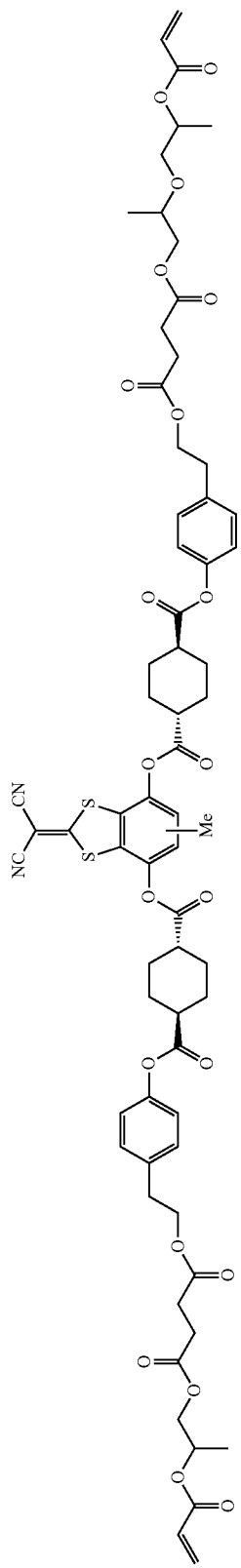
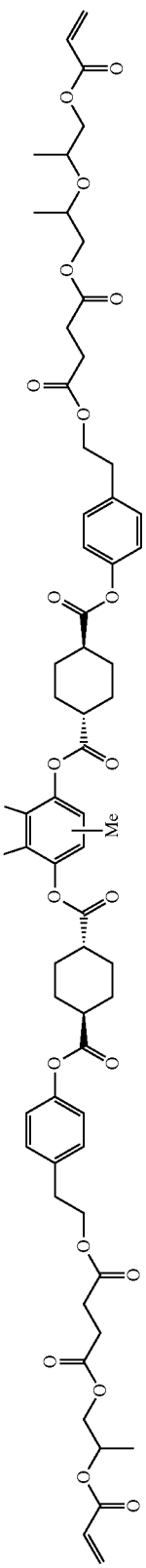
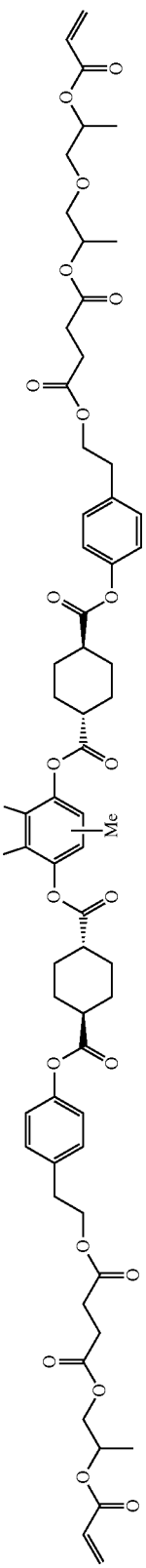
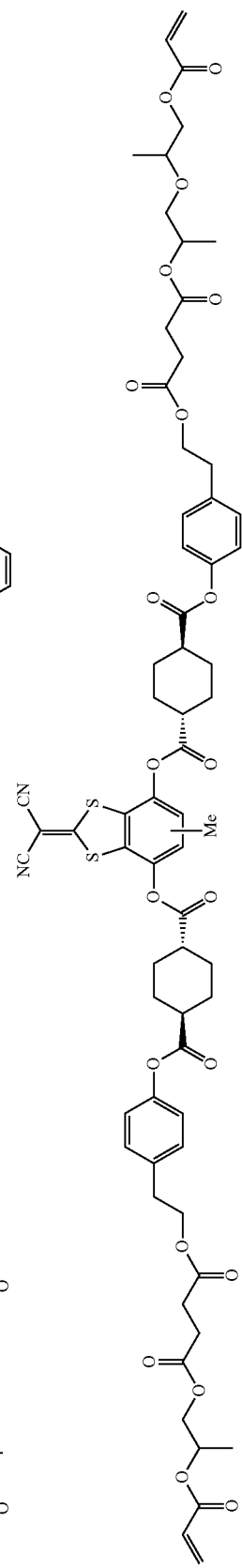

-continued
113
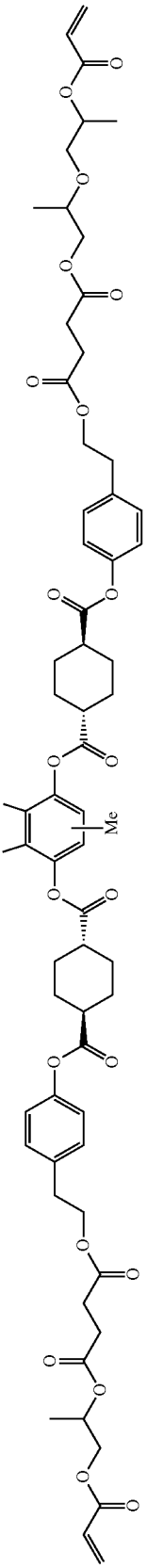
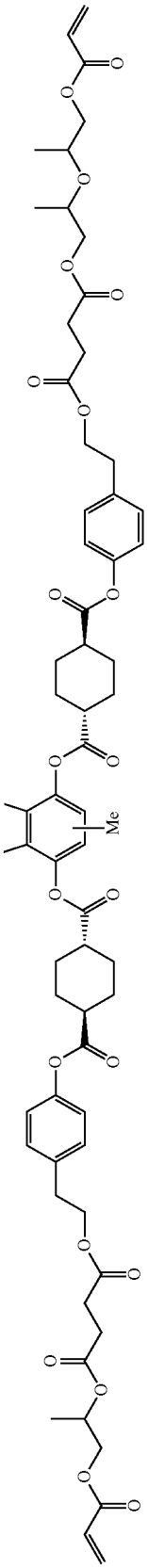
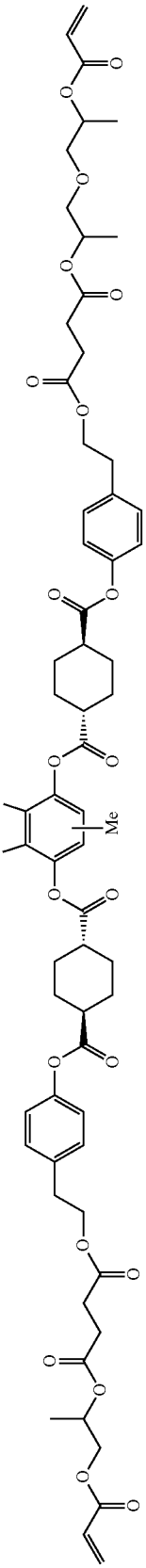
114
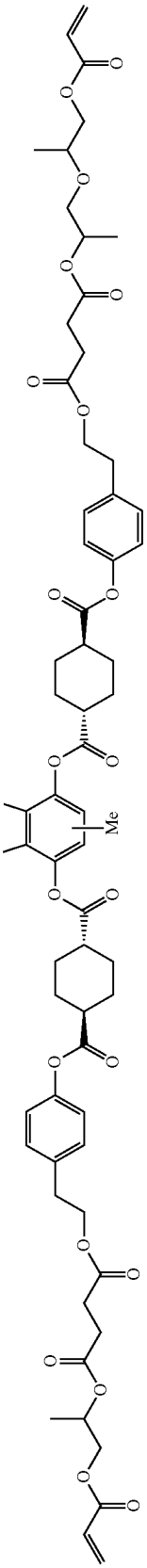
mixture

-continued
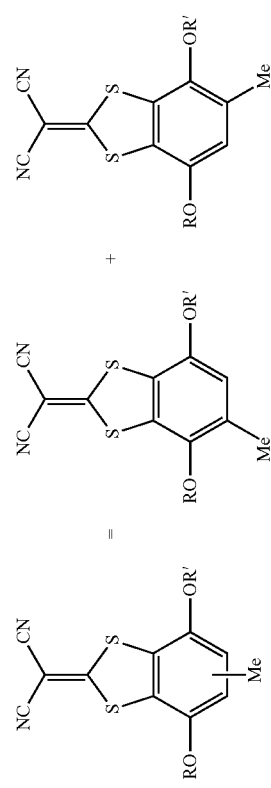

Example 22

Compound (VII-4) was synthesized according to the following scheme.

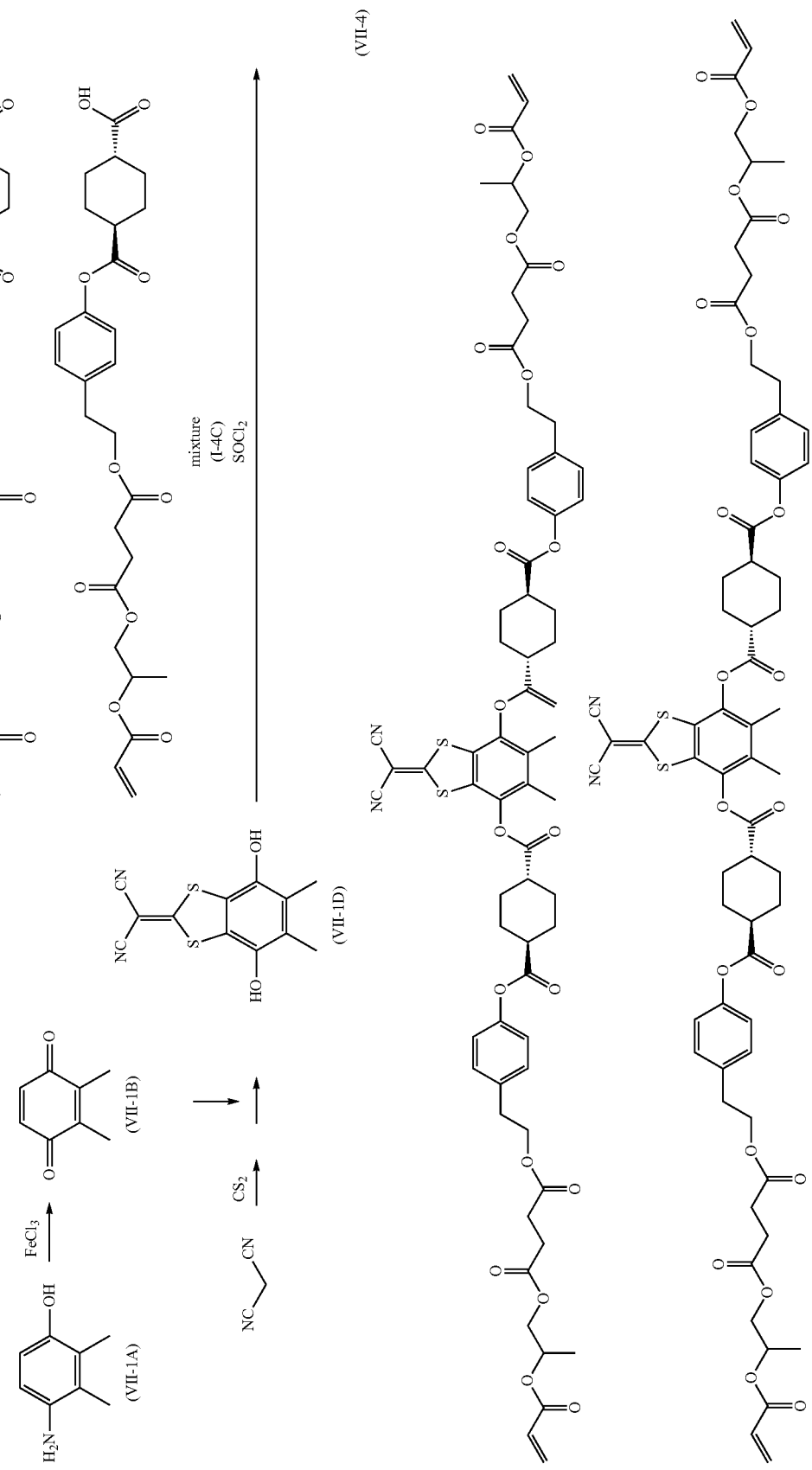

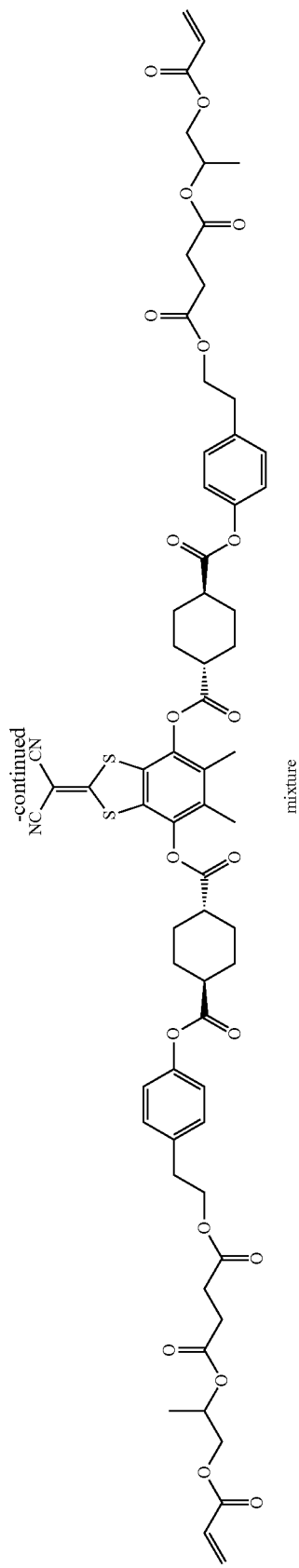

<Synthesis of Compound (VII-1B)>

25.8 g (0.188 mol) of 4-amino-2,3-dimethyl phenol (Compound VII-1A) and 723 mL of ethyl acetate were mixed, and then 258 mL of water, and 22.6 mL of concentrated hydrochloric acid were further added to the mixture. 465 mL of a solution, in which 61.1 g (0.377 mol) of iron chloride (III) was dissolved in water was dropped into the mixture with the internal temperature within a range from 20° C. to 30° C. for 30 minutes. After stirring for 1 hour at room temperature, precipitated solids within the reaction system were filtered out and liquid separation was carried out. An organic layer was cleansed with 400 mL of a saturated saline solution. The cleansing operation was repeated three times thereafter, then the organic layer was dried with anhydrous magnesium sulfate. The magnesium sulfate was filtered out, the solvent was evaporated under reduced pressure, and the residue was purified by column chromatography (developing solvent ethyl acetate/n-hexane=1/6). The solvent was evaporated under reduced pressure to obtain 23.7 g of Compound (I-1B) as a yellow solid product (92.6% yield). $^1$H-NMR (solvent: CDCl$_3$) σ (ppm): 2.04 (s, 6H), 6.73 (s, 2H)

<Synthesis of Compound (VII-1D)>

7.55 g (0.114 mol) of potassium hydroxide (85%) was added to a mixture of 18 mL of isopropanol and 23 mL of water, dissolved therein, and cooled to an internal temperature within a range from 0° C. to 5° C. 3.78 g (0.057 mol) of malononitrile (I-1C) and 3 mL of isopropanol were mixed and dropped into the mixture at an internal temperature within a range from 0° C. to 10° C. The mixture was stirred for 10 minutes at an internal temperature within a range from 0° C. to 10° C., and then 4.36 g (0.057 mmol) was dropped into the mixture at an internal temperature within a range from 0° C. to 8° C. The mixture was stirred for 40 minutes at an internal temperature within a range from 0° C. to 10° C., and then 1.03 g (0.017 mol) of acetic acid was dropped into the mixture at an internal temperature within a range from 0° C. to 8° C. 60 mL of isopropanol was added, and the mixture was stirred for 10 minutes under a nitrogen stream while cooling the internal temperature to −10° C. A solution containing 15.41 g (0.113 mol) of Compound (I-1B), 52 mL of acetone, and 6.80 g of acetic acid was dropped into the mixture under a nitrogen stream at an internal temperature within a range of −10° C. to 0° C. After stirring for 50 minutes at an internal temperature within a range of −10° C. to 0° C., the internal temperature was increased to 5° C., and 200 mL of water was dropped into the mixture at an internal temperature of 10° C. or less. The mixture was stirred for 40 minutes at an internal temperature within a range from 5° C. to 10° C., and precipitated crystals were agglomerated, to obtain 13.2 g of Compound (VII-1D) as a pale brown solid. (83.6% yield).

$^1$H-NMR (solvent: DMSO) σ (ppm): 2.15 (s, 6H), 9.57 (s, 2H)

<Synthesis of Compound (VII-4)>

16.98 g (0.026 mol) of Compound (VII-4E) (76.17%), 73 mL of ethyl acetate, 18 mL of N,N-dimethylacetamide, and 38.8 mg of 2,6-di-t-butyl-4-methylphenol were mixed, and the internal temperature was cooled to 0° C. 3.18 g (0.027 mol) of thionyl chloride was dropped into the mixture at an internal temperature within a range from 0° C. to 5° C. After stirring for 50 minutes at 5° C., a solution containing 3.0 g (0.011 mol) of Compound (I-1E), 22 mL of tetrahydrofuran, and 17 mL of N,N-dimethylacetamide was dropped into the mixture at an internal temperature within a range from 0° C. to 8° C. Thereafter, 6.9 g (0.053 mol) of N,N-diisopropylethylamine was dropped into the mixture at an internal temperature within a range from 0° C. to 10° C. The mixture was stilled for 2 hours at an internal temperature within a range from 15° C. to 20° C. Next, cleansing was carried out by adding 100 mL of ethyl acetate, 100 mL of water, and 5.3 mL of concentrated hydrochloric acid. An organic layer was washed with 100 mL of a saturated saline solution, and then liquid separation was carried out. Next, cleansing and liquid separation were carried out with 75 mL of a saturated saline solution and 25 mL of a 7.5 wt % sodium bicarbonate water. After further washing with 100 mL of a saturated saline solution, the organic layer was dried with anhydrous magnesium sulfate. The magnesium sulfate was filtered out, and the solvent was evaporated under reduced pressure. Thereafter, recrystallization was carried out with 70 mL of ethyl acetate and 180 mL of methanol, to obtain 10.8 g of Compound (VII-4) (79.7% yield).

$^1$H-NMR (solvent: CDCl$_3$) σ (ppm): 1.26-1.30 (m, 6H), 1.64-1.81 (m, 8H), 2.13 (s, 6H), 2.33-2.35 (m, 8H), 2.62-2.72 (m, 12H), 2.94 (t, 4H), 4.10-4.26 (m, 4H), 4.27-4.32 (t, 4H), 5.15-5.26 (m, 2H), 5.82-5.88 (m, 2H), 6.07-6.18 (m, 2H), 6.38-6.40 (m, 2H), 7.01-7.04 (m, 4H), 7.22-7.25 (m, 4H)

The purity of Compound (VII-4) was 92%, and a total of 6% of the compound (VII-4E) below due to the impurity (I-4a') included in the raw material (I-4a) is contained therein.

(VII-4E)
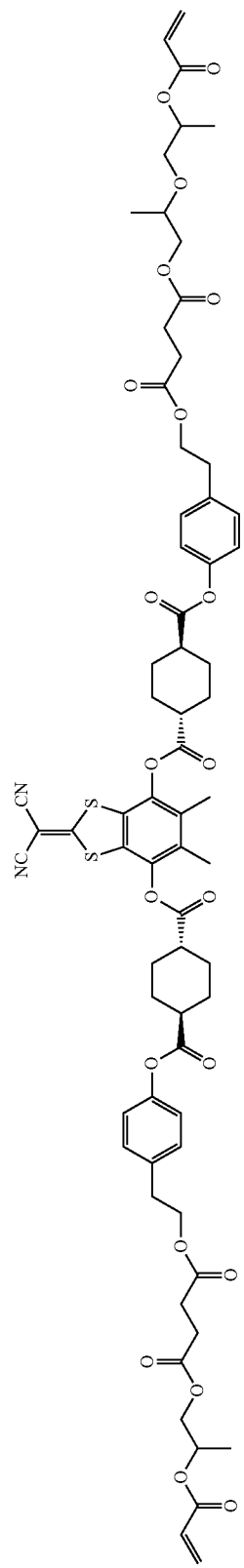
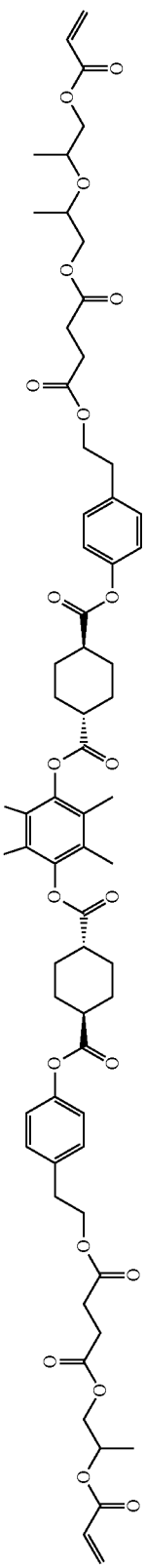
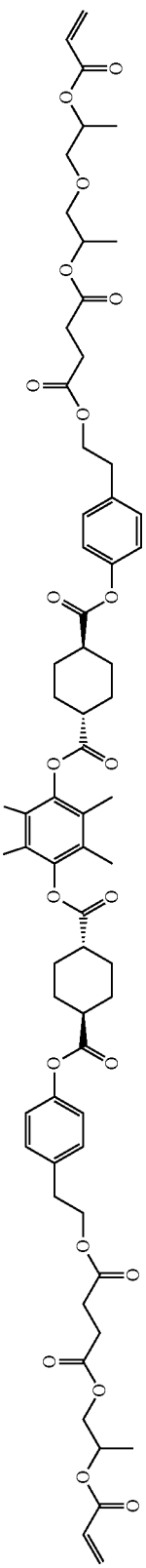
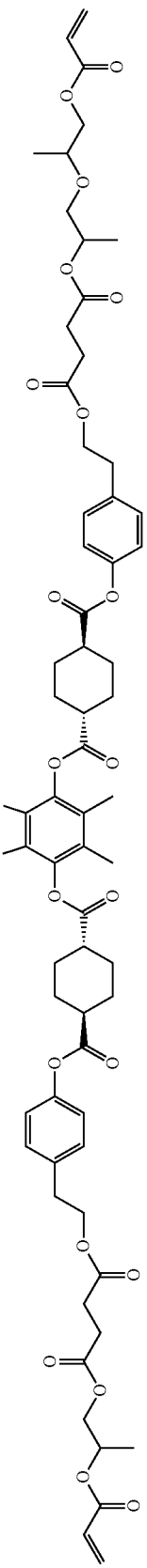

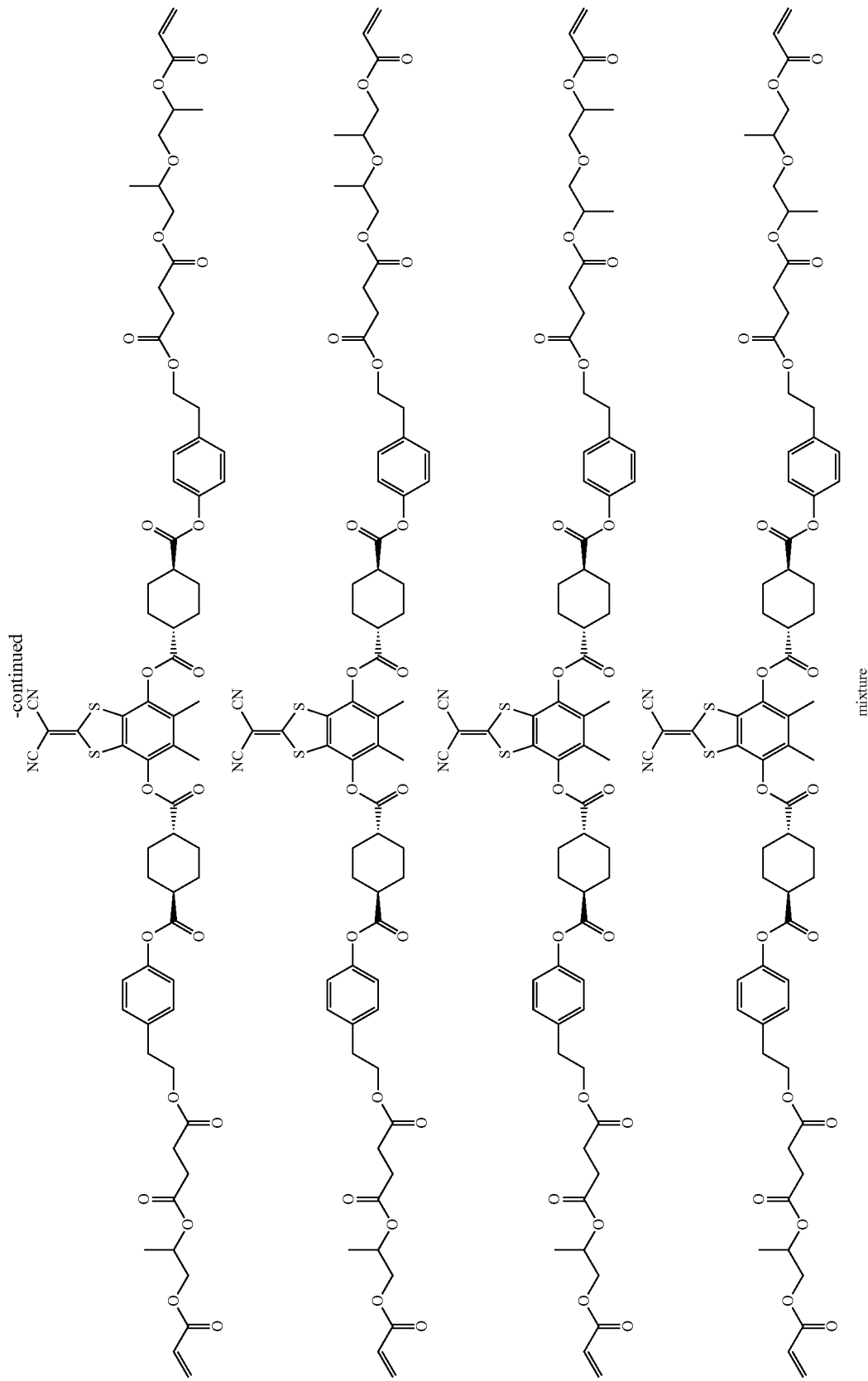

(Comparative Compound-1)

Comparative Examples 1 through 7 below are examples of synthesized compounds (comparative compounds) having the side chain portion represented by Formula (Ia) below, which is mainly used in the Background Art Documents (Japanese Unexamined Patent Publication No. 2011-207765 and International Patent Publication No. 2014/010325).

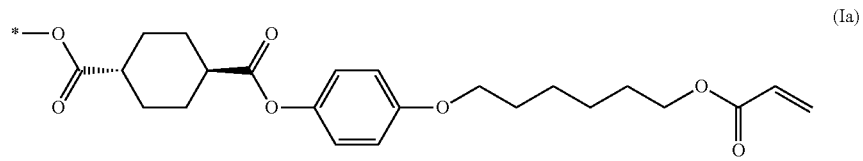 [SMILES: *OC(=O)[C@H]1CC[C@H](C(=O)Oc2ccc(OCCCCCCOC(=O)C=C)cc2)CC1]

(Ia)

The structural formulae of the comparative compounds used in the Comparative Examples are as shown below.

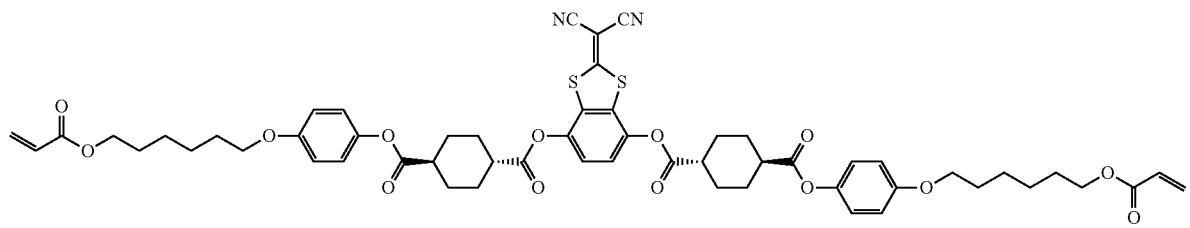

(Ia-1)

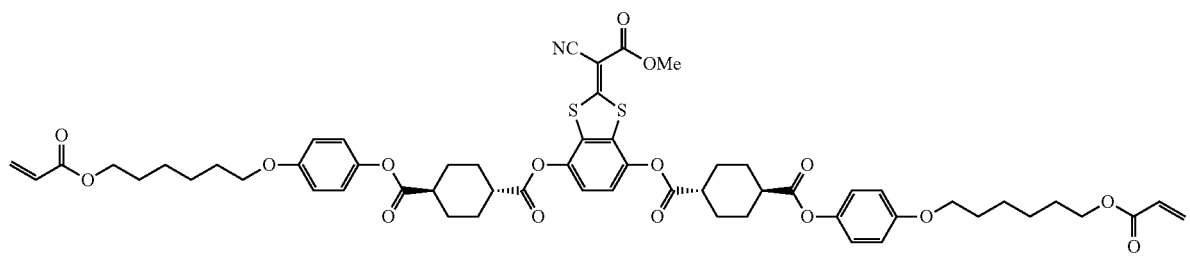

(IIIa-3)

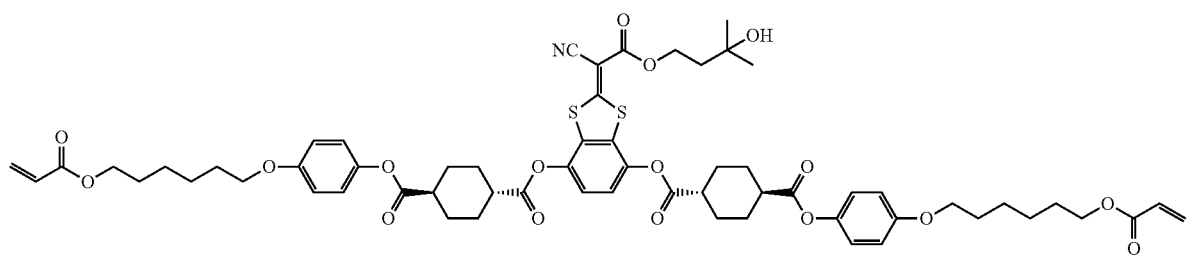

(IIIa-7)

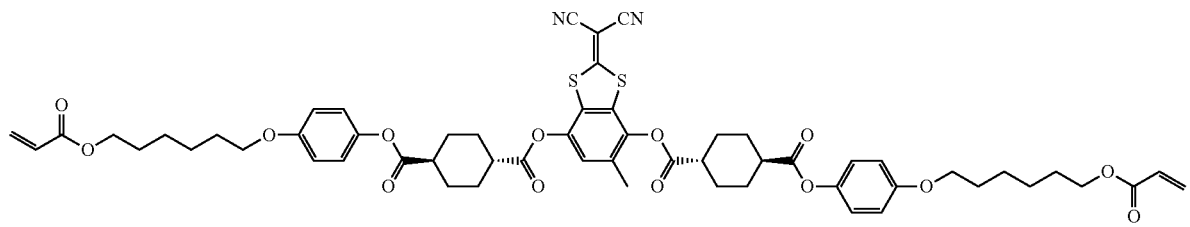

(IVa-1)

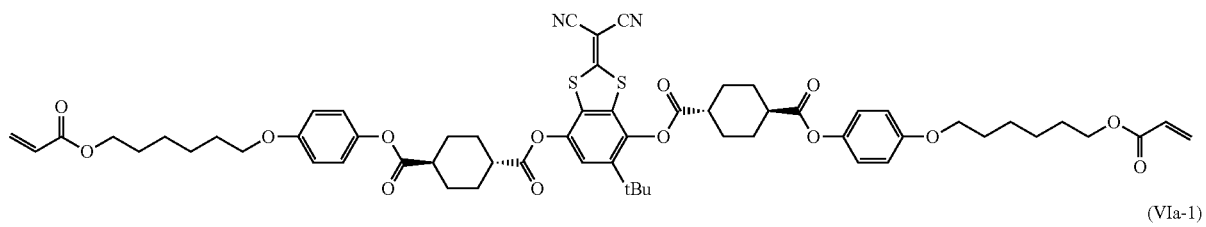
(IVa-6)
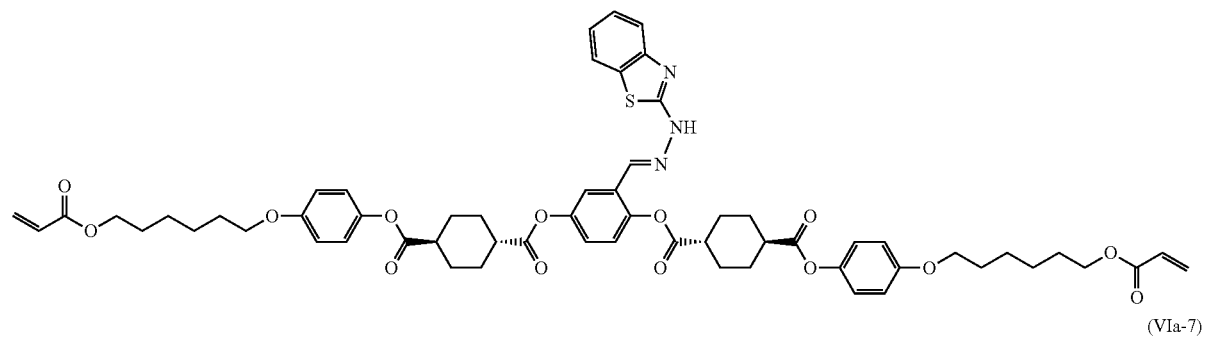
(VIa-1)
(VIa-7)
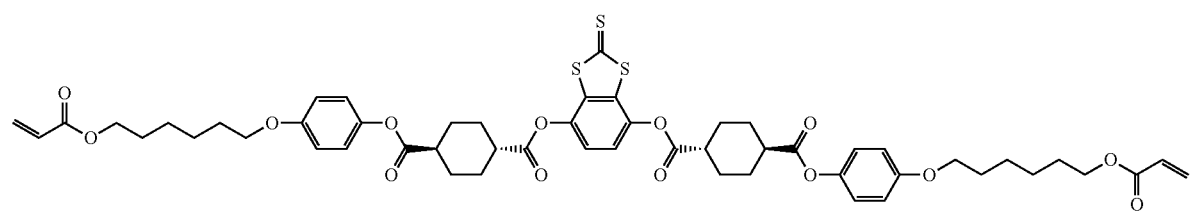
Comparative Example 1
Compound (Ia-1) was synthesized according to the following scheme.
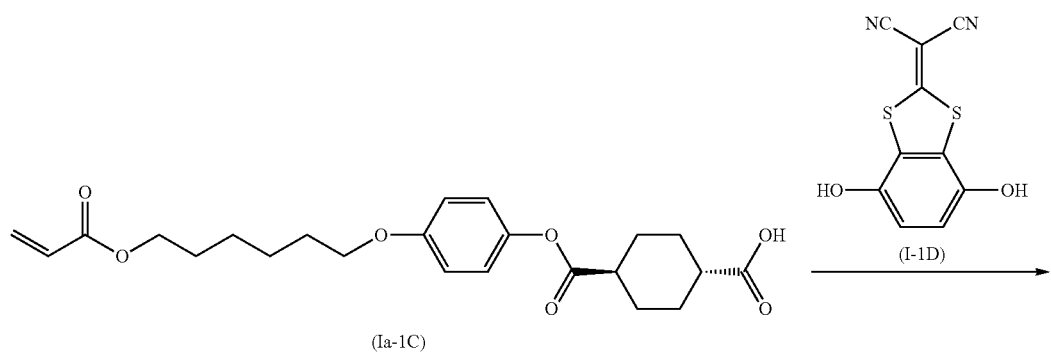
(Ia-1C)  (I-1D)
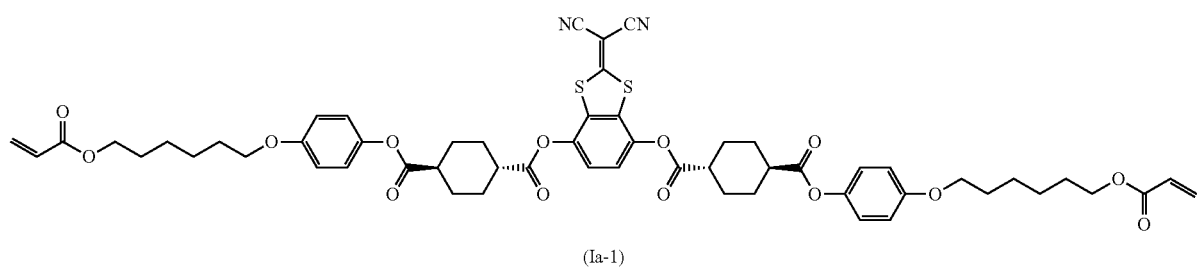
(Ia-1)

<Synthesis of Compound (Ia-1C)>

Compound (Ia-1C) was synthesized according to the method disclosed in Japanese Unexamined Patent Publication No. 2010-031223 (5 steps, 28% yield).

<Synthesis of Compound (Ia-1)>

1.25 g (2.99 mmol) of Compound (Ia-1C), 337 mg (1.36 mmol) of Compound (I-1D), and 10 mL of dichloromethane were mixed, and the mixture was stirred at room temperature. 27 mg (0.22 mmol) of N,N-dimethylaminopyridine and 840 mg (4.35 mmol) of 1-(3-dimethylaminopropyl)-3-ethylcarbodiimide hydrochloride were added, followed by stirring for 12 hours at room temperature. Thereafter, liquid separation was carried out by adding ethyl acetate and water. A collected organic layer was cleansed with 1N aqueous hydrochloric acid and a saturated saline solution, and dried with anhydrous sodium sulfate. The sodium sulfate was filtered out, the solvent was removed by a rotary evaporator, and purification was carried out by silica gel chromatography, to obtain 0.6 g (0.57 mmol) of Compound (Ia-1) (42% yield).

$^1$H-NMR (solvent: CDCl$_3$) δ (ppm): 1.40-1.55 (m, 8H), 1.65-1.85 (m, 16H), 2.23-2.40 (m, 8H), 2.55-2.73 (m, 4H), 3.94 (t, 4H), 4.17 (t, 4H), 5.84 (dd, 2H), 6.12 (dd, 2H), 6.40 (dd, 2H), 6.84-6.92 (m, 4H), 6.94-7.02 (m, 4H), 7.32 (s, 2H)

Comparative Example 2

Comparative Compound (IIIa-3) was synthesized in the same manner as the method for synthesizing Compound (Ia-1) of Comparative Example 1 except that Compound (I-1D) was changed to Compound (III-3D).

Comparative Example 3

Comparative Compound (IIIa-7) was synthesized in the same manner as the method for synthesizing Compound (Ia-1) of Comparative Example 1 except that Compound (I-1D) was changed to Compound (III-7D).

Comparative Example 4

Comparative Compound (IVa-1) was synthesized in the same manner as the method for synthesizing Compound (Ia-1) of Comparative Example 1 except that Compound (I-1D) was changed to Compound (IV-1D).

Comparative Example 5

Comparative Compound (IVa-6) was synthesized in the same manner as the method for synthesizing Compound (Ia-1) of Comparative Example 1 except that Compound (I-1D) was changed to Compound (IV-6D).

Comparative Example 6

Compound (VIa-1) was synthesized according to the method disclosed in International Patent Publication No. 2014/010325.

Comparative Example 7

Comparative Compound (VIa-7) was synthesized in the same manner as the method for synthesizing Compound (Ia-1) of Comparative Example 1 except that Compound (I-1D) was changed to Compound (VI-7D).

(Comparative Compound 2)

Comparative Examples 8 through 10, and 15 are examples of synthesized comparative compounds having the structural formulae below.

(Ib-1)

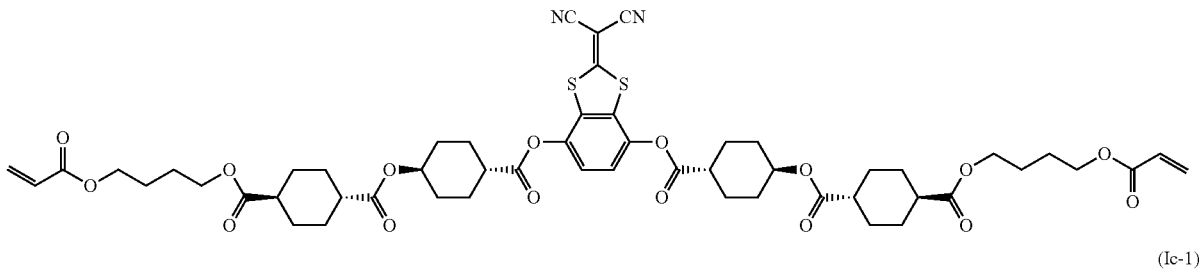

(Ic-1)

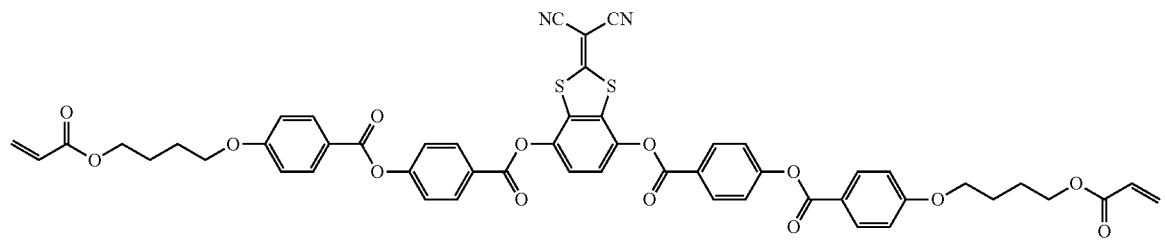

(Id-1)

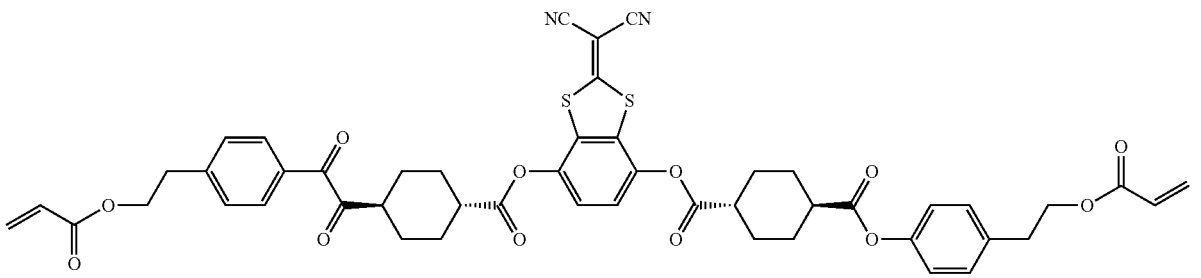

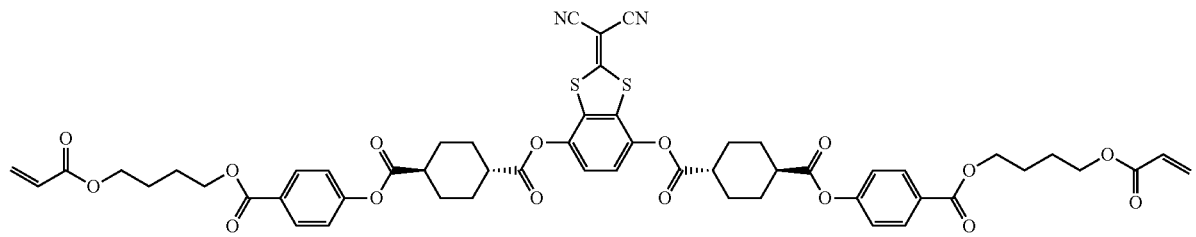

(Ie-1)

Comparative Example 8

Comparative Compound (Ib-1) was synthesized in the same manner as the method for synthesizing Compound (Ia-1) of Comparative Example 1 except that Compound (Ia-1C) was changed to Compound (Ib-1C). Note that Compound (Ib-1C) was synthesized according to the method disclosed in Japanese Unexamined Patent Publication No. 2009-179563.

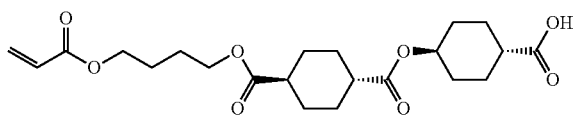

(Ib-1C)

Comparative Example 9

Comparative Compound (Ic-1) was synthesized in the same manner as the method for synthesizing Compound (Ia-1) of Comparative Example 1 except that Compound (Ia-1C) was changed to Compound (Ic-1C). Note that Compound (Ic-1C) was synthesized according to the method disclosed in International Patent Publication No. 2013/035733.

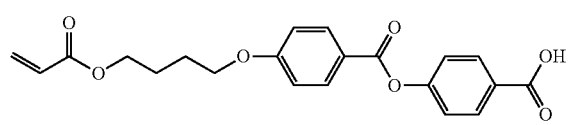

(Ic-1C)

Comparative Example 10

Comparative Compound (Id-1) was synthesized in the same manner as the method for synthesizing Compound (Ia-1) of Comparative Example 1 except that Compound (Ia-1C) was changed to Compound (Id-1C). Note that Compound (Id-1C) was synthesized in the same manner as Compound (I-14C) of Example 9 except that 10-undecenoic acid was changed to acrylic acid chloride.

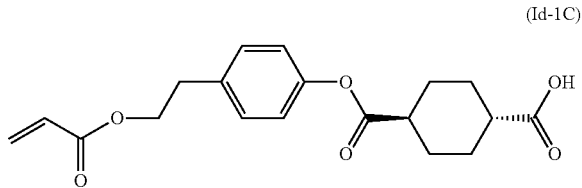 [SMILES: C=CC(=O)OCCc1ccc(OC(=O)[C@H]2CC[C@H](C(=O)O)CC2)cc1]

(Id-1C)

(Evaluation of Phase Transition Temperature)

The phase transition temperatures of the synthesized liquid crystal compounds of the Examples and Comparative Examples were observed using a polarizing microscope to evaluate the degrees of temperature decrease. Specifically, the compounds of the Examples were compared to the compounds of the Comparative Examples, which have different structures for the side chain portions thereof. That is, the phase transition temperature of a compound of a Comparative Example having Ar (the aromatic ring at the center of General Formula 1) in common with the Examples and a side chain portion represented by Formula (Ia) below was used as a reference. Evaluations of A through C were assigned according to the degree of temperature decrease from the reference phase transition temperature.

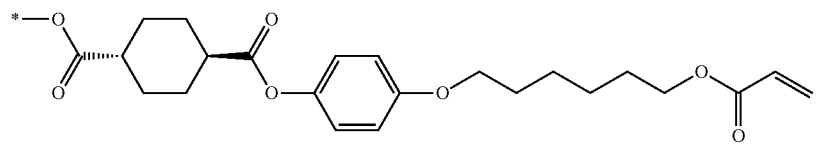

(Ia)

For example, compound (I-1) and (I-2) were compared to Comparative Compound (Ia-1), and Compound (III-3) was compared to Comparative Compound (IIIa-3). The evaluation was carried out based on the following criteria.
A: decrease in melting point or Sm-N (smectic-nematic) transition temperature is 20° C. or greater
B: decrease in melting point or Sm-N (smectic-nematic) transition temperature is 5° C. or greater and less than 20° C.
C: decrease in melting point or Sm-N (smectic-nematic) transition temperature is less than 5° C.
(Measurement of Solubility)

Solubility measurements of the synthesized liquid crystal compounds were conducted by the following method. 50 mg of each compound was weighted into a 1.5 mL sample bottle, and solvent was added until the solid component became 40 wt % (75 mg). The solubility was determined to be 40 wt % if clear under visual observation after shaking well manually at room temperature. If undissolved residue was present, solvent was added such that the solid component became 35 wt % (+18 mg). The solubility was determined to be 35 wt % if clear under visual observation after shaking well manually at room temperature. If undissolved residue was present, solvent was added such that the solid component became 30 wt %. Similar operations were performed in increments of 5 wt %, and repeated until the solid component became 5 wt %. If undissolved residue was present, the solubility was determined to be less than 5 wt % (<5 wt %), and measurements were completed. MEK (methyl ethyl ketone) and CPN (cyclopentanone) were utilized as solvents for measuring solubility.
(Evaluation of Solubility)

The measured values of solubility were evaluated. The evaluations were conducted by using solubility of a compound of a Comparative Example having Ar (the aromatic ring at the center of General Formula 1) in common with the Examples and a side chain portion represented by Formula (Ia) as a reference, in a manner similar to that in the evaluation of the phase transition temperature. Evaluations of A through C were assigned according to the degree of improvement in solubility from the reference solubility.

For example, compound (I-1) and (I-2) were compared to Comparative Compound (Ia-1), and Compound (III-3) was compared to Comparative Compound (IIIa-3). The evaluation was carried out based on the following criteria.
A: solubility improved twofold or greater in plural solvents or a single solvent
B: solubility was the same or improved up to twofold in plural solvents or a single solvent
C: no improvement in solubility in plural solvents or a single solvent
(Evaluation of Synthesis Suitability of Side Chain Portion)

The portions of the compounds of the present disclosure other than the aromatic ring Ar located at the center (the portion that contributes significantly to reverse dispersing properties) are defined as side chain portions. For example, the side chain portion of Compound (I-1) is represented by Formula (I) below, and the side chain portion of Compound (Ia-1) is represented by Formula (Ia) below.

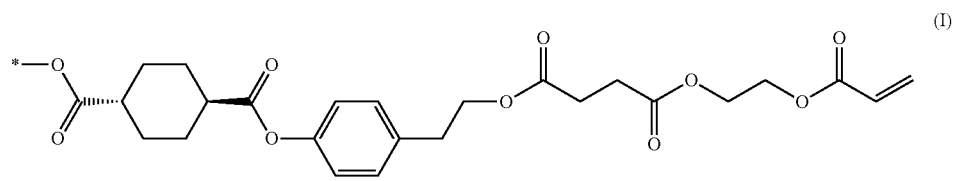

(I)

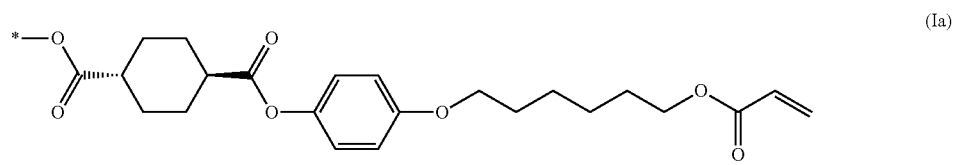

(Ia)

The synthesis suitability of this side chain portion was evaluated according to the following criteria.

A: 3 or fewer steps and yield of 50% or greater from commercially available starting materials B: 3 or fewer steps and yield of 35% or greater from commercially available starting materials, or 5 or fewer steps and yield of 50% or greater from commercially available starting materials C: Other The solubility, phase transition temperature, and the synthesis suitability of the compounds synthesized as Examples 1 through 22 and Comparative Examples 1 through 10 are shown in Table 1 below. With respect to the phase transition temperature, the numerical value in parentheses represents the numerical value during temperature decrease, and other numerical values represent a numerical value during temperature increase.

TABLE 1

| Example Number | Compound | Thermal Properties ||||  Solubility || Side Chain Portion |
| | | $T_m$ (° C.) Melting Point | $T_{sm-N}$ (° C.) Sm—N Transition Point | $T_{Ni}$ (° C.) Isotropic Phase Transition Point | Phase Transition Temperature Evaluation of Decrease | MEK wt % | CPN wt % Evaluation | Synthesis Suitability |
|---|---|---|---|---|---|---|---|---|
| Example 1 | I-1 | 108 | 140 | 172 | A | 20 | 40 A | A |
| Example 2 | I-2 | 105 | 130 | 168 | A | 10 | 20 A | A |
| Example 3 | I-3 | 107 | 126 | 156 | A | 15 | 25 A | A |
| Example 4 | I-4 | 109 | 133 | 154 | A | 30 | 40 A | A |
| Example 5 | I-5 | 110 | 146 | 172 | A | 15 | 40 A | B |
| Example 6 | I-6 | 110 | 146 | 172 | A | 10 | 20 A | B |
| Example 7 | I-7 | 130 | 145 | 195 | B | 10 | 25 A | B |
| Example 8 | I-9 | 130 | 158 | 220 | B | 5 | 20 B | B |
| Example 9 | I-14 | 126 | 179 | 185 | B | 10 | 25 A | A |
| Example 10 | I-15 | 127 | — | 190 | A | 10 | 25 A | A |
| Example 11 | II-8 | 102 | 138 | 176 | A | 10 | 20 A | B |
| Example 12 | II-9 | 116 | 122 | 210 | A | 5 | 15 B | B |
| Example 13 | III-3 | 100 | — | 118 | A | 10 | 20 A | A |
| Example 14 | III-7 | (<30) | — | (50) | A | 40 | 40 A | A |
| Example 15 | IV-1 | 148 | — | 172 | A | 15 | 35 A | A |
| Example 16 | IV-2 | (<30) | (61) | (113) | — | 40 | 40 — | A |
| Example 17 | IV-6 | (<30) | — | (58) | A | 40 | 40 A | A |
| Example 18 | IV-10 | 95 | — | 99 | — | 40 | 40 — | A |
| Example 19 | VI-1 | 134 | — | 190 | A | 20 | 35 A | A |
| Example 20 | VI-7 | 123 | 137 | 145 | A | 15 | 25 B | A |
| Example 21 | IV-4 | 99 | — | 145 | A | 30 | 40 A | A |
| Example 22 | VII-4 | (<30) | -194 | -194 | — | 20 | 30 — | A |
| Comparative Example 1 | Ia-1 | 148 | 183 | >210 | — | <5 | 10 — | C |
| Comparative Example 2 | IIIa-3 | 131 | — | 240 | — | <5 | 10 — | C |
| Comparative Example 3 | IIIa-7 | 106 | — | 157 | — | 20 | 40 — | C |
| Comparative Example 4 | IVa-1 | 189 | — | >250 | — | <5 | 10 — | C |
| Comparative Example 5 | IVa-6 | (65) | — | (167) | — | <5 | 10 — | C |
| Comparative Example 6 | VIa-1 | 163 | — | 279 | — | 10 | 20 — | C |
| Comparative Example 7 | VIa-7 | 124 | 164 | 247 | — | <10 | 20 — | C |
| Comparative Example 8 | Ib-1 | 170 | — | 206 | C | <5 | 10 C | C |
| Comparative Example 9 | Ic-1 | 185 | — | >210 | C | <5 | <10 C | C |
| Comparative Example 10 | Id-1 | 234 | — | >260 | C | <5 | <10 C | A |

As is clear from Table 1, the compound of the present disclosure (Examples 1, 13, 14, 15, 17, 19, and 20) all exhibit large decreases in the smectic-nematic phase transition temperature and melting point, are capable of being synthesized at low cost, and have significantly improved solubility compared to the compounds of Comparative Examples 1 through 7, which have side chain portions which are conventionally utilized in the Background Art (Japanese Unexamined Patent Publication No. 2011-207765 and International Patent Publication No. 2014/010325).

Example 23

A polymerizable composition (optically anisotropic layer coating solution 23) having the composition below was prepared, and was coated on a glass substrate with a rubbed polyimide orienting film (SE-150 produced by Nissan Chemical Industries, Ltd.) by the spin coat method. The coated film underwent an orienting process at the temperature shown in Table 2 below, to form a liquid crystal layer. Thereafter, the film was cooled to the exposure temperature shown in Table 2 and the orientation was fixed by ultraviolet ray irradiation at 1000 mJ/cm², to form an optical anisotropic layer. Thereby, an optical film for measuring wavelength dispersion was obtained.

| Composition of Optically Anisotropic Layer Coating Solution 23 | |
|---|---|
| Liquid Crystal Compound (I-1) | 15 parts by mass |
| Photopolymerization Initiator (Irgacure 819 by Chiba Specialty Chemicals) | 0.45 parts by mass |
| Fluorine Containing Compound A | 0.12 parts by mass |
| Chloroform | 35 parts by mass |

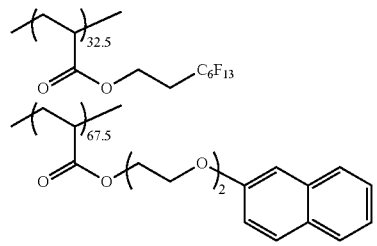

Fluorine Containing Compound A

Examples 24 Through 29

Optically anisotropic layers of these Examples were obtained in the same manner as that for Example 23, except that the liquid crystal compounds in the polymerizable composition (optically anisotropic layer coating solution) were changed to those shown in Table 2.

Example 30

An optically anisotropic layer of the present disclosure was obtained in the same manner as that for Example 23, except that a glass substrate with an orienting film including polyvinyl alcohol A prepared by the method disclosed in Japanese Unexamined Patent Publication No. 9(1997)-152509 was employed instead of a glass substrate with a rubbed polyimide orienting film.

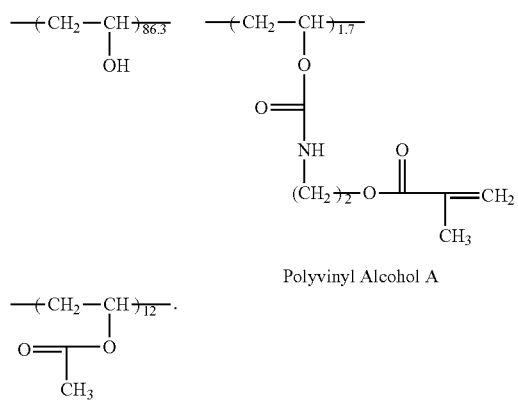

Polyvinyl Alcohol A

Comparative Examples 11-15

Optically anisotropic layers of these Comparative Examples were obtained in the same manner as that for Example 23, except that the liquid crystal compounds were changed to those shown in Table 2 when preparing the polymerizable compositions (optically anisotropic layer coating solution), and the drying temperature, the orienting process temperature, and the exposure temperature were changed to the conditions shown in Table 2.

Note that in Comparative Example 15, Comparative Compound 1e-1, which was obtained by the following method, was utilized as a liquid crystal compound.

<Synthesis of Comparative Compound of Comparative Example 15>

Compound (1e-1) was synthesized in the same manner as the method for synthesizing Compound (Ia-1) of Comparative Example 1 except that Compound (Ia-1C) was changed to Compound (Ie-1C). Note that Compound (Ie-1C) was synthesized according to the method disclosed in Japanese Unexamined Patent Publication No. 2010-031223.

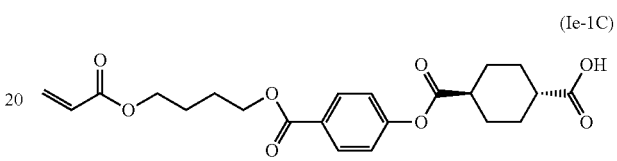

(Ie-1C)

Comparative Example 16

Comparative Example 16 was coated on a substrate in the same manner as Example 23, except that the liquid crystal compound in the polymerizable composition was changed to Ic-1 and the chloroform content was changed from 35 parts by mass to 70 parts by mass when preparing the polymerizable composition (optically anisotropic layer coating solution). Crystals were generated on the coated surface immediately after spin coating, and a uniform film could not be obtained even after a heating process was administered.

Comparative Example 17

Comparative Example 16 was coated on a substrate in the same manner as Example 23, except that the liquid crystal compound in the polymerizable composition was changed to Id-1 and the chloroform content was changed from 35 parts by mass to 70 parts by mass when preparing the polymerizable composition (optically anisotropic layer coating solution). Crystals were generated on the coated surface immediately after spin coating, and a uniform film could not be obtained even after a heating process was administered.

Comparative Example 18

Example 30 was modified by changing the liquid crystal compound in the polymerizable composition to Ia-1, and a liquid crystal layer was formed with the orientation treatment temperature for the coated film set to 200° C. Thereafter, the liquid crystal layer was cooled to 160° C. the orientation was attempted to be fixed by ultraviolet ray radiation irradiation at 1000 mJ/cm². However, the glass transition temperature (Tg) of the substrate was low, and the function of the orienting film deteriorated. Therefore, a uniformly oriented liquid crystal film could not be obtained.

(Measurement and Evaluation of Retardation and Wavelength Dispersion)

Retardation values (Re values) for wavelengths of 450 nm, 550 nm, and 650 nm were measured for the optically anisotropic layers obtained in Examples 23 through 30 and Comparative Examples 11 through 15 by an automatic birefringence meter with a (KOBRA-21ADH, Oji Scientific Instruments Co., Ltd.). Re values at a wavelength of 550 nm, α (Re(450)/Re(550)) and β (Re(650)/Re(550)) which were obtained as a result of measurement are shown in Table 2.

From Table 2, it was confirmed that all of the optically anisotropic layers of the present disclosure have high reverse wavelength dispersing properties. In addition, the phase transition temperatures of the optically anisotropic layers of the present disclosure are lower compared to those of Comparative Examples 11 through 17. Therefore, it was possible to decrease the orientation treatment temperature. Under the conditions of Comparative Examples 11 through 17, even if orientation treatments were administered at 150° C., uniform orientation was not achieved, and formation of films was difficult. It is considered that high temperatures are necessary for liquid crystal properties to be exhibited, because the melting points of the compounds are high. If the temperature is decreased under the conditions of Comparative Example 11, crystal generation was confirmed at 130° C. Comparative Example 15, which utilized a compound having an aromatic ring having a strong degree of UV light absorption exhibited a low reverse dispersion value.

As described above, the effectiveness of the present disclosure has been confirmed.

TABLE 2

| Example Number | Compound | Orientation Treatment Temperature ° C. | Exposure Temperature ° C. | Film Thickness (μm) | Re (550 nm) | α | β |
|---|---|---|---|---|---|---|---|
| Example 23 | I-1 | 120 | 80 | 1.2 | 78.10 | 0.826 | 1.041 |
| Example 24 | I-4 | 120 | 80 | 1.2 | 76.00 | 0.814 | 1.042 |
| Example 25 | I-5 | 120 | 80 | 1.2 | 76.70 | 0.828 | 1.039 |
| Example 26 | I-7 | 140 | 100 | 1.3 | 99.50 | 0.822 | 1.036 |
| Example 27 | II-9 | 120 | 80 | 1.3 | 93.10 | 0.812 | 1.045 |
| Example 28 | IV-1 | 140 | 100 | 1.1 | 67.90 | 0.795 | 1.044 |
| Example 29 | VI-1 | 130 | 90 | 1.4 | 60.10 | 0.743 | 1.054 |
| Example 30 | I-1 | 120 | 80 | 1.2 | 76.89 | 0.821 | 1.039 |
| Comparative Example 11 | Ia-1 | 200 | 160 | 1.2 | 97.10 | 0.852 | 1.022 |
| Comparative Example 12 | IVa-1 | 200 | 160 | 1.2 | 86.10 | 0.823 | 1.04 |
| Comparative Example 13 | VIa-1 | 200 | 160 | 1.3 | 89.10 | 0.827 | 1.031 |
| Comparative Example 14 | Ib-1 | 200 | 160 | 1.4 | 48.90 | 0.725 | 1.056 |
| Comparative Example 15 | Ie-1 | 200 | 160 | 1.0 | 94.40 | 0.952 | 1.001 |

What is claimed is:

1. A method for producing an optically anisotropic layer, comprising:
spreading a composition containing a liquid crystal compound represented by General Formula 1 below or spreading a polymerizable composition containing a liquid crystal compound represented by General Formula 1 below,
applying heat to orient the long axes of the molecules of the liquid crystal compound represented by General Formula 1 below; and
curing the composition or the polymerizable composition General Formula 1

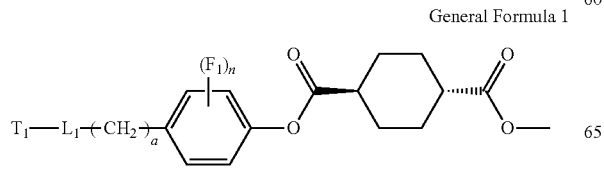

-continued

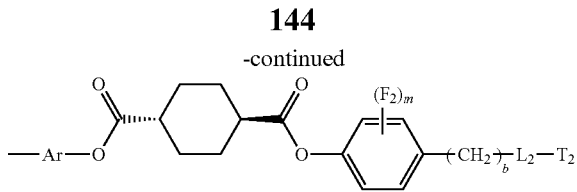

wherein each of $L_1$ and $L_2$ independently represents a linking group having a carbonyl group; each of $F_1$ and $F_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4; $T_1$ and $T_2$ are represented by General Formula 3 below; and Ar represents a divalent group having at least one aromatic ring selected from a group consisting of aromatic hydrocarbon rings and aromatic heterocycles, the number of Π electrons contained in the Ar group being 8 or greater, General Formula 3

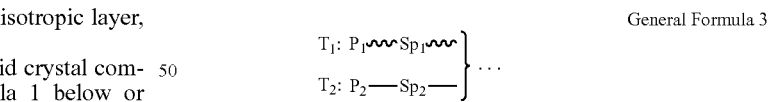

wherein each of $Sp_1$ and $Sp_2$ independently represents a straight chain or branched alkylene group having a carbon number within a range from 2 to 20, in the alkylene group, one or two or more —$CH_2$— not adjacent to each other in the alkylene group may be substituted by —O—, —S—, —C(=O)—, —OC(=O)—, —C(=O)O—, —OC(=O)O—, —$NR^1$C(=O)—, —C(=O)$NR^2$—, —OC(=O)$NR^3$—, —$NR^4$C(=O)O—, —SC(=O)— or —C(=O)S—: each of $R^1$, $R^2$, $R^3$ and $R^4$ independently represents a hydrogen atom, a halogen atom or an alkyl group having a carbon number within a range from 1 to 4; and each of $P_1$ and $P_2$ independently represents a polymerizable group or a hydrogen atom, wherein at least one is a polymerizable group.

2. A method for producing an optically anisotropic layer as defined in claim 1, wherein:

Ar of General Formula 1 is an aromatic ring represented by any one of General Formulae 2-1 to 2-4 below,

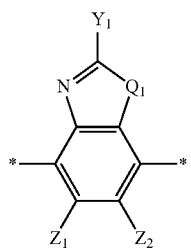

General Formula 2-1

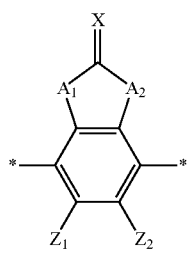

General Formula 2-2

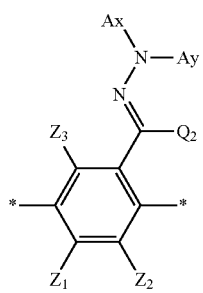

General Formula 2-3

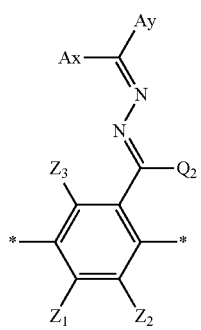

General Formula 2-4 wherein $Q_1$ represents —S—, —O—, or $NR^{11}$—, $R^{11}$ represents a hydrogen atom or an alkyl group having a carbon number within a range from 1 to 6; $Y_1$ represents an alkyl group having a carbon number within a range from 1 to 6, an aromatic hydrocarbon group having a carbon number within a range from 6 to 12, or an aromatic heterocyclic group having a carbon number within a range from 3 to 12; each of $Z_1$, $Z_2$, and, $Z_3$ independently represents a hydrogen atom, an aliphatic hydrocarbon or alkoxy group having a carbon number within a range from 1 to 20, an alicyclic hydrocarbon group having a carbon number within a range from 3 to 20, a monovalent aromatic hydrocarbon group having a carbon number within a range from 6 to 20, a halogen atom, a cyano group, a nitro group, —$NR^{12}R^{13}$ or $SR^{12}$, $Z_1$ and $Z_2$ may bond together to form an aromatic ring or an aromatic heterocyclic ring; each of $R^{12}$ and $R^{13}$ independently represents a hydrogen atom or an alkyl group having a carbon number within a range from 1 to 6; each of $A_1$ and $A_2$ independently represents a group selected from a group consisting of —O—, —$NR^{21}$— ($R^{21}$ represents a hydrogen atom or a substituent), —S— and CO—; X is a group 14 to group 16 non metallic atom that may be bound to a hydrogen atom or a substituent group; Ax represents an organic group having a carbon number within a range from 2 to 30, having at least one aromatic ring selected from a group consisting of aromatic hydrocarbon rings and aromatic heterocyclic rings; Ay is a hydrogen atom, an alkyl group having a carbon number within a range from 1 to 6 which may have a substituent, or an organic group having a carbon number within a range from 2 to 30, having at least one aromatic ring selected from a group consisting of aromatic hydrocarbon rings and aromatic heterocyclic rings, the aromatic rings of Ax and Ay may have substituents, Ax and Ay may be bound to form a ring; and $Q_2$ represents a hydrogen atom or an alkyl group having a carbon number of 1 to 6 which may have a substituent.

3. A method for producing an optically anisotropic layer as defined in claim 2, wherein:

Ar of General Formula 1 is an aromatic ring represented by General Formula 2-2.

4. A method for producing an optically anisotropic layer as defined in claim 1, wherein:

the composition or the polymerizable composition is spread onto a substrate having a glass transition temperature higher than the orientation temperature of the liquid crystal compound.

5. A liquid crystal compounds represented by General Formula 1 below:

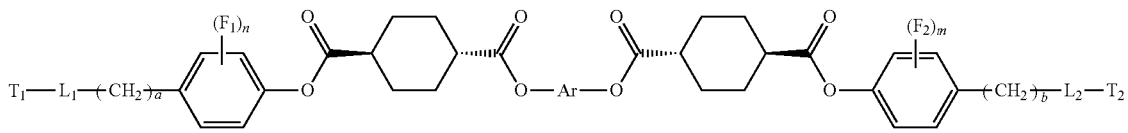

General Formula 1 wherein each of $L_1$ and $L_2$ independently represents a linking group having a carbonyl group; each of $F_1$ and $F_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4; $T_1$ and $T_2$ are represented by General Formula 3 below; and Ar represents any one of the aromatic rings represented by General Formulae 2-1 to 2-4 below:

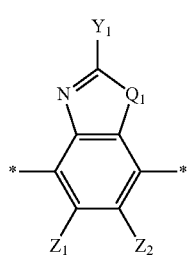

General Formula 2-1

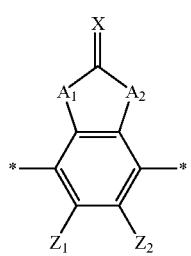

General Formula 2-2

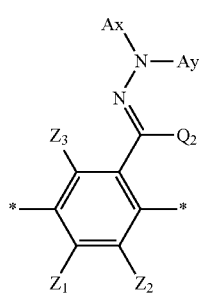

General Formula 2-3

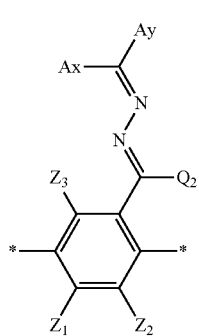

General Formula 2-4 wherein $Q_1$ represents —S—, —O—, or $NR^{11}$, $R^{11}$ represents a hydrogen atom or an alkyl group having a carbon number within a range from 1 to 6; $Y_1$ represents an alkyl group having a carbon number within a range from 1 to 6, an aromatic hydrocarbon group having a carbon number from 6 to 12, or an aromatic heterocyclic group having a carbon number within a range from 3 to 12; each of $Z_1$, $Z_2$, and $Z_3$ independently represents a hydrogen atom, an aliphatic hydrocarbon or alkoxy group having a carbon number within a range from 1 to 20, an alicyclic hydrocarbon group having a carbon number within a range from 3 to 20, a monovalent aromatic hydrocarbon group having a carbon number within a range from 6 to 20, a halogen atom, a cyano group, a nitro group, $—NR^{12}R^{13}$ or $SR^{12}$, $Z_1$ and $Z_2$ may bond together to form an aromatic ring or an aromatic heterocyclic ring; each of $R^{12}$ and $R^{13}$ independently represents a hydrogen atom or an alkyl group having a carbon number within a range from 1 to 6; each of $A_1$ and $A_2$ independently represents a group selected from a group consisting of —O—, $—NR^{21}—$ ($R^{21}$ represents a hydrogen atom or a substituent), —S— and CO—; X is a group 14 to group 16 non metallic atom that may be bound to a hydrogen atom or a substituent group; Ax represents an organic group having a carbon number within a range from 2 to 30, having at least one aromatic ring selected from a group consisting of aromatic hydrocarbon rings and aromatic heterocyclic rings; Ay is a hydrogen atom, an alkyl group having a carbon number within a range from 1 to 6 which may have a substituent, or an organic group having a carbon number within a range from 2 to 30, having at least one aromatic ring selected from a group consisting of aromatic hydrocarbon rings and aromatic heterocyclic rings, the aromatic rings of Ax and Ay may have substituents, Ax and Ay may be bound to form a ring; and $Q_2$ represents a hydrogen atom or an alkyl group having a carbon number of 1 to 6 which may have a substituent, and

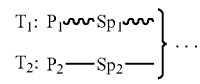

General Formula 3 wherein each of $Sp_1$ and $Sp_2$ independently represents a straight chain or branched alkylene group having a carbon number within a range from 2 to 20, in the alkylene group, one or two or more $—CH_2—$ not adjacent to each other in the alkylene group may be substituted by —O—, —S—, —C(=O)—, —OC(=O)—, —C(=O)O—, —OC(=O)O—, $—NR^1C(=O)—$, $—C(=O)NR^2—$, $—OC(=O)NR^3—$, $—NR^4C(=O)O—$, —SC(=O)— or —C(=O)S—: each of $R^1$, $R^2$, $R^3$ and $R^4$ independently represents a hydrogen atom, a halogen atom or an alkyl group having a carbon number within a range from 1 to 4; and each of $P_1$ and $P_2$ independently represents a polymerizable group or a hydrogen atom, wherein at least one is a polymerizable group.

6. A liquid crystal compound as defined in claim 5, wherein:
Ar in General Formula 1 is an aromatic ring represented by General Formula 2-2.

7. A method for producing a liquid crystal compound represented by General Formula 1 below, comprising:
causing a compound represented by General Formula 4 below to react with a compound represented by General Formula 5 below, General Formula 1

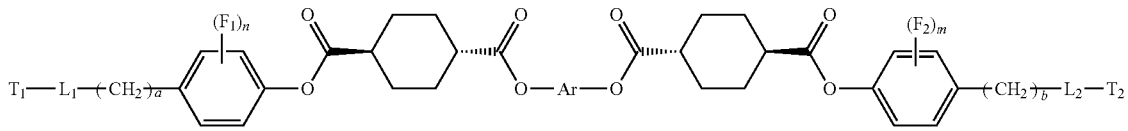

wherein each of $L_1$ and $L_2$ independently represents a linking group having a carbonyl group; each of $F_1$ and $F_2$ independently represents an alkyl group having a carbon number within a range from 1 to 4, an alkoxy group having a carbon number within a range from 1 to 4, or a halogen atom; each of n and m independently represents an integer within a range from 0 to 4; each of a and b independently represent an integer within a range from 1 to 4; $T_1$ and $T_2$ are represented by General Formula 3 below; and Ar represents a divalent group having at least one aromatic ring selected from a group consisting of aromatic hydrocarbon rings and aromatic heterocycles, the number of H electrons contained in the Ar group being 8 or greater;

General Formula 4

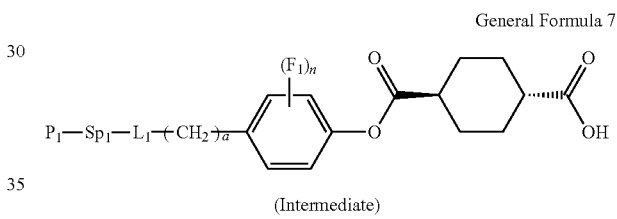

wherein $L_1$ represents a linking group having a carbonyl group; $F_1$ is an alkyl group having a carbon number within a range from 1 to 4, an alkoxy group having a carbon number within a range from 1 to 4, or a halogen atom; n represents an integer within a range from 0 to 4; a represents an integer within a range from 1 to 4; and $T_1$ is a straight chain or branched alkylene group having a carbon number within a range from 2 to 20;

HO—Ar—OH          General Formula 5 wherein Ar represents a divalent group having at least one aromatic ring selected from a group consisting of aromatic hydrocarbon rings and aromatic heterocycles, the number of Π electrons contained in the Ar group being 8 or greater; and General Formula 3

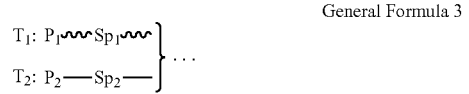

wherein each of $Sp_1$ and $Sp_2$ independently represents a straight chain or branched alkylene group having a carbon number within a range from 2 to 20, in the alkylene group, one or two or more —$CH_2$— not adjacent to each other in the alkylene group may be substituted by —O—, —S—, —C(=O)—, —OC(=O)—, —C(=O)O—, —OC(=O)O—, —$NR^1$C(=O)—, —C(=O)$NR^2$—, —OC(=O)$NR^3$—, —$NR^4$C(=O)O—, —SC(=O)— or —C(=O)S—; each of $R^1$, $R^2$, $R^3$ and $R^4$ independently represents a hydrogen atom, a halogen atom or an alkyl group having a carbon number within a range from 1 to 4; and each of $P_1$ and $P_2$ independently represents a polymerizable group or a hydrogen atom, wherein at least one is a polymerizable group.

8. A carboxylic acid compound represented by General Formula 7 below:

General Formula 7

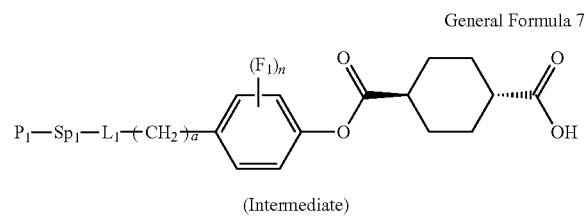

(Intermediate)

wherein $L_1$ represents a linking group having a carbonyl group; $F_1$ is an alkyl group having a carbon number within a range from 1 to 4, an alkoxy group having a carbon number within a range from 1 to 4, or a halogen atom; n represents an integer within a range from 0 to 4; a represents an integer within a range from 1 to 4; $Sp_1$ represents a straight chain or branched alkylene group having a carbon number within a range from 2 to 20, one or two or more —$CH_2$— not adjacent to each other in the alkylene group may be substituted by —O—, —S—, —C(=O)—, —OC(=O)—, —C(=O)O—, —OC(=O)O—, —NRC(=O)—, —C(=O)$NR^2$—, —OC(=O)$NR^3$—, —$NR^4$C(=O)O—, —SC(=O)— or —C(=O)S—; each of $R^1$, $R^2$, $R^3$ and $R^4$ independently represents a hydrogen atom, a halogen atom or an alkyl group having a carbon number within a range from 1 to 4; and $P_1$ represents a polymerizable group.

* * * * *